United States Patent
Kobayashi et al.

[11] Patent Number: 6,086,005
[45] Date of Patent: Jul. 11, 2000

[54] FISHING REEL WITH MAGNETIC FORCE SPOOL ROTATIONAL-SPEED CONTROL DURING SPOOL FREE ROTATIONAL STATE

[75] Inventors: Mikiharu Kobayashi; Nobuyuki Yamaguchi, both of Tokyo; Shuichi Matsuzawa, Saitama, all of Japan

[73] Assignee: Daiwa Seiko, Inc., Tokyo, Japan

[21] Appl. No.: 09/036,669

[22] Filed: Mar. 9, 1998

[30] Foreign Application Priority Data

| Mar. 11, 1997 | [JP] | Japan | 9-55965 |
| Mar. 19, 1997 | [JP] | Japan | 9-73698 |
| Aug. 8, 1997 | [JP] | Japan | 9-214408 |

[51] Int. Cl.[7] .................. A01K 89/02
[52] U.S. Cl. ............ 242/288; 242/289; 188/182; 188/187
[58] Field of Search ................ 242/289, 288, 242/261; 188/182, 161, 164, 156, 187

[56] References Cited

U.S. PATENT DOCUMENTS

| 4,390,140 | 6/1983 | Karlsson et al. | 242/84.52 C |
| 4,601,438 | 7/1986 | Young. | |
| 4,676,452 | 6/1987 | Nakajima | 242/84.52 B |
| 4,710,689 | 12/1987 | Uetsuki et al. | 318/630 |
| 4,946,115 | 8/1990 | Muller | 242/289 |
| 5,301,899 | 4/1994 | Sato | 242/288 |
| 5,308,021 | 5/1994 | Ikuta | 242/289 |
| 5,318,245 | 6/1994 | Sato et al. | 242/288 |
| 5,556,048 | 9/1996 | Hashimoto | 242/288 |
| 5,692,693 | 12/1997 | Yamaguchi | 242/288 |
| 5,782,420 | 7/1998 | Forslund et al. | 242/289 |
| 5,879,273 | 3/1999 | Wei et al. | 482/63 |

FOREIGN PATENT DOCUMENTS

| 54-7195 | 6/1952 | Japan. | |
| 62-35329 | 9/1987 | Japan. | |
| 63-34528 | 9/1988 | Japan. | |
| 3-10867 | 3/1991 | Japan. | |
| 3-79665 | 8/1991 | Japan. | |
| 4-197123 | 7/1992 | Japan. | |
| 5-68455 | 3/1993 | Japan. | |
| 6-8695 | 3/1994 | Japan. | |
| 6-16511 | 5/1994 | Japan. | |
| 857596 | 8/1981 | U.S.S.R. | 188/164 |

*Primary Examiner*—Donald P. Walsh
*Assistant Examiner*—Minh-Chau Pham
*Attorney, Agent, or Firm*—Liniak, Berenato, Longacre & White

[57] ABSTRACT

A fishing reel is provided which is capable of preventing noise and rapid change in the rotational speed of the spool which take place when a casting operation is performed, controlling backlash of a fishing line by a person even if the person is not skilled in the casting operation and maintaining the distance for which the tackle can be thrown. The fishing reel having a reel body 12 having a clutch-equipped rotational-force transmission means 20 for selecting a spool free state in which the free rotation of the spool is permitted and unreeling of the fishing line is permitted and or spool operation state in which the spool is rotated and the spool winds the fishing line; a conductive member 14 provided for the spool; magnets 16 for supplying magnetic force to the conductive member provided for the reel body 12 to brake the rotation of the spool; and a spool rotational-speed control means 26 for enlarging/reducing the magnetic force of the magnets which acts on the conductive member in accordance with the rotational speed of the spool so as to control the rotational speed of the spool.

19 Claims, 41 Drawing Sheets

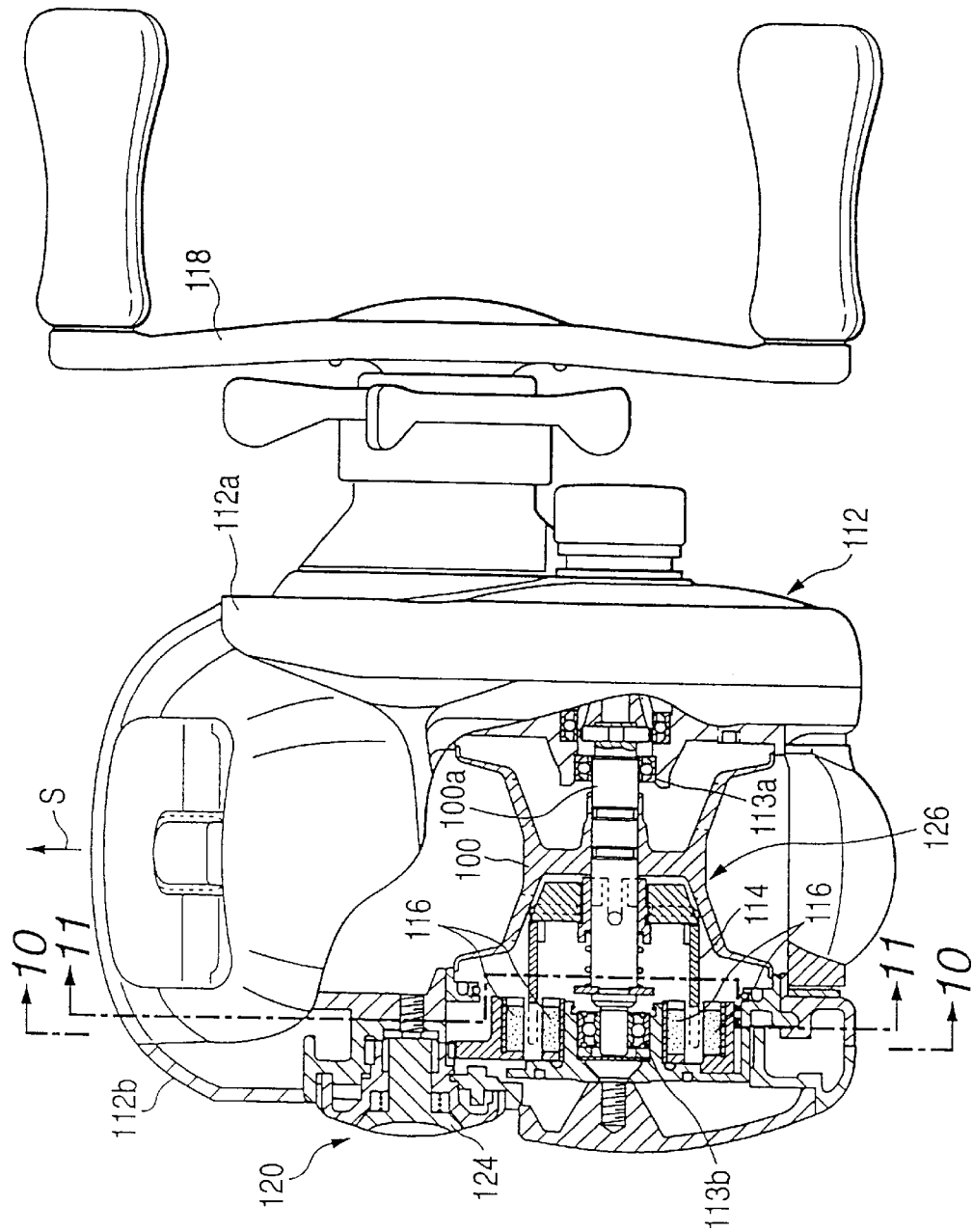

FISHING REEL WITH MAGNETIC FORCE SPOOL ROTATIONAL-SPEED CONTROL DURING SPOOL FREE ROTATIONAL STATE

BACKGROUND OF THE INVENTION

The present invention relates to a fishing reel having a spool rotational-speed control means for controlling the rotational speed of a spool when the spool is freely rotated. More particularly, the present invention relates to a fishing reel having a spool rotational-speed control means which uses magnetic force to control the rotational speed when the spool is freely rotated.

When casting is performed with a fishing reel, the spool is brought to a free rotation permitted state. When the casting operation has been performed and thus the tackle has been thrown in a required direction, a fishing line is, together with the tackle, drawn from the spool at high speed immediately after casting has been performed. Therefore, also the spool is rotated at high speed. As the tackle is moved away from the spool, influences of resistance of air, wind and the like exerted on the tackle and the fishing line cause the flying speeds of the tackle and the fishing line adjacent to the tackle to be lowered as compared with the circumferential speed of the spool (that is, the flying speed of the fishing line immediately after it has been cast from the spool). When the tackle has reached the water surface, the tension of the fishing line, which is generated by dint of the kinetic energy of the tackle, is canceled. As a result, a great looseness, which is so-called "backlash", takes place between the tackle and the fishing reel. The backlash of the fishing line causes the fishing line to get entangled and the same to be caught by a fishing line, a fishing rod or another substance. What is worse, the tackle cannot move as required.

Hitherto, the backlash which takes place in the casting operation has been prevented by bringing the finger in contact with the spool to generate frictional braking force so that excessive rotations of the spool by dint of the inertia of the spool are prevented. However, adjustment of the frictional braking force with the finger for the purpose of preventing the backlash while elongating the distance of casting of the tackle is a difficult skill permitted for only an experienced person in casting.

Therefore, a spool rotational-speed control means which permits a person which is not skilled in casting to appropriately control the rotational speed of the spool when the spool is freely rotated has been researched and developed in recent years. The spool rotational-speed control means is classified into two major types. One of the two types of the spool rotational-speed control means has been disclosed in, for example, Japanese Utility-Model Laid-Open No. 3-79665. The foregoing spool rotational-speed control means has a structure that centrifugal force is used to cause frictional force to act on the spool which is being rotated freely. Another type of the spool rotational-speed control means has been disclosed in Japanese Utility-Model Publication No. 6-8695, Japanese Utility-Model Publication No. 6-16511 and Japanese Utility-Model Publication No. 63-34528. The foregoing spool rotational-speed control means have an arrangement that magnetic force is caused to act on the spool which is rotated freely.

The spool rotational-speed control means having a structure as disclosed in Japanese Utility-Model Laid-Open No. 3-79665 and arranged to use the centrifugal force to cause frictional force to act on the spool comprises a radial-directional movable member which is able to move in the radial direction of the spool shaft and which is disposed at an end of the spool shaft. The body of the reel has a truncated cone recess covering an end of the spool shaft. The radial-directional movable member at the end of the spool shaft is moved to the outside of the spool shaft in the radial direction of the same by dint of centrifugal force generated in the radial-directional movable member. Thus, the radial-directional movable member slides on the inner surface of the recess of the truncated cone recess of the body of the reel so that frictional force is generated which controls the rotational speed of the spool.

The spool rotational-speed control means disclosed in Japanese Utility-Model Publication No. 6-8695 and using magnetic force has a structure that the spool is provided with a cylindrical projection made of a conductive material, the cylindrical projection projecting over an end surface of the spool concentrically with the spool. The body of the reel has double annular members disposed concentrically so that the cylindrical projection of the spool is received by the portion between the annular members. A plurality of magnets are, at the same intervals, disposed in the circumferential direction of each of the double annular members of the body of the reel. When the cylindrical projection made of the conductive material is, together with the spool, rotated relatively to each of the magnets at a position between the double annular members of the body of the reel, an eddy current is generated. As a result, electromagnetic force is generated which brakes the rotation of the spool together with the cylindrical projection made of the conductive material. The outer annular member of the double annular members of the body of the reel is movable relatively to the inner annular member in the circumferential direction in a predetermined range. The outer annular member can be moved in the circumferential direction in the predetermined range by using an adjustment button provided for the body of the reel. Thus, the positions of the plural magnets of the outer annular member with respect to the plural magnets of the inner annular member can be shifted in the circumferential direction in the predetermined range. As a result, the magnitude of the magnetic forces acting between the plural magnets of the inner annular member and the plural magnets of the outer annular member can be changed. Thus, the rotation of the cylindrical projection made of the conductive material together with the spool with respect to each magnet of the double annular members changes the level of the generated eddy current. Therefore, the magnitude of the electromagnetic force for braking the rotation of the spool together with the cylindrical projection made of the conductive material is changed so that the rotational speed of the spool is controlled.

The spool rotational-speed control means disclosed in Japanese Utility-Model Publication No. 6-16511 and using magnetic force has a structure that the spool is made of a conductive material. Moreover, a magnet is provided for the body of the reel at a position corresponding to an end surface of the spool. The foregoing magnet is movable in a predetermined range in a direction along the center line of rotation of the spool by operating an adjustment button provided for the body of the reel. Thus, the distance to an end surface of the spool can be changed within a predetermined range. As a result, the magnitude of the magnetic force of the magnet which acts on the end surface of the spool can be changed. Moreover, the rotation of the spool with respect to the magnet of the body of the reel changes the level of the generated eddy current. Therefore, the magnitude of the electromagnetic force for braking the rotation of the spool can be changed so that the rotational speed of the spool is controlled.

The spool rotational-speed control means disclosed in Japanese Utility-Model Publication No. 63-34525 and using magnetic force has a structure that the spool is provided with a cylindrical projection made of a conductive material, the cylindrical projection projecting over an end surface of the spool concentrically with the spool. The body of the reel has double annular members disposed concentrically so that the cylindrical projection of the spool is received by the portion between the annular members. A plurality of I- magnets are, at the same intervals, disposed in the circumferential direction of each of the double annular members of the body of the reel. When the cylindrical projection made of the conductive material is, together with the spool, rotated relatively to each of the magnet at a position between the double annular members of the body of the reel, an eddy current is generated. As a result, electromagnetic force is generated which brakes the rotation of the spool together with the cylindrical projection made of the conductive material. The spool rotational-speed control means disclosed in Japanese Utility-Model Publication No. 63-34528 is provided with an adjustment button provided for the body of the reel. The adjustment button is operated so that a magnetic-force insulating member disposed between the outer annular member of the body of the reel and the cylindrical projection of the spool is concentrically projected and retracted in a direction along the center line of the rotation of the spool in a predetermined range. When the magnetic-force insulating member is projected or retracted between the outer annular member of the body of the reel and the cylindrical projection of the spool by operating the adjustment button, the magnitude of the magnetic force which acts on a portion between the plural magnets of the inner annular member and the plural magnets of the outer annular member is changed. Thus, the cylindrical projection made of the conductive material is, together with the spool, rotated with respect to each of the magnets of the double annular members so that the level of the eddy current which is generated is changed. As a result, the magnitude of the electromagnetic force for braking the rotation of the spool together with the cylindrical projection made of the conductive material can be changed. As a result, the rotational speed of the spool can be controlled.

A spool rotational-speed control means using both of the frictional force which is generated by dint of centrifugal force and magnetic force has been disclosed in Japanese Utility-Model Publication No. 62-35329.

The spool rotational-speed control means disclosed in Japanese Utility-Model Publication No. 62-35329 comprises a radial-directional movable member which is able to move in the radial direction of the spool shaft and which is disposed at an end of the spool shaft. The body of the reel has a cylindrical recess covering an end of the spool shaft. The radial-directional movable member at the end of the spool shaft is moved to the outside of the spool shaft in the radial direction of the same by dint of centrifugal force generated in the radial-directional movable member. Thus, the radial-directional movable member slides on the inner surface of the recess of the cylindrical recess of the body of the reel so that frictional force is generated which controls the rotational speed of the spool.

The spool rotational-speed control means disclosed in Japanese Utility-Model Publication No. 62-35329 is further provided with a cylindrical projection made of a conductive material, the cylindrical projection projecting over an end surface of the spool concentrically with the spool. The body of the reel has double annular members disposed concentrically so that the cylindrical projection of the spool is received by the portion between the annular members. A plurality of magnets are, at the same intervals, disposed in the circumferential direction of each of the double annular members of the body of the reel. When the cylindrical projection made of the conductive material is, together with the spool, rotated relatively to each of the magnet at a position between the double annular members of the body of the reel, an eddy current is generated. As a result, electromagnetic force is generated which brakes the rotation of the spool together with the cylindrical projection made of the conductive material. The outer annular member of the double annular members of the body of the reel is movable relatively to the inner annular member in the circumferential direction in a predetermined range. The outer annular member can be moved in the circumferential direction in the predetermined range by using an adjustment button provided for the body of the reel. Thus, the positions of the plural magnets of the outer annular member with respect to the plural magnets of the inner annular member can be shifted in the circumferential direction in the predetermined range. As a result, the magnitude of the magnetic forces acting between the plural magnets of the inner annular member and the plural magnets of the outer annular member can be changed. Thus, the rotation of the cylindrical projection made of the conductive material together with the spool with respect to each magnet of the double annular members changes the level of the generated eddy current. Therefore, the magnitude of the electromagnetic force for braking the rotation of the spool together with the cylindrical projection made of the conductive material is changed so that the rotational speed of the spool is controlled.

A spool rotational-speed control means using frictional force which is generated by centrifugal force in two steps has been disclosed in Japanese Patent Laid-Open No. 5-68455.

The spool rotational-speed control means disclosed in Japanese Patent Laid-Open No. 5-68455 has a first radial-directional movable member which is capable of moving in the radial direction of the spool shaft, the first radial-directional movable member being disposed at an end of the spool shaft. The body of the reel is provided with rotative cylindrical member for covering an end of the spool shaft concentrically with the spool shaft. Also the outer surface Leo of the cylindrical member is provided with a second radial-directional movable member which is capable of moving in the radial direction of the cylindrical member. The body of the reel has a circular recess for covering the outer surface of the cylindrical member concentrically with the cylindrical member.

The first radial-directional movable member at the end of the spool shaft is moved to the outside of the spool shaft in the radial direction of the spool shaft by relatively small centrifugal force which is generated in the first radial-directional movable member at relatively low rotational speed of the spool. Thus, the first radial-directional movable member slides on the inner surface of the rotative cylindrical member of the body of the reel so that the relatively low rotational speed of the spool is controlled. When the rotational speed of the spool has been raised to relatively high speed, the frictional force which is generated between the first radial-directional movable member and the inner surface of the cylindrical member is enlarged. As a result, also the cylindrical member starts rotating together with the spool. Thus, a second radial-directional movable member of the cylindrical member is moved to the outside of the spool shaft in the radial direction of the spool shaft by dint of relatively large centrifugal force which is generated in the second radial-directional movable member at relatively high rotational speed of the spool. Thus, the second radial-directional movable member slides in the circular recess of the body of the reel to generate frictional force. Thus, the relatively high rotational speed of the spool can be controlled.

The spool rotational-speed control means disclosed in the Japanese Utility-Model Laid-Open No. 3-79665 uses centrifugal force frictional force generated by dint of centrifugal force. If the state of the frictional surface between the radial-directional movable member at the end of the spool shaft and the inner surface of the truncated cone recess is changed because of adhesion of water or dust or because of abrasion, the frictional braking force which is generated by the spool rotational-speed control means is changed at a predetermined rotational speed of the spool. Therefore, the above-mentioned spool rotational-speed control means has a problem in that the frictional braking force cannot be stabilized. Another problem arises in that excessive noise is generated because the frictional force is used.

Two cases are considered, one of which is realized when the centrifugal force acting on the radial-directional movable member at the end of the spool shaft, that is, the rotational speed of the spool is higher than a predetermined speed and the radial-directional movable member slides on the inner surface of the truncated cone recess under relatively strong pressure. Another case is realized when the centrifugal force acting on the radial-directional movable member at the end of the spool shaft, that is, the rotational speed of the spool is lower than a predetermined speed and the radial-directional movable member slides on the inner surface of the truncated cone recess under relatively low pressure. The frictional braking force which is generated by the radial-directional movable member at the end of the spool shaft and which acts on the inner surface of the truncated cone recess of the body of the reel is changed two-dimensionally with respect to the rotational speed of the spool (the frictional force which is generated by dint of centrifugal force is in proportion to the square of the rotational speed of the spool). Therefore, the frictional braking force of the spool rotational-speed control means acting on the spool is rapidly changed. Therefore, when the rotational speed of the spool has been lowered in the final step of the casting operation, the amount of reduction in the rotational speed of the spool is reduced rapidly as compared with the amount of reduction in the flying speed of the tackle or that of the moving speed. As a result, the backlash of the fishing line can easily take place. Hitherto, the generation of the backlash phenomenon in the final step of the casting operation has been prevented by a so-called "thumbing operation" which is performed in such a manner that the surface of the fishing line wound around the spool is pressed by the finger of the hand of a fisher man who is holding the fishing rod to delicately control the rotational speed of the spool. However, an appropriate thumbing skill can be acquired only from experience.

If the rotational speed of the spool has been raised to a level higher than a predetermined speed after the casting operation has been performed, the spool rotational-speed control means using the frictional force generated by the centrifugal force encounters rapid enlargement of the frictional braking force. Thus, the rotational speed of the spool is rapidly lowered and the flying speed of the tackle is lowered rapidly. That is, the distance for which the tackle can be cast is shortened.

That is, the spool rotational-speed control means using the frictional force generated by the centrifugal force encounters the fact that the distance to be cast is shortened. Thus, the backlash phenomenon cannot perfectly be prevented in spite of superiority to a structure having no spool rotational-speed control means.

The spool rotational-speed control means disclosed in Japanese Utility-Model Publication No. 6-8695, Japanese Utility-Model Publication No. 6-16511 and Japanese Utility-Model Publication No. 63-34528 and using magnetic force has the structure that the braking force is generated in substantially proportion to the rotational speed of the spool. Therefore, the spool rotational-speed control means of the foregoing is free from considerable change in the braking force generated in accordance with predetermined rotational speed of the spool and experienced with the spool rotational-speed control means using the frictional force generated by the centrifugal force. Therefore, generation of the backlash phenomenon in the casting operation can reliably be prevented. Therefore, even a beginner is able to easily perform the casting operation.

Since braking force corresponding to the rotational speed of the spool is always generated during the rotations of the spool, the distance for which the tackle can be cast cannot be elongated as required for a person who plays fishing in a final step of the casting operation. Moreover, even if casting for a short distance (so-called "short casting") is performed, the spool cannot freely be rotated and thus the rotational speed of the spool is too low for a person which plays fishing to cast the tackle to a required position.

The spool rotational-speed control means disclosed in Japanese Utility-Model Publication No. 62-35329 and using both of frictional force and magnetic force which are generated by dint of centrifugal force encounters a fact that the braking force generated by the magnetic force mainly acts on the spool in a range in which the rotational speed of the spool is relatively low. If the rotational speed of the spool is raised to relatively high speed, also braking force generated by the frictional force generated by the centrifugal force acts on the spool in addition to the braking force generated by the magnetic force. Thus, the problem experienced with the spool rotational-speed control means arranged to use magnetic force to use only the frictional force generated by the centrifugal force in that backlash takes place in a range in which the rotational speed of the spool is relatively low can be prevented. However, the problems experienced with the spool rotational-speed control means using only the frictional force generated by the centrifugal force in that noise is generated and the rotational speed of the spool is considerably changed at a predetermined number of revolutions of the spool occurring because of the change in the frictional braking force cannot completely be solved. Since the braking force generated by the magnetic force and/or the frictional force generated by the magnetic force and the centrifugal force acts on the overall rotational speed range for the spool, there arises a problem in that the distance for the tackle to be flown is shortened as compared with the spool rotational-speed control means using the magnetic force and the spool rotational-speed control means using frictional force generated by the centrifugal force.

The spool rotational-speed control means disclosed in Japanese Patent Laid-Open No. 5-68455 and arranged to use frictional force in two steps cannot solve the problem in that noise is generated and the rotational speed of the spool is changed at a predetermined number of revolutions of the spool because of the change in the frictional braking force. Moreover, a complicated structure is required in which a plurality of braking units are joined so as to sequentially be operated. Therefore, the overall size of the fishing reel having the spool rotational-speed control means of the foregoing type is enlarged excessively and the manufacturing cost cannot be reduced.

SUMMARY OF THE INVENTION

In view of the foregoing, an object of the present invention is to provide a fishing reel having a spool rotational-speed control means exhibiting high maximum number of revolutions of a spool because of limit for the rotational speed of the spool imposed in the initial and final steps of the casting operation and short time required for the number of revolutions to reach the maximum number of revolutions, capable of preventing rapid reduction in the rotational speed of the spool, appropriate limitation of the rotational speed of the spool which is not rapid limitation is performed by generating appropriate braking force by using the magnetic force in the intermediate step of the casting operation to elongate the distance for the tackle to be flown and preventing generation of backlash.

To achieve the above-mentioned object, a fishing reel according to the present invention comprises: a spool around which a fishing line is wound in such a manner that the fishing line can be unreeled; a reel body having rotational-force transmission means for selecting a spool free rotation state in which the spool is rotatively held, free rotations of the spool are permitted and unreeling of the fishing line is permitted or a spool operation state in which rotational force is transmitted to the spool to cause the spool to wind the fishing line; a conductive member provided for either of the spool or the reel body; a magnet provided for the spool or the reel body which is not provided with the conductive member and arranged to cause magnetic force to act on the conductive member to brake rotations of the spool; and spool rotational-speed control means for enlarging/reducing the magnetic force of the magnet which acts on the conductive member to correspond to increase/decrease in the rotational speed of the spool so as to control the rotational speed of the spool.

Since friction is not used to control the rotational speed of the spool, generation of noise and instable change in the rotational speed of the spool because of change in the state of the friction surface can be prevented differently from the conventional spool rotational-speed control means which uses only frictional force generated by the centrifugal force.

Moreover, the magnetic force which acts on the conductive member is enlarged/reduced to correspond to the increase/decrease in the rotational speed of the spool to control the rotational speed of the spool. Therefore, the braking force which acts on the spool can be reduced by reducing the magnetic force which acts on the conductive member in an initial period immediately after the casting operation has been started in which the rotational speed of the spool is relatively low so that unnecessary braking force is not loaded on the spool. Therefore, the unreeling speed of the fishing line from the spool can be raised so that the distance for the tackle to be thrown is elongated.

In an intermediate period after the initial period which is immediately after start of the casting operation and in which the rotational speed of the spool is raised rapidly, the rotational speed of the spool is raised maximally. In this period, the magnetic force acting on the conductive member is enlarged so that the braking force acting on the spool is appropriately enlarged. Thus, the rotational speed of the spool is appropriately limited to correspond to the reduction in the flying speeds of the tackle and the fishing line which takes place because influences of the wind pressure and the gravitation so that generation of the backlash phenomenon is prevented. The appropriate enlargement in the braking force is caused from the magnetic force. Therefore, the reduction in the rotational speed of the spool, that is, the unreeling speed of the fishing line from the spool exceeding a degree required to prevent generation of the backlash phenomenon can be prevented. The foregoing reduction has been experienced with the conventional spool rotational-speed control means which uses only magnetic force to use only the frictional force which is generated by using the centrifugal force. That is, the distance for which the tackle can be thrown is not excessively limited differently from the conventional spool rotational-speed control means which uses only the frictional force generated by the centrifugal force.

When the rotational speed of the spool has relatively been lowered in the final step of the casting operation, the magnetic force acting on the conductive member is reduced to reduce the braking force acting on the spool differently from the conventional spool rotational-speed control means which uses only magnetic force and similarly to the conventional spool rotational-speed control means which uses only frictional force generated by the centrifugal force. Thus, the reduction in the unreeling speed of the fishing line from the spool can be prevented.

As described above, the fishing reel according to the present invention has the structure that the rotational speed of the spool which takes place when the fishing line is unreeled in the initial step immediately after the casting operation has been started and in the final step is higher than that realized by the fishing reel using the conventional spool rotational-speed control means which uses only magnetic force. Moreover, time required for the maximum number of revolutions to reach the maximum number of revolutions in the intermediate period (the period in which the spool is rotated at high speed) which is after the period in which the rotational speed of the spool is rapidly raised immediately after the start of the casting operation and in which the rotational speed of the spool is raised maximally. The maximum number of revolutions of the spool is, of course, higher than that of the fishing reel using the conventional spool rotational-speed control means which uses only frictional force generated by the centrifugal force. The maximum number of revolutions is raised as compared with the fishing reel using the conventional spool rotational-speed control means which uses only magnetic force because high rotational speed of the spool is realized in the initial step immediately after the casting operation has been started.

Therefore, the distance for which the tackle can be thrown in the overall period in the casting operation from the initial step immediately after start of the casting operation to the final step can be elongated as compared with the fishing reel using the conventional spool rotational-speed control means which uses only frictional force generated by the centrifugal force and the fishing reel using the conventional spool rotational-speed control means which uses only magnetic force.

Moreover, the braking force acting on the spool in the final step of the casting operation with the fishing reel according to the present invention is not rapidly reduced and moderately reduced differently from the fishing reel using the conventional spool rotational-speed control means which uses only frictional force generated by the centrifugal force. Therefore, excessive rotation phenomenon of the spool with respect to the unreeling speed of the fishing line which causes the backlash of the fishing line in the final step of the casting operation can be prevented. Therefore, delicate control of the rotational speed of the spool by using the finger for the purpose of preventing backlash of the fishing line in the final step of the casting operation is not required.

After the tackle has reached the water surface and the tension of the fishing line pulled by the tackle has rapidly been reduced, there is apprehension that the excessive rotation phenomenon of the spool with respect to the pulling speed occurs and thus backlash of the fishing line takes place. After the tackle has reached the water surface and thus the pulling speed of the fishing line has rapidly been reduced, the rotations of the spool become regardless of the increase/decrease of the distance to be thrown. Therefore, prevention of the backlash of the fishing line by simply stopping the rotations of the spool is required. Therefore, control of the rotational speed of the spool with the finger for the purpose of preventing backlash of the fishing line can easily be performed even if the user is not a skilled person.

It is preferable that the fishing reel according to the present invention and characterized by the above-mentioned structure is arranged in such a manner that the spool rotational-speed control means uses the centrifugal force which is changed to correspond to the rotational speed of the spool to change the magnetic force which acts on the conductive member so as to control the rotational speed of the spool.

Also a spool rotational-speed control means using centrifugal force to change the magnetic force of a magnet which acts on the conductive member is able to appropriately control the rotational speed of the spool in a period immediately after the casting operation has been started to the final step. Thus, the distance for which the tackle can be thrown can be elongated and backlash can be prevented. Since the spool rotational-speed control means using the centrifugal force to change the magnetic force of the magnet which acts on the conductive member can easily be structured, breakdown can be prevented.

The fishing reel according to the present invention characterized by the above-mentioned structure may be arranged in such a manner that the spool rotational-speed control means relatively moves either of the conductive member or the magnet to correspond to the rotational speed of the spool. Thus, the magnetic force of the magnet which acts on the conductive member is changed to correspond to the rotational speed of the spool so that the rotational speed of the spool is controlled.

Since the above-mentioned structure is arranged in such a manner that the relative position between the magnet and the conductive member is shifted, the density of the magnetic flux of the magnet which acts on the conductive member and the area of the conductive member on which the magnetic flux of the magnet acts are changed. Thus, the magnetic force of the magnet which acts on the conductive member is changed.

When the spool rotational-speed control means relatively moves the conductive member or the magnet, the spool rotational-speed control means may comprise a tapered inner surface formed at an end of the spool and having a large-diameter opening formed to face a portion of the reel body opposite to the end of the spool; a lengthwise-directional movable member disposed at an end of a spool shaft and permitted to move in a direction along the center line of rotation of the spool shaft; a radial-directional movable member movably supported by the lengthwise-directional movable member in the radial direction of the spool shaft and disposed opposite to the inner surface of the tapered shape at the end of the spool in the radial direction; and urging means for urging the lengthwise-directional movable member to be moved apart from the portion of the reel body opposite to the end of the spool, wherein either of the magnet or the conductive member is provided for the lengthwise-directional movable member and arranged to be moved together with the lengthwise-directional movable member, and the magnet or the conductive member which is not provided for the lengthwise-directional movable member is provided for the portion of the reel body opposite to the end of the spool.

When the spool rotational-speed control means relatively moves either of the conductive member or the magnet to correspond to the rotational speed of the spool to change the area of the conductive member which traverses the magnetic flux generated by the magnet, the spool rotational-speed control means may comprise a lengthwise-directional movable member disposed at an end of a spool shaft and permitted to move in a direction along the center line of rotation of the spool shaft; a tapered inner surface provided for the lengthwise-directional movable member and having a large-diameter opening formed to face an end of the spool from which an end of the spool shaft is allowed to project; a radial-directional movable member movably supported at an end of the spool shaft in the radial direction of the spool shaft and disposed opposite to the inner surface of the tapered shape of the lengthwise-directional movable member; urging means for urging the lengthwise-directional movable member to be moved apart from the portion of the reel body opposite to the end of the spool; a magnet or a conductive member provided for the lengthwise-directional movable member and arranged to be moved together with the lengthwise-directional movable member; and the magnet or the conductive member which is not provided for the lengthwise-directional movable member and which is provided for the portion of the reel body opposite to the end of the spool.

As a result, the centrifugal force generated in the radial-directional movable member when the spool has been rotated moves the radial-directional movable member to the outside portion in the radial direction so that the radial-directional movable member is brought into contact with the inner surface of the tapered shape of the lengthwise-directional movable member. As a result, the lengthwise-directional movable member is moved in the direction of the central line of the rotations of the spool shaft against the urging force of the urging means. The radial-directional movable member can be movably supported in the radial direction by a guide portion provided for the lengthwise-directional movable member or a member which is rotated together with the spool. Note that an example of the member which is rotated together with the spool is the end of the spool shaft.

The guide portion may be an opening, a groove or a rod. The radial-directional movable member may be a collar member having a guide groove or a guide opening which is movably engaged to the opening, groove or rod guide portion. The radial-directional movable member may be a simple sphere movably supported by the opening, groove or rod guide portion.

To achieve the above-mentioned object, a fishing reel according to the present invention comprises: a spool around which a fishing line is wound in such a manner that the fishing line can be unreeled; a reel body having rotational-force transmission means for selecting a spool free rotation state in which the spool is rotatively held, free rotations of the spool are permitted and unreeling of the fishing line is permitted or a spool operation state in which rotational force is transmitted to the spool to cause the spool to wind the fishing line; a movable member provided for the spool, arranged to be rotated together with the spool and permitted to be moved along the center line of rotations of the spool; a limiting member provided for the movable member, permitted to be moved in the radial direction of the spool and arranged to be moved to the outside of the spool in the radial direction of the spool by the centrifugal force generated when the spool has been rotated; an annular limiting member provided for the reel body, disposed opposite to the movable member from outside in the radial direction in a range in which the movable member is moved in the direction along the center line of rotations when the movable member has been moved and caused to slide on the limiting member moved to the outside in the radial direction by the centrifugal force so as to generate frictional braking force; movable-member drive means for moving the movable member in a direction along the center line of the rotations by the centrifugal force generated when the spool has been rotated; urging means for urging the movable member in another direction along the center line of the rotations; and frictional-braking-force changing means for changing frictional braking force which is generated between the movable member and the annular limiting member by dint of movement of the movable member in the direction along the center line of the rotations when the movable member has been moved.

Since the movement of the movable member in the direction along the center line of the rotations taken place because of the movement of the movable member by the movable-member drive means to correspond to increase/decrease in the rotational speed of the spool causes the frictional-braking-force changing means to change the magnitude of the frictional braking force which is generated between the movable member and the annular limiting member, the magnitude of the generated frictional braking force can be reduced in the initial step immediately after the casting operation has been started to considerably raise the rotational speed of the spool and elongate the distance for which the tackle can be thrown. In an intermediate period after the initial period which is immediately after start of the casting operation and in which the rotational speed of the spool is raised rapidly, the rotational speed of the spool is raised maximally. In this period, the frictional braking force which acts on the spool is appropriately enlarged so as to appropriately limit the rotational speed of the spool to correspond to the reduction in the flying speeds of the tackle and the fishing line because of the influences of wind pressure and gravity. Thus, generation of the backlash phenomenon can be prevented. When the rotational speed of the spool has been relatively reduced in the final period of the casting operation, adjustment is performed in such a manner that the frictional braking force is appropriately reduced. Thus, rapid suspension of reduction in the rotational speed of the spool as compared with the reduction in the unreeling speed of the fishing line from the spool can be prevented. As a result, excessive rotation of the spool which causes the backlash phenomenon to take place can be prevented.

Therefore, the necessity of performing the delicate control of the rotational speed of the spool with the finger for the purpose of preventing backlash of the fishing line in the final stage of the casting operation can substantially be eliminated.

After the pulling speed of the fishing line pulled by the tackle after the tackle has reached the water surface has rapidly be reduced, there is apprehension that the backlash of the fishing line takes place because of the excessive rotation phenomenon of the spool with respect to the pulling speed. Since the rotations of the spool become regardless of the elongation/shortening of the distance for which the tackle can be thrown after the tackle has reached the water surface and the pulling speed of the fishing line has rapidly be reduced, prevention of the backlash of the fishing line is required by simply stopping the rotation of the spool. Thus, control of the rotational speed of the spool with the finger for the purpose of preventing the backlash can easily be performed even if the user is not a skilled person.

The fishing reel according to the present invention characterized by the above-mentioned structure may be arranged in such a manner that the movable-member drive means and the frictional-braking-force changing means may be constituted by inclining the surface of the annular limiting member which slides on the limiting member with respect to the center line of the rotations of the spool.

The coefficient of friction of the surface of the annular limiting member which slides on the limiting member may be changed in a direction along the center line of the rotations of the spool so that the frictional-braking-force changing means is formed.

The annular braking member may be selective in the direction along the center line of the rotations of the spool so that the distance of the surface of the annular braking member for which the braking member is able to slide in the direction along the center line of the rotations of the spool is controlled.

The surface of the annular limiting member which slides on the limiting member may be formed into a circular shape; the coefficient of friction of the surface of the annular limiting member which slides on the limiting member is changed in a direction along the center line of the rotations of the spool so that the frictional-braking-force changing means is constituted; and the movable-member drive means may constitute a radial-directional movable member provided for the movable member and permitted to be moved in the radial direction and a tapered inner surface provided for the spool, formed opposite to the movable member from outside in the radial direction in the movable range for the radial-directional movable member in the direction along the center line of rotations and inclined with respect to the center line of rotations. Note that the tapered inner surface may directly be formed on the surface of the spool or provided for an additional member which is individually formed from the spool and then secured to the spool.

To achieve the above-mentioned object, a fishing reel according to the present invention comprises: a spool around which a fishing line is wound in such a manner that the fishing line can be unreeled; a reel body having rotational-force transmission means for selecting a spool free rotation state in which the spool is rotatively held, free rotations of the spool are permitted and unreeling of the fishing line is permitted or a spool operation state in which rotational force is transmitted to the spool to cause the spool to wind the fishing line; and spool rotational-speed control means for controlling the rotational speed of the spool in the spool free state.

The spool rotational-speed control means includes braking means provided for both spool and the reel body to brake rotation of the spool in selectively cooperation with each other so as to change the braking force by changing the relative positions; and position changing means which changes the relative position between the braking means provided for both spool and the reel body in accordance with enlargement/reduction in the rotational speed of the spool so as to change the braking force acts on the spool.

The position changing means comprises a movable member arranged to support the braking means provided for the spool, permitted to be moved together with the braking means provided for the spool in the circumferential direction of the spool in a predetermined range and permitted to be moved in either of a direction along the center line of rotation of the spool or a direction intersecting the center line of rotation of the spool; urging means for urging the movable member in at least either of the directions; and conversion means using the difference between the rotations of the spool and those of the movable member to move the movable member in at least the other direction against the urging force of the urging means to change the relative position of the braking means provided for both spool and the reel body so as to change the braking force of the braking means which acts on the rotation of the spool so as to control the rotational speed of the spool.

In the initial period immediately after the casting operation has been started, the rotational speed of the spool is raised relatively. In this period, the conversion means of the spool rotational-speed control means cannot move the movable member in at least either of the direction along the center line of the rotations of the spool and the direction intersecting the center line of the rotations of the spool together with the braking means provided for the spool against the urging force of the urging means by using the difference between the rotations of the spool and those of the movable member. Therefore, the spool rotational-speed control means cannot shift the relative positions of the braking means provided for both spool and the reel body. Therefore, the braking force of the braking means which acts on the rotations of the spool cannot be changed to control the rotational speed of the spool. Therefore, the braking force which is applied to the spool can be reduced and thus the load of the unnecessary braking force which is applied to the spool can be eliminated. Thus, the unreeling speed of the fishing line from the spool can be raised and thus the distance for which the tackle can be thrown can be elongated.

In an intermediate period after the initial period which is immediately after start of the casting operation and in which the rotational speed of the spool is raised rapidly, the rotational speed of the spool is raised maximally. In this period, the conversion means of the spool rotational-speed control means is able to move the movable member in at least either of the direction along the center line of the rotations of the spool and the direction intersecting the center line of the rotations of the spool together with the braking means provided for the spool against the urging force of the urging means by using the difference between the rotations of the spool and those of the movable member. Therefore, the spool rotational-speed control means is able to shift the relative positions of the braking means provided for both spool and the reel body. Therefore, the braking force of the braking means which acts on the rotations of the spool can be changed to control the rotational speed of the spool. Therefore, the braking force which is applied to the spool can appropriately enlarged to appropriately limit the rotational speed of the spool to correspond to the reduction in the flying speed of the tackle and the fishing line because of the influences of the wind pressure and gravity. As a result, generation of the backlash phenomenon can be prevented. Since a load of excessively large braking force to achieve the object to prevent generation of the backlash phenomenon can be eliminated, the unreeling speed of the fishing line from the spool is not limited excessively. As a result, the distance for which the tackle can be thrown can be elongated.

When the rotational speed of the spool has relatively been reduced in the final stage of the casting operation, the conversion means of the spool rotational-speed control means cannot move the movable member in at least either of the direction along the center line of the rotations of the spool and the direction intersecting the center line of the rotations of the spool together with the braking means provided for the spool against the urging force of the urging means by using the difference between the rotations of the spool and those of the movable member. Therefore, the movable member of the spool rotational-speed control means is gradually restored to the initial relative position in the initial stage of the casting operation so that the relative positions of the braking means provided for both of spool and the reel body are gradually restored to the initial relative positions in the initial stage of the casting operation. Thus, the braking force of the braking means which acts on the rotations of the spool is changed so that the rotational speed of the spool is controlled. As a result, the braking force of the braking member acts on the spool is gradually reduced. Thus, excessive reduction in the unreeling speed of the fishing line from the spool can be prevented.

As described above, the fishing reel according to the present invention has the structure that the rotational speed of the spool which takes place when the fishing line is unreeled in the initial step immediately after the casting operation has been started and in the final step is higher than that realized by the fishing reel using the conventional spool rotational-speed control means which uses only magnetic force. Moreover, time required for the maximum number of revolutions to reach the maximum number of revolutions in the intermediate period (the period in which the spool is rotated at high speed) which is after the period in which the rotational speed of the spool is rapidly raised immediately after the start of the casting operation and in which the rotational speed of the spool is raised maximally. The maximum number of revolutions of the spool is, of course, higher than that of the fishing reel using the conventional spool rotational-speed control means which uses only frictional force generated by the centrifugal force. The maximum number of revolutions is raised as compared with the fishing reel using the conventional spool rotational-speed control means which uses only magnetic force because high rotational speed of the spool is realized in the initial step immediately after the casting operation has been started.

Therefore, the distance for which the tackle can be thrown in the overall period in the casting operation from the initial step immediately after start of the casting operation to the final step can be elongated as compared with the fishing reel using the conventional spool rotational-speed control means which uses only frictional force generated by the centrifugal force and the fishing reel using the conventional spool rotational-speed control means which uses only magnetic force.

Moreover, the braking force acting on the spool in the final step of the casting operation with the fishing reel according to the present invention is not rapidly reduced and moderately reduced differently from the fishing reel using the conventional spool rotational-speed control means which uses only frictional force generated by the centrifugal force. Therefore, excessive rotation phenomenon of the spool with respect to the unreeling speed of the fishing line which causes the backlash of the fishing line in the final step of the casting operation can be prevented. Therefore, delicate control of the rotational speed of the spool by using the finger for the purpose of preventing backlash of the fishing line in the final step of the casting operation is not required.

After the tackle has reached the water surface and the tension of the fishing line pulled by the tackle has rapidly been reduced, there is apprehension that the excessive rotation phenomenon of the spool with respect to the pulling speed occurs and thus backlash of the fishing line takes place. After the tackle has reached the water surface and thus the pulling speed of the fishing line has rapidly been reduced, the rotations of the spool become regardless of the increase/decrease of the distance to be thrown. Therefore, prevention of the backlash of the fishing line by simply stopping the rotations of the spool is required. Thus, control of the rotational speed of the spool with the finger for the purpose of preventing backlash of the fishing line can easily be performed even if the user is not a skilled person.

The fishing reel according to the present invention characterized by the above-mentioned structure may have an arrangement that the braking means provided for both spool and the reel body include magnets and conductive members. When the relative positions between the magnets and the conductive members are changed so that the magnetic forces of the magnets acts on the conductive members are changed so as to change the braking force which is generated between the elements.

The fishing reel according to the present invention characterized by the above-mentioned structure may have an arrangement that the braking means provided for the spool has the radial-directional movable member supported by the movable member and permitted to be moved in the radial direction of the spool. Moreover, the braking means providedfor the reel body may include an annular limiting member which surrounds the radial-directional movable member from outside in the radial direction in the movable range for the movable member and on which the radial-directional movable member slides by the centrifugal force generated by the rotations of the spool so as to exhibit the braking frictional force and having coefficient of friction which is changed in the direction in which the movable member is moved.

In order to achieve the object of the present invention, a fishing reel according to the present invention comprises: a spool around which a fishing line is wound in such a manner that the fishing line can be unreeled; a reel body having rotational-force transmission means for selecting a spool free rotation state in which the spool is rotatively held, free rotations of the spool are permitted and unreeling of the fishing line is permitted or a spool operation state in which rotational force is transmitted to the spool to cause the spool to wind the fishing line; a conductive member provided for either of the spool or the reel body; a magnet provided for the spool or the reel body which is not provided with the conductive member and arranged to cause magnetic force to act on the conductive member to brake rotations of the spool; spool rotational-speed control means for enlarging/reducing the magnetic force of the magnet which acts on the conductive member to correspond to increase/decrease in the rotational speed of the spool so as to control the rotational speed of the spool; and control-operation adjustment means for adjusting the degree of the control operation performed by the spool rotational-speed control means by enlarging/reducing the rotational speed of the spool.

Since friction is not used to control the rotational speed of the spool, generation of noise and instable change in the rotational speed of the spool because of change in the state of the friction surface can be prevented differently from the conventional spool rotational-speed control means which uses only frictional force generated by the centrifugal force.

Moreover, the magnetic force which acts on the conductive member is enlarged/reduced to correspond to the increase/decrease in the rotational speed of the spool to control the rotational speed of the spool. Therefore, the braking force which acts on the spool can be reduced by reducing the magnetic force which acts on the conductive member in an initial period immediately after the casting operation has been started in which the rotational speed of the spool is relatively low so that unnecessary braking force is not loaded on the spool. Therefore, the unreeling speed of the fishing line from the spool can be raised so that the distance for the tackle to be thrown is elongated.

In an intermediate period after the initial period which is immediately after start of the casting operation and in which the rotational speed of the spool is raised rapidly, the rotational speed of the spool is raised maximally. In this period, the magnetic force acting on the conductive member is enlarged so that the braking force acting on the spool is appropriately enlarged. Thus, the rotational speed of the spool is appropriately limited to correspond to the reduction in the flying speeds of the tackle and the fishing line which takes place because influences of the wind pressure and the gravitation so that generation of the backlash phenomenon is prevented. The appropriate enlargement in the braking force is caused from the magnetic force. Therefore, the reduction in the rotational speed of the spool, that is, the unreeling speed of the fishing line from the spool exceeding a degree required to prevent generation of the backlash phenomenon can be prevented. The foregoing reduction has been experienced with the conventional spool rotational-speed control means which uses only magnetic force to use only the frictional force which is generated by using the centrifugal force. That is, the distance for which the tackle can be thrown is not excessively limited differently from the conventional spool rotational-speed control means which uses only the frictional force generated by the centrifugal force.

When the rotational speed of the spool has relatively been lowered in the final step of the casting operation, the magnetic force acting on the conductive member is reduced to reduce the braking force acting on the spool differently from the conventional spool rotational-speed control means which uses only magnetic force and similarly to the conventional spool rotational-speed control means which uses only frictional force generated by the centrifugal force. Thus, the reduction in the unreeling speed of the fishing line from the spool can be prevented.

As described above, the fishing reel according to the present invention has the structure that the rotational speed of the spool which takes place when the fishing line is unreeled in the initial step immediately after the casting operation has been started and in the final step is higher than that realized by the fishing reel using the conventional spool rotational-speed control means which uses only magnetic force. Moreover, time required for the maximum number of revolutions to reach the maximum number of revolutions in the intermediate period (the period in which the spool is rotated at high speed) which is after the period in which the rotational speed of the spool is rapidly raised immediately after the start of the casting operation and in which the rotational speed of the spool is raised maximally. The maximum number of revolutions of the spool is, of course, higher than that of the fishing reel using the conventional spool rotational-speed control means which uses only frictional force generated by the centrifugal force. The maximum number of revolutions is raised as compared with the fishing reel using the conventional spool rotational-speed control means which uses only magnetic force because high rotational speed of the spool is realized in the initial step immediately after the casting operation has been started.

Therefore, the distance for which the tackle can be thrown in the overall period in the casting operation from the initial step immediately after start of the casting operation to the final step can be elongated as compared with the fishing reel using the conventional spool rotational-speed control means which uses only frictional force generated by the centrifugal force and the fishing reel using the conventional spool rotational-speed control means which uses only magnetic force.

Moreover, the braking force acting on the spool in the final step of the casting operation with the fishing reel according to the present invention is not rapidly reduced and moderately reduced differently from the fishing reel using the conventional spool rotational-speed control means which uses only frictional force generated by the centrifugal force. Therefore, excessive rotation phenomenon of the spool with respect to the unreeling speed of the fishing line which causes the backlash of the fishing line in the final step of the casting operation can be prevented. Therefore, control of the rotational speed of the spool by using the finger for the purpose of preventing backlash of the fishing line in the final step of the casting operation is not required.

After the tackle has reached the water surface and the tension of the fishing line pulled by the tackle has rapidly been reduced, there is apprehension that the excessive rotation phenomenon of the spool with respect to the pulling speed occurs and thus backlash of the fishing line takes place. After the tackle has reached the water surface and thus the pulling speed of the fishing line has rapidly been reduced, the rotations of the spool become regardless of the increase/decrease of the distance to be thrown. Therefore, prevention of the backlash of the fishing line by simply stopping the rotations of the spool is required. Therefore, control of the rotational speed of the spool with the finger for the purpose of preventing backlash of the fishing line can easily be performed even if the user is not a skilled person.

Moreover, the control-operation adjustment means may be used in accordance with the situation of the fishing spot to enlarge/reduce the rotational speed of the spool to arbitrarily adjust the degree of the control operation which is performed by the spool rotational-speed control means.

It is preferable that the fishing reel according to the present invention and characterized by the above-mentioned structure is arranged in such a manner that the spool rotational-speed control means uses the centrifugal force which is changed to correspond to the rotational speed of the spool to change the magnetic force which acts on the conductive member so as to control the rotational speed of the spool.

Also a spool rotational-speed control means using centrifugal force to change the magnetic force of a magnet which acts on the conductive member is able to appropriately control the rotational speed of the spool in a period immediately after the casting operation has been started to the final step. Thus, the distance for which the tackle can be thrown can be elongated and backlash can be prevented. Since the spool rotational-speed control means using the centrifugal force to change the magnetic force of the magnet which acts on the conductive member can easily be structured, breakdown can be prevented.

The fishing reel according to the present invention characterized by the above-mentioned structure may be arranged in such a manner that the spool rotational-speed control means relatively moves either of the conductive member or the magnet to correspond to the rotational speed of the spool. Thus, the magnetic force of the magnet which acts on the conductive member is changed to correspond to the rotational speed of the spool so that the rotational speed of the spool is controlled.

Since the above-mentioned structure is arranged in such a manner that the relative position between the magnet and the conductive member is shifted, the density of the magnetic flux of the magnet which acts on the conductive member and the area of the conductive member on which the magnetic flux of the magnet acts are changed. Thus, the magnetic force of the magnet which acts on the conductive member is changed.

When the spool rotational-speed control means relatively moves the conductive member or the magnet, the spool rotational-speed control means may comprise a tapered inner surface formed at an end of the spool and having a large-diameter opening formed to face a portion of the reel body opposite to the end of the spool; a lengthwise-directional movable member disposed at an end of a spool shaft and permitted to move in a direction along the center line of rotation of the spool shaft; a radial-directional movable member movably supported by the lengthwise-directional movable member in the radial direction of the spool shaft and disposed opposite to the inner surface of the tapered shape at the end of the spool in the radial direction; and urging means for urging the lengthwise-directional movable member to be moved apart from the portion of the reel body opposite to the end of the spool, wherein either of the magnet or the conductive member is provided for the lengthwise-directional movable member and arranged to be moved together with the lengthwise-directional movable member, and the magnet or the conductive member which is not provided for the lengthwise-directional movable member is provided for the portion of the reel body opposite to the end of the spool.

When the spool rotational-speed control means relatively moves either of the conductive member or the magnet to correspond to the rotational speed of the spool to change the area of the conductive member which traverses the magnetic flux generated by the magnet, the spool rotational-speed control means may comprise lengthwise-directional movable member disposed at an end of a spool shaft and permitted to move in a direction along the center line of rotation of the spool shaft; a tapered inner surface provided for the lengthwise-directional movable member and having a large-diameter opening formed to face an end of the spool from which an end of the spool shaft is allowed to project; a radial-directional movable member movably supported at an end of the spool shaft in the radial direction of the spool shaft and disposed opposite to the inner surface of the tapered shape of the lengthwise-directional movable member; urging means for urging the lengthwise-directional movable member to be moved apart from the portion of the reel body opposite to the end of the spool; a magnet or a conductive member provided for the lengthwise-directional movable member and arranged to be moved together with the lengthwise-directional movable member; and the magnet or the conductive member which is not provided for the lengthwise-directional movable member and which is provided for the portion of the reel body opposite to the end of the spool.

As a result, the centrifugal force generated in the radial-directional movable member when the spool has been rotated moves the radial-directional movable member to the outside portion in the radial direction so that the radial-directional movable member is brought into contact with the inner surface of the tapered shape of the lengthwise-directional movable member. As a result, the lengthwise-directional movable member is moved in the direction of the central line of the rotations of the spool shaft against the urging force of the urging means. The radial-directional movable member can be movably supported in the radial direction by a guide portion provided for the lengthwise-directional movable member or a member which is rotated together with the spool. Note that an example of the member which is rotated together with the spool is the end of the spool shaft.

The guide portion may be an opening, a groove or a rod. The radial-directional movable member may be a collar member having a guide groove or a guide opening which is movably engaged to the opening, groove or rod guide portion. The radial-directional movable member may be a simple sphere movably supported by the opening, groove or rod guide portion.

If the spool rotational-speed control means has a plurality of the radial-directional movable members, the control-operation adjustment means of the fishing reel according to the present invention and characterized by the above-mentioned structure, the control-operation adjustment means may have radial-directional movement selection means for selecting a radial-directional movement permitted state for the plurality of the radial-directional movable members and a radial-directional movement inhibited state.

The radial-directional movement selection means may be temporarily engagement means provided for the guide portion.

If the spool rotational-speed control means has the radial-directional movable member, the control-operation adjustment means may selectively use a plurality of prepared radial-directional movable members having individual weights or coefficients of friction with respect to the inner surface of the tapered shape to serve as the control-operation adjustment means.

If the spool rotational-speed control means has the urging means, the control-operation adjustment means may selectively use a plurality of prepared urging means having individual urging forces to serve as the control-operation adjustment means.

To achieve the object of the present invention, a fishing reel according to the present invention comprises: a spool around which a fishing line is wound in such a manner that the fishing line can be unreeled; a reel body having rotational-force transmission means for selecting a spool free rotation state in which the spool is rotatively held, -free rotations of the spool are permitted and unreeling of the fishing line is permitted or a spool operation state in -which rotational force is transmitted to the spool to cause the spool to wind the fishing line; a conductive member -provided for either of the spool or the reel body; a magnet provided for the spool or the reel body which is not provided with the conductive member and arranged to cause magnetic force to act on the conductive member to brake rotations of the spool; spool rotational-speed control means for enlarging/reducing the magnetic force of the magnet which acts on the conductive member to correspond to increase/decrease in the rotational speed of the spool so as to control the rotational speed of the spool; and control-operation adjustment means for adjusting the degree of the control which is performed by the spool rotational-speed control means by raising/reducing the rotational speed of the spool, wherein the spool rotational-speed control means changes the distance between the magnet and the conductive member in accordance with the rise/reduction in the rotational speed of the spool to enlarge/reduce the magnetic force of the magnet which acts on the conductive member so as to control the rotational speed of the spool; and the control-operation adjustment means changes the shortest distance between the magnet and the conductive member to raise/reduce the rotational speed of the spool to adjust the degree of the control which is performed by the spool rotational-speed control means.

Since friction is not used to control the rotational speed of the spool, generation of noise and instable change in the rotational speed of the spool because of change in the state of the friction surface can be prevented differently from the conventional spool rotational-speed control means which uses only frictional force generated by the centrifugal force.

Moreover, the magnetic force which acts on the conductive member is enlarged/reduced to correspond to the increase/decrease in the rotational speed of the spool to control the rotational speed of the spool. Therefore, the braking force which acts on the spool can be reduced by reducing the magnetic force which acts on the conductive member in an initial period immediately after the casting operation has been started in which the rotational speed of the spool is relatively low so that unnecessary braking force is not loaded on the spool. Therefore, the unreeling speed of the fishing line from the spool can be raised so that the distance for the tackle to be thrown is elongated.

In an intermediate period after the initial period which is immediately after start of the casting operation and in which the rotational speed of the spool is raised rapidly, the rotational speed of the spool is raised maximally. In this period, the magnetic force acting on the conductive member is enlarged so that the braking force acting on the spool is appropriately enlarged. Thus, the rotational speed of the spool is appropriately limited to correspond to the reduction in the flying speeds of the tackle and the fishing line which takes place because influences of the wind pressure and the gravitation so that generation of the backlash phenomenon is prevented. The appropriate enlargement in the braking force is caused from the magnetic force. Therefore, the reduction in the rotational speed of the spool, that is, the unreeling speed of the fishing line from the spool exceeding a degree required to prevent generation of the backlash phenomenon can be prevented. The foregoing reduction has been experienced with the conventional spool rotational-speed control means which uses only magnetic force to use only the frictional force which is generated by using the centrifugal force. That is, the distance for which the tackle can be thrown is not excessively limited differently from the conventional spool rotational-speed control means which uses only the frictional force generated by the centrifugal force.

When the rotational speed of the spool has relatively been lowered in the final step of the casting operation, the magnetic force acting on the conductive member is reduced to reduce the braking force acting on the spool differently from the conventional spool rotational-speed control means which uses only magnetic force and similarly to the conventional spool rotational-speed control means which uses only frictional force generated by the centrifugal force. Thus, the reduction in the unreeling speed of the fishing line from the spool can be prevented.

As described above, the fishing reel according to the present invention has the structure that the rotational speed of the spool which takes place when the fishing line is unreeled in the initial step immediately after the casting operation has been started and in the final step is higher than that realized by the fishing reel using the conventional spool rotational-speed control means which uses only magnetic force. Moreover, time required for the maximum number of revolutions to reach the maximum number of revolutions in the intermediate period (the period in which the spool is rotated at high speed) which is after the period in which the rotational speed of the spool is rapidly raised immediately after the start of the casting operation and in which the rotational speed of the spool is raised maximally. The maximum number of revolutions of the spool is, of course, higher than that of the fishing reel using the conventional spool rotational-speed control means which uses only frictional force generated by the centrifugal force. The maximum number of revolutions is raised as compared with the fishing reel using the conventional spool rotational-speed control means which uses only magnetic force because high rotational speed of the spool is realized in the initial step immediately after the casting operation has been started.

Therefore, the distance for which the tackle can be thrown in the overall period in the casting operation from the initial step immediately after start of the casting operation to the final step can be elongated as compared with the fishing reel using the conventional spool rotational-speed control means which uses only frictional force generated by the centrifugal force and the fishing reel using the conventional spool rotational-speed control means which uses only magnetic force.

Moreover, the braking force acting on the spool in the final step of the casting operation with the fishing reel according to the present invention is not rapidly reduced and moderately reduced differently from the fishing reel using the conventional spool rotational-speed control means which uses only frictional force generated by the centrifugal force. Therefore, excessive rotation phenomenon of the spool with respect to the unreeling speed of the fishing line which causes the backlash of the fishing line in the final step of the casting operation can be prevented. Therefore, delicate control of the rotational speed of the spool by using the finger for the purpose of preventing backlash of the fishing line in the final step of the casting operation is not required.

After the tackle has reached the water surface and the tension of the fishing line pulled by the tackle has rapidly been reduced, there is apprehension that the excessive rotation phenomenon of the spool with respect to the pulling speed occurs and thus backlash of the fishing line takes place. After the tackle has reached the water surface and thus the pulling speed of the fishing line has rapidly been reduced, the rotations of the spool become regardless of the increase/decrease of the distance to be thrown. Therefore, prevention of the backlash of the fishing line by simply stopping the rotations of the spool is required. Therefore, control of the rotational speed of the spool with the finger for the purpose of preventing backlash of the fishing line can easily be performed even if the user is not a skilled person.

Moreover, the control-operation adjustment means may be operated to correspond to the situation of the fishing spot to raise/reduce the rotational speed of the spool so as to arbitrarily adjust the degree of the control which is performed by the spool rotational-speed control means.

It is preferable that the fishing reel according to the present invention characterized by the above-mentioned structure has an arrangement that either of the conductive member or the magnet approaches or moves apart from the conductive member or the magnet along the center line of the rotations of the spool in accordance with the rise/reduction in the rotational speed of the spool; and the control-operation adjustment means changes the shortest distance between the magnet and the conductive member in the direction along the center line of the rotations.

The above-mentioned structure is able to simplify the structures of the spool rotational-speed control means and the control-operation adjustment means.

It is preferable that the fishing reel according to the present invention characterized by the above-mentioned structure has an arrangement that the spool rotational-speed control means uses the centrifugal force which is changed in accordance with the rotational speed of the spool to change the magnetic force of the magnet which acts on the conductive member so as to control the rotational speed of the spool.

Also a spool rotational-speed control means using centrifugal force to change the magnetic force of a magnet which acts on the conductive member is able to appropriately control the rotational speed of the spool in a period immediately after the casting operation has been started to the final step. Thus, the distance for which the tackle can be thrown can be elongated and backlash can be prevented. Since the spool rotational-speed control means using the centrifugal force to change the magnetic force of the magnet which acts on the conductive member can easily be structured, breakdown can be prevented.

When either of the conductive member or the magnet approaches or moves away from the conductive member or the magnet along the center line of the rotations of the spool in accordance with the rise/reduction in the rotational speed of the spool and when the control-operation adjustment means changes the shortest distance between the magnet and the conductive member in the direction along the center line of the rotations, the spool rotational-speed control means may comprise a tapered inner surface formed at an end of the spool and having a large-diameter opening formed to face a portion of the reel body opposite to the end of the spool; a lengthwise-directional movable member disposed at an end of a spool shaft and permitted to move in a direction along the center line of rotation of the spool shaft; a radial-directional movable member movably supported by the lengthwise-directional movable member in the radial direction of the spool shaft and disposed opposite to the inner surface of the tapered shape at the end of the spool in the radial direction; and urging means for urging the lengthwise-directional movable member to be moved apart from the portion of the reel body opposite to the end of the spool, wherein either of the magnet or the conductive member is provided for the lengthwise-directional movable member and arranged to be moved together with the lengthwise-directional movable member, and the magnet or the conductive member which is not provided for the lengthwise-directional movable member is provided for the portion of the reel body opposite to the end of the spool.

When the spool rotational-speed control means :relatively moves either of the conductive member or the magnet to correspond to the rotational speed of the spool to change the area of the conductive member which traverses the magnetic flux generated by the magnet, the spool rotational-speed control means may comprise lengthwise-directional movable member disposed at an end of a spool shaft and permitted to move in a direction along the center line of rotation of the spool shaft; a tapered inner surface provided for the lengthwise-directional movable member and having a large-diameter opening formed to face an end of the spool from which an end of the spool shaft is allowed to project; a radial-directional movable member movably supported at an end of the spool shaft in the radial direction of the spool shaft and disposed opposite to the inner surface of the tapered shape of the lengthwise-directional movable member; urging means for urging the lengthwise-directional movable member to be moved apart from the portion of the reel body opposite to the end of the spool; a magnet or a conductive member provided for the lengthwise-directional movable member and arranged to be moved together with the lengthwise-directional movable member; and the magnet or the conductive member which is not provided for the lengthwise-directional movable member and which is provided for the portion of the reel body opposite to the end of the spool.

As a result, the centrifugal force generated in the radial-directional movable member when the spool has been rotated moves the radial-directional movable member to the outside portion in the radial direction so that the radial-directional movable member is brought into contact with the inner surface of the tapered shape of the lengthwise-directional movable member. As a result, the lengthwise-directional movable member is moved in the direction of the central line of the rotations of the spool shaft against the urging force of the urging means. The radial-directional movable member can be movably supported in the radial direction by a guide portion provided for the lengthwise-directional movable member or a member which is rotated together with the spool. Note that an example of the member which is rotated together with the spool is the end of the spool shaft.

The guide portion may be an opening, a groove or a rod. The radial-directional movable member may be a collar member having a guide groove or a guide opening which is movably engaged to the opening, groove or rod guide portion. The radial-directional movable member may be a simple sphere movably supported by the opening, groove or rod guide portion.

It is preferable that the fishing reel according to the present invention characterized by the above-mentioned structure may be arranged in such a manner that the control-operation adjustment means has a structure that either of the lengthwise-directional movable member or the spool shaft has a movement limiting member capable of changing the distance to a portion of the reel body opposite to the end of the spool in the lengthwise direction of the spool shaft to limit the movement of the lengthwise-directional movable member toward the portion of the reel body opposite to the end of the spool in the lengthwise direction of the spool shaft.

The above-mentioned movement limiting member has a simple structure.

The control-operation adjustment means of the fishing reel according to the present invention characterized by the above-mentioned structure may have a lengthwise-directional selective movement and connection means for selectively, relatively and movably connecting the conductive member provided for the lengthwise-directional movable member to the lengthwise-directional movable member in the lengthwise direction of the spool shaft.

The fishing reel according to the present invention characterized by the above-mentioned structure may have an arrangement that the control-operation adjustment means has conductive-member connection means provided for the lengthwise-directional movable member and capable of detachably connecting the conductive member. Moreover, a plurality of the conductive members having individual lengths in the lengthwise direction of the spool shaft are prepared to select a conductive member having a required length from the plural conductive members so as to connect the selected conductive member to the lengthwise-directional movable member through the conductive-member connection means.

BRIEF DESCRIPTION OF THE DRAWINGS

FIG. 9 is a partially-cut plan view showing a third embodiment of the fishing reel according to the present invention;

DETAILED DESCRIPTION OF THE PREFERRED EMBODIMENTS

Embodiments of a fishing reel according to the present invention will now be described with reference to the drawings.

First Embodiment

Referring to FIGS. 1 to 7, a first embodiment of the fishing reel according to the present invention will now be described.

In the cross sectional views, only outlines of the cross sections are shown and a portion of outlines apart from the cross section and which are not cross sections is omitted.

Figure 1:
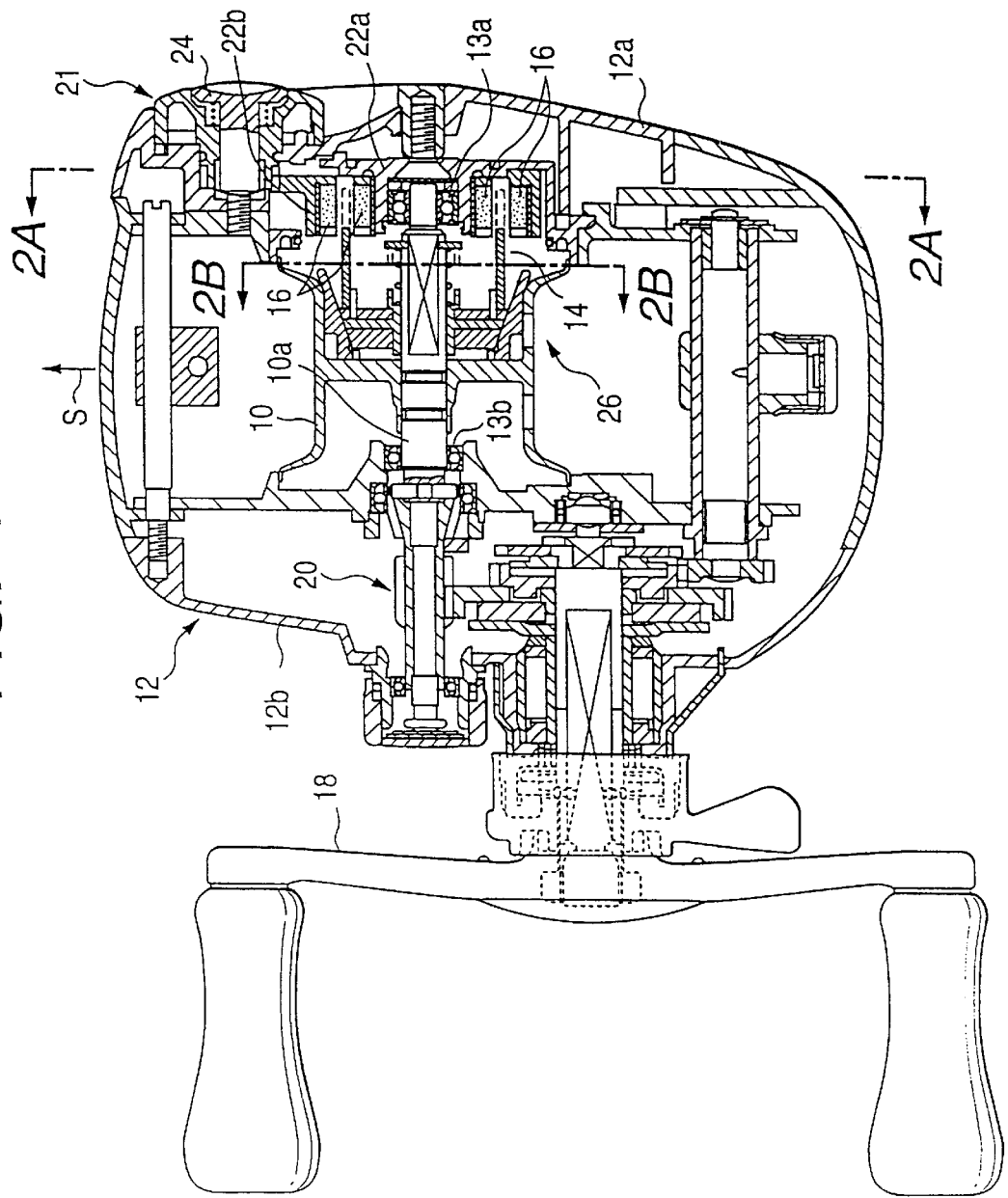
FIG. 1 is a horizontal cross sectional view schematically showing a first embodiment of a fishing reel according to the present invention.

As shown in FIG. 1, the fishing reel according to the first embodiment of the present invention comprises a spool 10 around which a fishing line (not shown) is wound in such a manner that the fishing line can be unreeled; and a reel body 12 for rotatively supporting two ends of a spool shaft 10a of the spool 10 through bearings 13a and 13b and rotatively holding the spool 10.

A conductive member 14 made of, for example, aluminum or copper, is disposed at an end of the spool shaft 10a at a position between an end surface of the spool 10 and a bearing 13a which rotatively supports an end (the right-hand end in FIG. 1) of the spool shaft 10a projecting over an end surface of the spool 10. A side wall 12a of the reel body 12 provided with a bearing 13a which rotatively supports an end of the spool shaft 10a is provided with a plurality of magnets 16 corresponding to the conductive member 14 at the end of the spool shaft 10a.

Another side wall 12b provided with a bearing 13b, which rotatively supports another end (the left-hand end in FIG. 1) of the spool shaft 10a projecting over another end surface of the spool 10 is provided with a rotative handle 18. Moreover, a clutch-equipped rotational-force transmission means 20 for selectively transmitting rotational force supplied from the handle 18 to another end of the spool shaft 10a is provided. The clutch-equipped rotational-force transmission means 20 will now be described. When a clutch is operated by depressing an operation button (not shown), selection of a state from two states is permitted one of which is a spool free rotation state in which free rotation of the spool shaft 10a is permitted to permit unreeling (an arrow S shown in FIG. 1 indicates a direction in which the fishing line is unreeled) of a fishing line (not shown). Another state is a spool operation state in which rotational force supplied from the handle 18 is transmitted to the spool 10 through another end of the spool shaft 10a so as to wind the fishing line (not shown) around the spool 10 in a direction opposite to the unreeling direction indicated with the arrow S shown in FIG. 1. Since the structure of the clutch-equipped rotational-force transmission means 20 is a known fact, the description of the structure is omitted here.

Figure 2A:
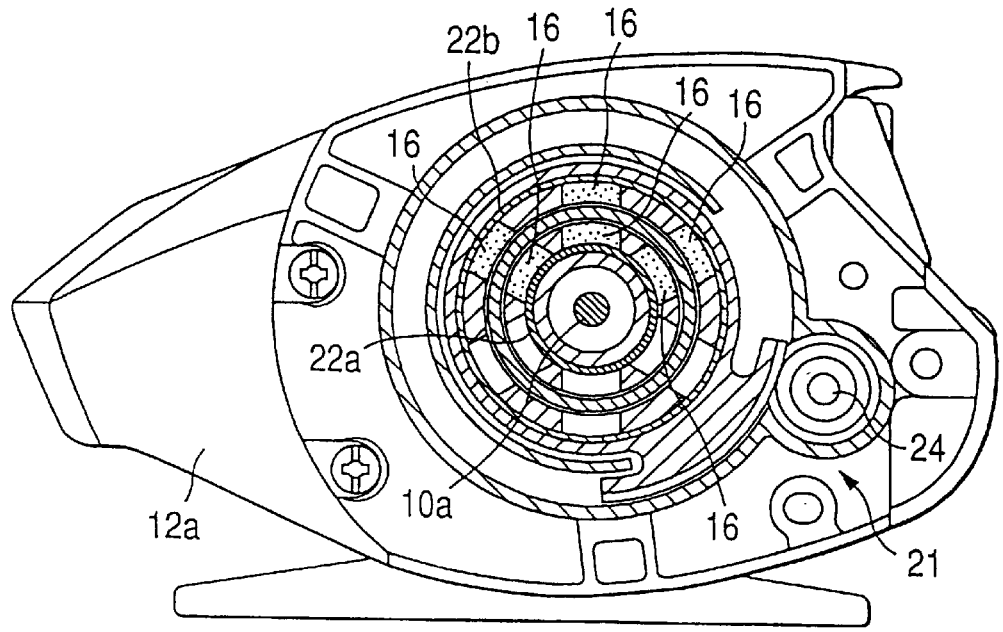
FIG. 2(A) is a horizontal cross sectional view taken along line 2A—2A shown in FIG. 2.

As shown in FIGS. 1 and 2(A), the plural magnets 16 are provided for the side wall 12a of the reel body 12 through a magnetic-force adjustment means 21 for adjusting the magnetic force of the magnets 16 which acts on the stationary conductive member 14. In this embodiment, the magnetic-force adjustment means 21 includes double annular rings 22a and 22b disposed concentrically with respect to the spool shaft 10a. The plural magnets 16 are disposed on the double annular rings 22a and 22b in such a manner that the magnets 16 are disposed apart from one another at predetermined intervals in the circumferential direction. The plurality of the magnets 16 of the inner annular ring 22a are disposed in such a manner that the magnetic poles facing outside in the radial direction of the inner annular ring 22a are different from each other. Also the plurality of the magnets 16 of the outer annular ring 22b are disposed in such a manner that the magnetic poles facing insides in the radial direction of the outer annular ring 22b are different from each other.

The inner annular ring 22a is secured to the side wall 12a. The outer annular ring 22b will now be described. When a magnetic force adjustment button 24 provided for the side wall 12a is rotated in a direction, the magnetic pole of the outer annular ring 22b opposite to the magnetic pole of the inner annular ring 22a is changed. Thus, the magnitude of the magnetic force which acts on the conductive member 14 is adjusted. That is, radial directional internal ends of the magnetic poles of the plural magnets 16 of the outer annular ring 22b which are different from the magnetic poles at the radial directional outer ends of the plural magnets 16 of the inner annular ring 22a are caused to face the magnetic poles at the radial directional outer ends of the plural magnets 16 of the outer annular ring 22b. Thus, a maximum attractive magnetic force state can be realized in which the radial directional outer end magnetic poles of the plural magnets 16 of the inner annular ring 22a and the radial direction inner end magnetic poles of the outer annular ring 22b generate maximum attractive magnetic forces. On the other hand, radial directional outer end magnetic poles of the plural magnets 16 of the inner annular ring 22a of the plural magnets 16 of the outer annular ring 22b are caused to face the radial direction inner end magnetic poles which are the same magnetic poles so that the radial directional outer end magnetic poles of the plural magnets 16 of the inner annular ring 22a and the radial directional inner end magnetic poles of the outer annular ring 22b generate maximum repulsive magnetic force. Thus, a maximum repulsive magnetic force state can be realized. The relative positions of the plural magnets 16 of the outer annular ring 22b are shifted with respect to the plural magnets 16 of the inner annular ring 22a between the above-mentioned two states. Thus, the magnitude of the magnetic force which acts on the conductive member 14 is adjusted to adjust the braking force which is applied to the spool 10.

As shown in FIG. 1, the conductive member 14 is disposed at the end of the spool shaft 10a through a spool rotational-speed control means 26 which changes the magnetic force of the plural magnets 16 of the side wall 12a of the reel body 12 which acts on the conductive member 14 in accordance with the rotational speed of the spool 10 so as to control the rotational speed of the spool 10 provided with the conductive member 14.

Figure 2B:
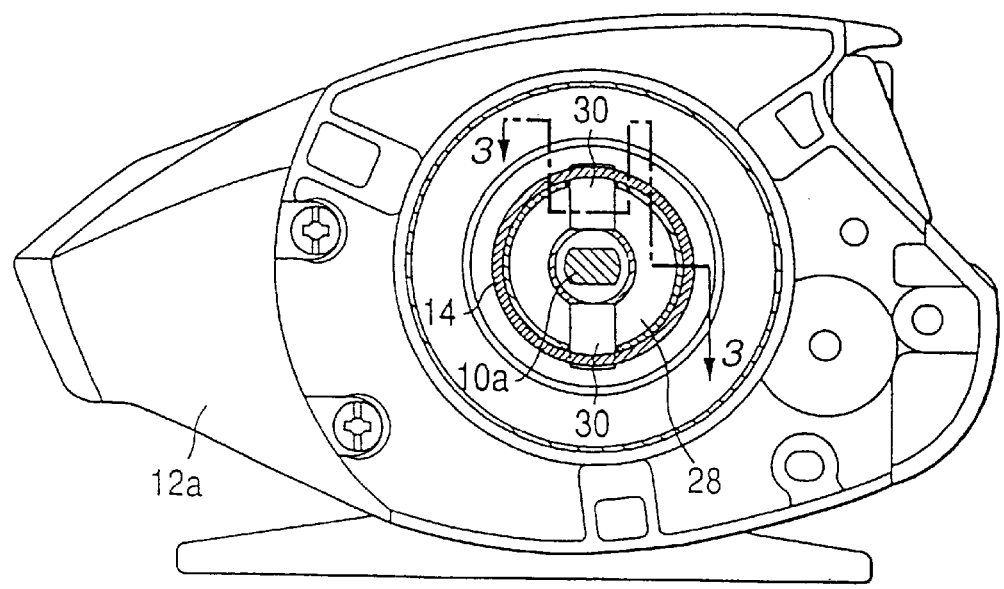
FIG. 2(B) is a schematic and horizontal cross sectional view taken along line 2B—2B shown in FIG. 1.
Figure 4:
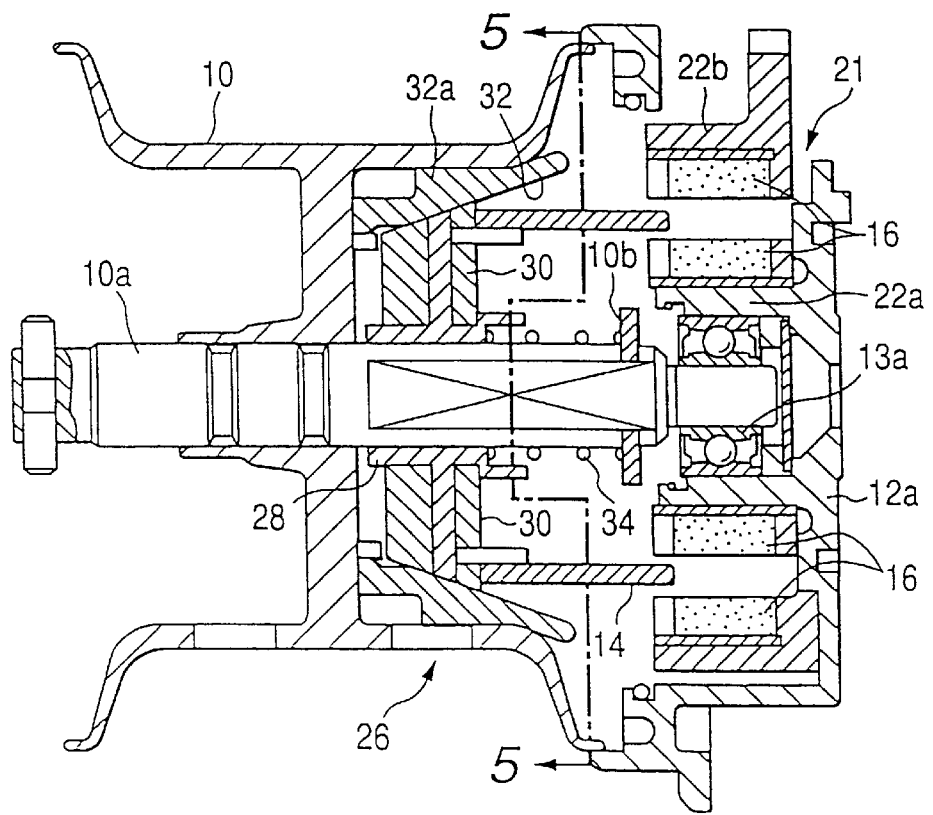
FIG. 4 is a schematic vertical cross sectional view showing an essential portion of the fishing reel shown in FIG. 1 in which a state from a moment at which a spool is not rotated to a moment at which the rotational speed of the spool reaches certain speed and a state in which the rotational speed of the spool has been reduced from the certain speed are shown.

As shown in FIGS. 4 and 2(B), the spool rotational-speed control means 26 is provided with a lengthwise-directional movable member 28 at an end of the spool shaft 10a. The spool rotational-speed control means 26 is able to move in a direction (a lengthwise direction) along the center line of rotations of the spool shaft 10a. The lengthwise-directional movable member 28 is rotated together with the spool shaft 10a in the circumferential direction of the spool shaft 10a. The conductive member 14 is formed into a cylindrical shape. An end of the conductive member 14 opposite to the magnets 16 of the conductive member 14 is secured to the lengthwise-directional movable member 28 concentrically to the spool shaft 10a.

In this embodiment, the conductive member 14 and the lengthwise-directional movable member 28 are individually formed, and then secured. However, the conductive member 14 and the lengthwise-directional movable member 28 may integrally be made of the material of the conductive member 14.

Free ends of the conductive member 14 secured to the lengthwise-directional movable member 28 are disposed opposite to an annular gap between the concentric double annular rings 22a and 22b of the side wall 12a of the reel body 12.

The lengthwise-directional movable member 28 has radial-directional movable members 30 movable in the radial direction of the spool shaft 10a and disposed apart from each other at predetermined intervals at plural positions (two positions in the first embodiment) of the spool shaft 10a.

Figure 3:
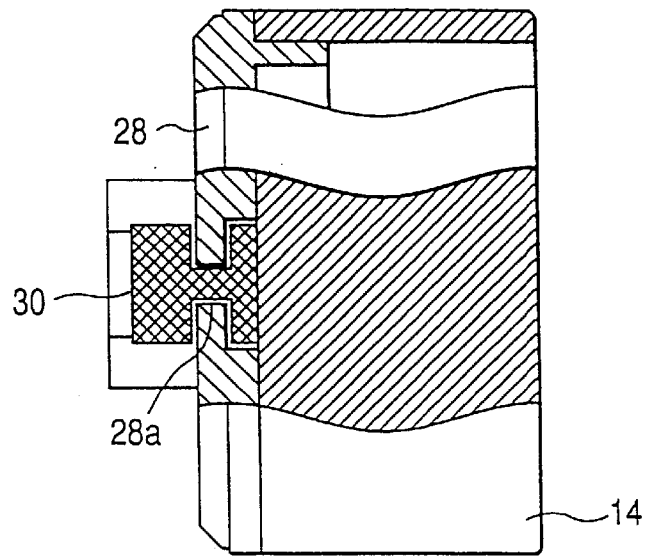
FIG. 3 is a plan view showing a lengthwise-directional movable member combined with the cylindrical conductive member and the radial-directional movable member shown in FIG. 2(B) in such a manner that a partially cut schematic horizontal cross section taken along line 3—3 is shown.
Figure 5:
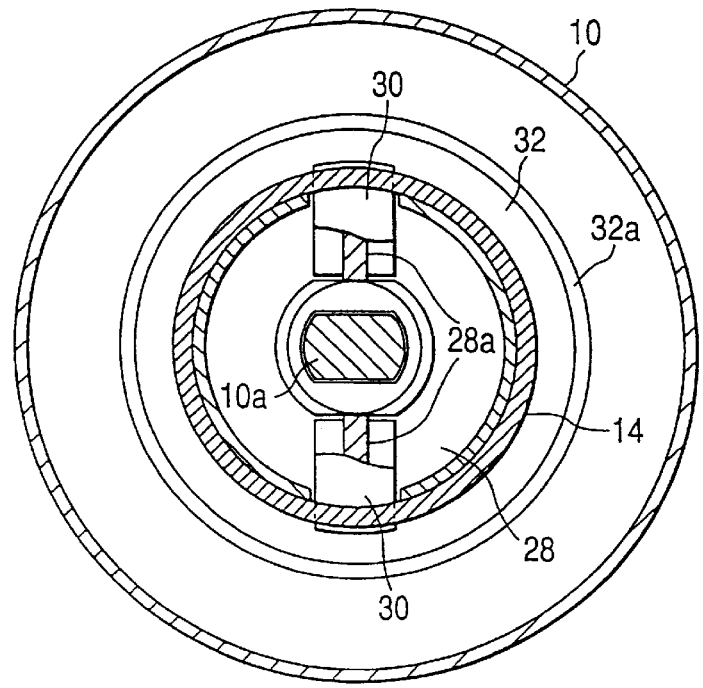
FIG. 5 is a horizontal cross sectional view taken along line 5—5 shown in FIG. 4.
Figure 6:
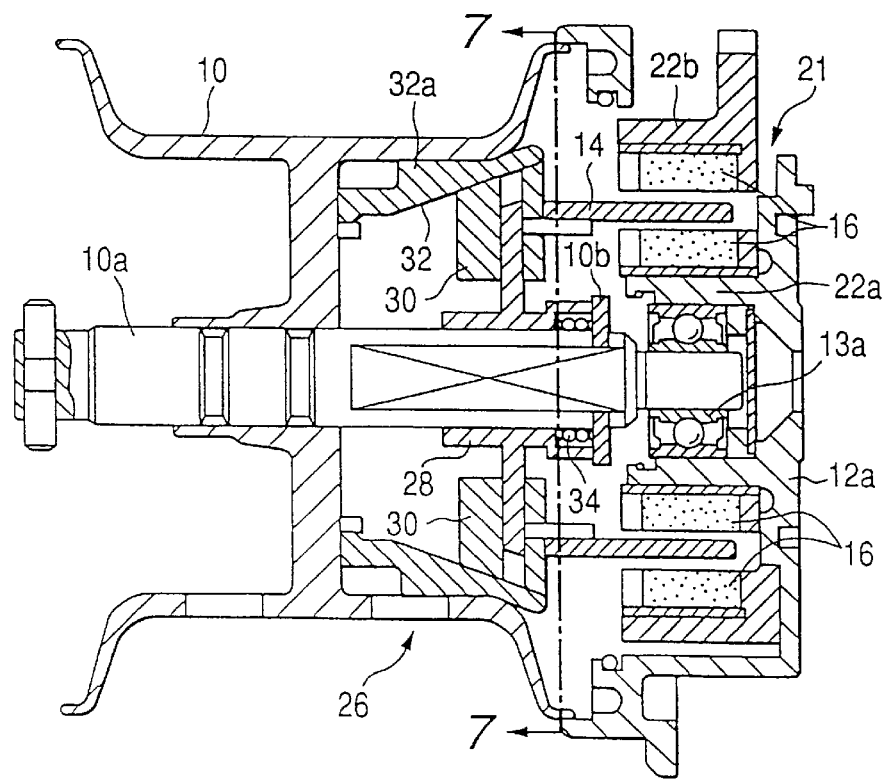
FIG. 6 is a schematic and vertical cross sectional view showing an essential portion of the fishing reel shown in FIG. 1 in which a state is shown in which the spool is being rotated at high speed higher than certain speed.

To support the radial-directional movable members 30 movably in the radial direction of the spool shaft 10a, the lengthwise-directional movable member 28 has guide holes 28a. The guide holes 28a are elongated in the radial direction of the spool shaft 10a and formed at plural positions (two positions in the first embodiment) apart from one another at predetermined intervals in the circumferential direction of the outer surface thereof, as shown in FIGS. 3 and 5. As shown in FIG. 3, each of the radial-directional movable members 30 has an H-shape horizontal cross section. When a central bridge-like portion of the radial-directional movable member 30 is received in a guide holes 28a, movements of the radial-directional movable members 30 along the guide holes 28a are permitted. That is, the guide holes 28a serve as guide portions for movably guiding the radial-directional movable members 30 in the radial direction of the spool shaft 10a. The plural radial-directional movable members 30 are able to cross the outer surface of the conductive member 14 along the corresponding guide holes 28a and move to further outside portions.

As shown in FIGS. 4 and 5, a tapered inner surface 32 is provided for the end surface at the end of the spool 10. The tapered inner surface 32 surrounds the plural radial-directional movable members 30 of the spool shaft 10a and has a large-diameter opening which faces the plural magnets 16 of the side wall 12a of the reel body 12 opposite to the plural radial-directional movable members 30 in the radial direction of the spool shaft 10a. The tapered inner surface 32 is formed concentrically with respect to the center line of rotations of the spool shaft 10a. The tapered inner surface 32 has a smooth surface having a small coefficient of friction. In this embodiment, the tapered inner surface 32 is formed individually from the spool 10. Then, the inner surface of the tapered inner surface 32 secured to the end surface at the end of the spool 10 is formed into a smooth surface having a small coefficient of friction. The tapered inner surface 32 may be formed by forming the inner surface of the end surface at the end of the spool 10 into a smooth surface having a small coefficient of friction.

As shown in FIG. 4, the lengthwise-directional movable member 28 provided with the conductive member 14 is urged by an urging means 34 so as to be moved apart from the plural magnets 16 of the side wall 12a of the reel body 12 facing the end surface of the spool 10 at the end of the spool shaft 10a. In this embodiment, the urging means 34 is a compression coil spring wound around a portion at the end of the spool shaft 10a between the lengthwise-directional movable member 28 and an engagement member 10b, which is a stopper ring or a washer, disposed adjacent to the bearing 13a which rotatively supports the end of the spool shaft 10a.

As shown in FIG. 4, the lengthwise-directional movable member 28 urged by the urging means 34 is disposed adjacent to the end surface of the spool 10 at the end of the spool shaft 10a. The radial-directional movable members 30 on the lengthwise-directional movable member 28 are adjacent to the tapered inner surface 32 of the end surface of the spool 10 and the smallest opening.

The operation of the fishing reel according to the first embodiment having the above-mentioned structure will now be described.

When a fishing rod having the fishing reel according to the first embodiment is swung for performing a casting operation, a tackle (not shown) which flies toward a target position on the water surface pulls a fishing line (not shown). Thus, the spool 10 starts rotating in a predetermined direction.

The centrifugal force which is generated in the radial-directional movable members 30 which is rotated together with the spool shaft 10a is weak in the initial stage immediately after the casting operation has been started until the rotational speed of the spool 10 reaches predetermined speed. The force which is generated when the radial-directional movable members 30 is pressed against the tapered inner surface 32 by the centrifugal force and which acts in a direction opposite to the urging force of the urging means 34 is smaller than the urging force of the urging means 34. Therefore, the lengthwise-directional movable member 28 cannot approach the plural magnets 16 of the side wall 12a of the reel body 12. Thus, the free end of the cylindrical conductive member 14 secured to the lengthwise-directional movable member 28 is not introduced into the annular gap between the double annular rings 22a and 22b provided with the plural magnets 16 of the side wall 12a of the reel body 12. Therefore, no eddy current is generated in the conductive member 14 because of the magnetic force of the plural magnets 16. Thus, no braking force is generated in the spool 10 which is rotated together with the conductive member 14. Even if a small eddy current is generated in the conductive member 14 by dint of a leaked magnetic flux from the plural magnets 16, the braking force generated because of the small eddy current is extremely small.

Therefore, substantially no braking force acts in the initial stage immediately after the casting operation has been started until the rotational speed of the spool 10 reaches certain speed. Therefore, the initial rotational speed of the spool 10 can be raised. As a result, the distance for which the tackle can be thrown can be elongated in the overall period from a moment at which the casting operation has been started to the end of the casting operation. As a matter of course, the rotational speed of the spool 10 which can be raised in the overall period is higher than the rotational speed which can be realized by a conventional fishing reel comprising the spool rotational-speed control means using the braking force which is generated by the centrifugal force. Moreover, the rotational speed according to this embodiment is higher than a conventional fishing reel comprising a spool rotational-speed control means using only magnetic force. The reason for this lies in that the braking force which is generated by the magnetic force is enlarged in substantially proportion to the rise in the rotational speed of the spool 10 from the moment at which the rotation of the spool 10 has been started in the case of the conventional fishing reel comprising the spool rotational-speed control means using only the magnetic force. As a matter of course, the distance for which the tackle (not shown) can be thrown can be elongated in the initial stage immediately after the casting operation has been started until the rotational speed of the spool 10 reaches certain speed as compared with the conventional fishing reel comprising the spool rotational-speed control means using only the frictional force generated by the centrifugal force. The distance can be elongated as compared with the conventional fishing reel comprising the spool rotational-speed control means using only magnetic force.

Figure 7:
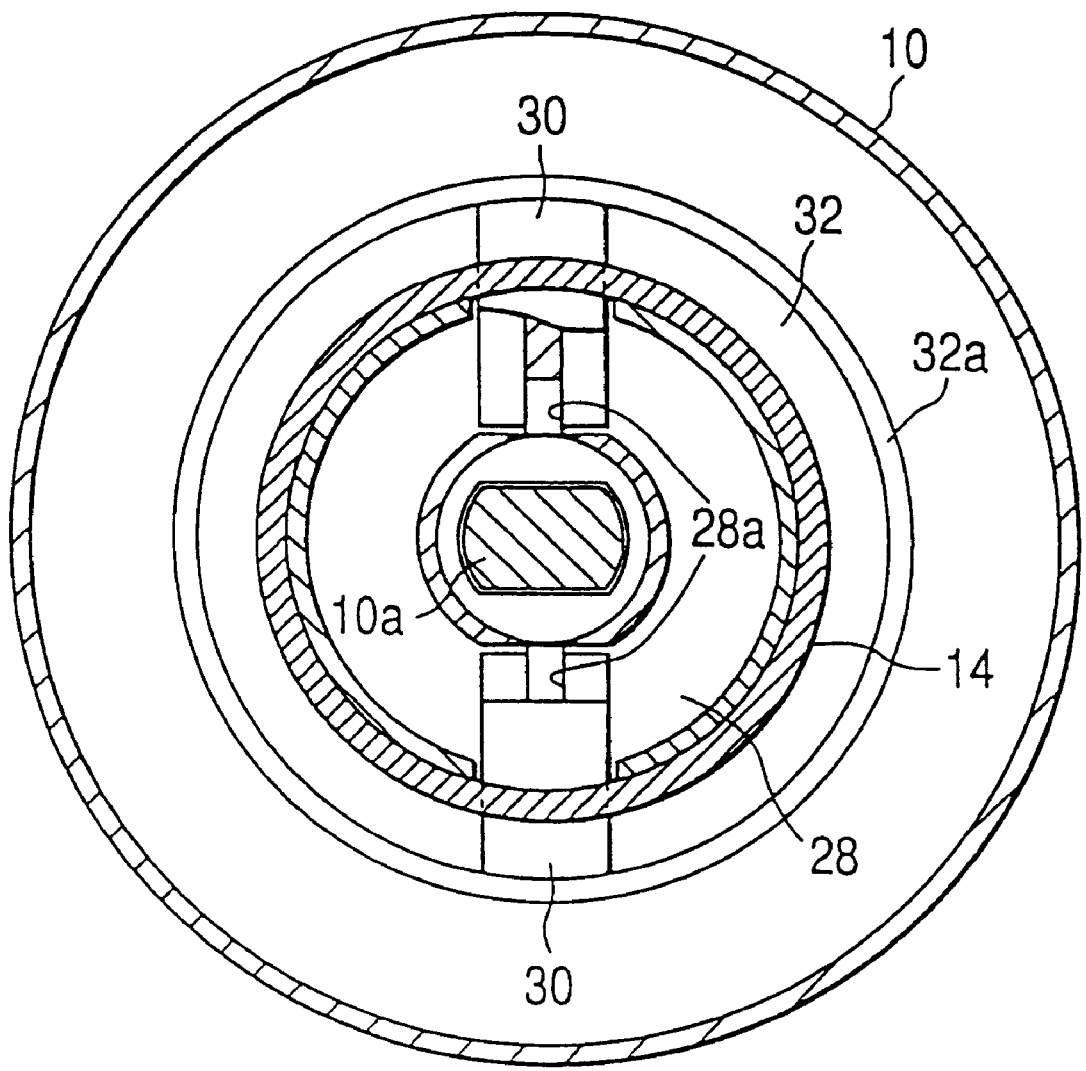
FIG. 7 is a schematic and horizontal cross sectional view taken along line 7—7 shown in FIG. 6.

In an intermediate period of the casting operation, the rotational speed of the spool 10 is reached certain speed. In this period, the force which is generated because the radial-directional movable members 30, which is rotated together with the spool shaft 10, is pressed against the tapered inner surface 32 by dint of the centrifugal force and which acts in a direction opposite to the urging force of the urging means 34 in the axial direction along the spool shaft 10a is made to be larger than the urging force of the urging means 34. As the rotational speed of the spool 10 exceeding certain speed is enlarged, the radial-directional moveable members 30 is moved along the tapered inner surface 32 to the outside in the radial direction as shown in FIG. 7. Moreover, the lengthwise-directional movable member 28 is caused to overcome the urging force of the urging means 34 to gradually approach the plural magnets 16 of the side wall 12a of the reel body 12. As a result, the free end of the cylindrical conductive member 14 secured to the lengthwise-directional movable member 28 is gradually introduced into the annular gap between the double annular rings 22a and 22b provided with the plural magnets 16 of the side wall 12a of the reel body 12. Thus, the amount of superimposition between the double annular rings 22a and 22b and the magnets 16 is enlarged. It leads to a fact that the area of the conductive member 14 which traverses the magnetic flux generated by the plural magnets 16 is gradually enlarged.

As a result, the level of the eddy current generated in the conductive member 14 by dint of the magnetic force of the plural magnets 16 is enlarged in proportion to the area of the conductive member 14 which traverses the magnetic flux generated by the plural magnets 16 and the rotational speed of the spool 10. Also the braking force generated by the eddy current is enlarged in proportion to the area of the conductive member 14 which traverses the magnetic flux generated by the plural magnets 16 and the rotational speed of the spool 10.

Similarly to the conventional fishing reel comprising the spool rotational-speed control means using only the magnetic force, the braking force which can be generated by the structure according to this embodiment is smaller than that generated by the conventional fishing reel comprising the spool rotational-speed control means using the frictional force generated by the centrifugal force. Therefore, the rotational speed of the spool in the initial stage of the casting operation is higher than that of the conventional fishing reel comprising the spool rotational-speed control means using only the magnetic force. Therefore, also the rotational speed in a period from the initial stage to the intermediate stage of the casting operation is higher than that of the conventional fishing reel comprising the spool rotational-speed control means using only the magnetic force. As a matter of course, the rotational speed is significantly higher than that of the conventional fishing reel comprising the spool rotational-speed control means using the frictional force generated by the centrifugal force.

That is, the distance for which the tackle (not shown) can be thrown in a period from the initial stage of the casting operation to the intermediate stage in which the rotational speed of the spool 10 has reached certain speed can be elongated as compared with the conventional fishing reel comprising the spool rotational-speed control means using only the magnetic force and the conventional fishing reel comprising the spool rotational-speed control means using only the frictional force generated by the centrifugal force.

Moreover, excessive rotational speed of the spool 10 which causes critical backlash at a late time can satisfactorily be prevented by dint of an appropriate braking effect obtainable from the combination of the conductive member 14 of the spool 10 and the plural magnets 16 of the side wall 12*a* of the reel body 12.

When the rotational speed of the spool 10 has been reduced and the centrifugal force generated in the radial-directional movable members 30 which is rotated together with the spool shaft 10*a* has been weakened in the final stage of the casting operation, the force which is generated because the radial-directional movable members 30 is pressed against the tapered inner surface 32 by dint of the centrifugal force and which acts on the direction opposite to the urging force of the urging means 34 is made to be smaller than the urging force of the urging means 34. Thus, the lengthwise-directional movable member 28 is, by the urging force of the urging means 34, pushed in a direction apart from the plural magnets 16 of the side wall 12*a* of the reel body 12. The free end of the cylindrical conductive member 14 secured to the lengthwise-directional movable member 28 is gradually removed from the annular gap between the double annular rings 22*a* and 22*b* provided with the plural magnets 16 of the side wall 12*a* of the reel body 12. Thus, the area of the conductive member 14 which traverses the magnetic flux generated by the plural magnets 16 is gradually reduced.

As a result, the level of the eddy current generated in the conductive member 14 by dint of the magnetic force of the plural magnets 16 is reduced in proportion to the area of the conductive member 14 which traverses the magnetic flux generated by the plural magnets 16 and the rotational speed of the spool 10. Also the braking force generated by the eddy current is reduced in proportion to the area of the conductive member 14 which traverses the magnetic flux generated by the plural magnets 16 and the rotational speed of the spool 10.

The braking force according to this embodiment is smaller than that which is generated by the conventional fishing reel comprising the spool rotational-speed control means using only the magnetic force. Moreover, rapid reduction in the braking force can be prevented which takes place with the conventional fishing reel comprising the spool rotational-speed control means using the frictional force generated by the centrifugal force. Therefore, the rotational speed of the spool in the final period of the casting operation is higher than the rotational speed which can be realized by the conventional fishing reel comprising the spool rotational-speed control means using only the magnetic force. Moreover, the rapid reduction in the reduction ratio of the rotational speed can be prevented which takes place with the conventional fishing reel comprising the spool rotational-speed control means using the frictional force generated by the centrifugal force.

That is, the distance for which the tackle (not shown) can be thrown in the final period of the casting operation in which the rotational speed of the spool 10 has gradually be reduced can be elongated as compared with that of the conventional fishing reel comprising the spool rotational-speed control means using only the magnetic force and that of the conventional fishing reel comprising the spool rotational-speed control means using only the frictional force generated by the centrifugal force.

Moreover, the excessively high rotational speed of the spool 10 which cause critical backlash with respect to the flying speed of the tackle at a later time is appropriately restrained in the intermediate period of the casting operation. The rapid reduction in the reduction ratio of the rotational speed of the spool 10 which takes in the final stage of the casting operation with the conventional fishing reel comprising the spool rotational-speed control means using only the frictional force generated by the centrifugal force can be prevented. If there is apprehension that the backlash phenomenon of the fishing line (not shown) takes place because of rapid reduction in the pulling speed of the fishing line which occurs because the tackle (not shown) reaches the water surface and inertia of the rotations of the spool 10 after the tackle (not shown) has reached the water surface, only a simple operation which can be performed by a person which is not skilled in the casting operation is required to prevent the backlash phenomenon. The operation is performed in such a manner that, for example, the spool or the surface of the fishing line wound around the spool is pressed by, for example, the finger. Therefore, the operation for unreeling the fishing line for performing casting can easily be performed.

Second Embodiment

Figure 8A:
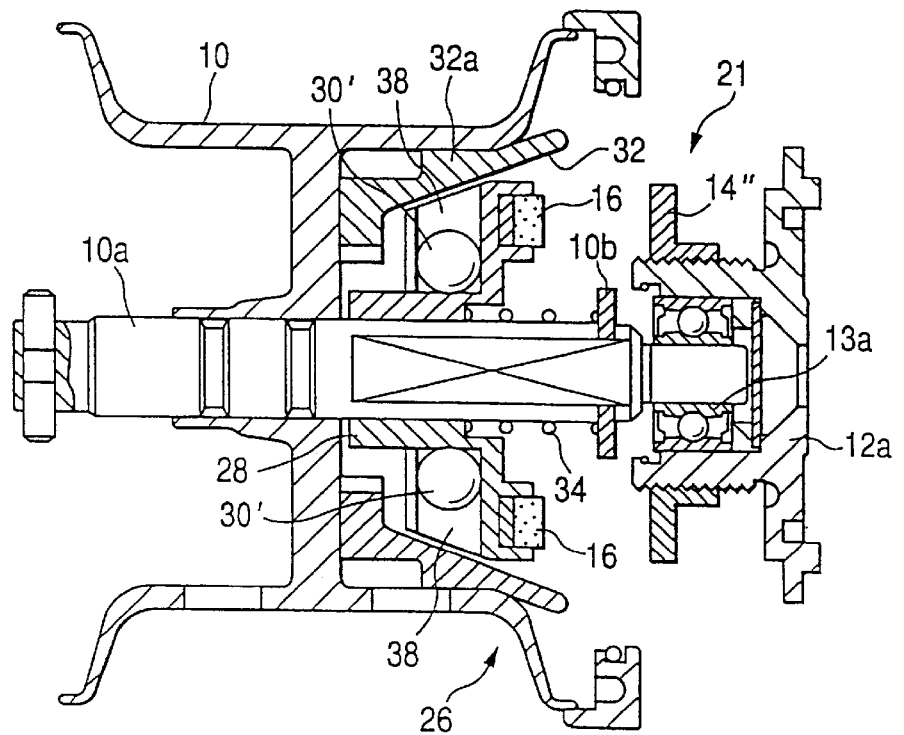
FIG. 8(A) is a schematic and vertical cross sectional view showing an essential portion of the fishing reel according to a second embodiment of the present invention in which a state in which the spool is not rotated and state in which the spool is being rotated at relatively low speed are shown.
Figure 8B:
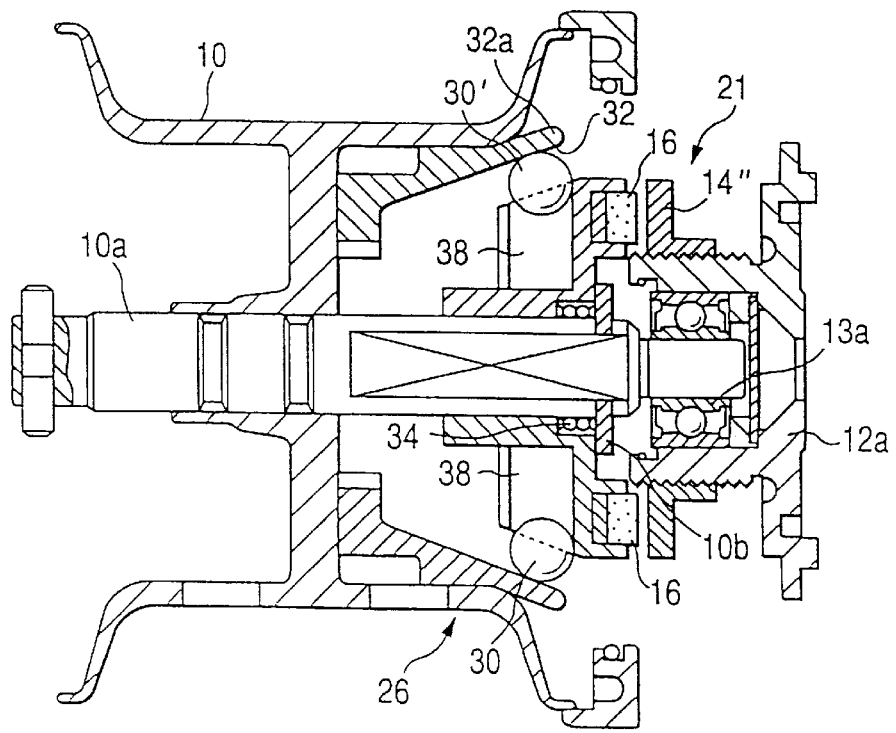
FIG. 8(B) is a schematic and vertical cross sectional view showing an essential portion of the fishing reel shown in FIG. 8(A) in which a state is shown in which the spool is being rotated at high speed higher than certain speed.

Referring to FIGS. 8A and 8B, a second embodiment of the fishing reel according to the present invention will now be described.

A major portion of the structure of the fishing reel according to the second embodiment of the present invention is the same as that of the fishing reel according to the first embodiment which has been described with reference to FIGS. 1 to 7. Therefore, the same elements as those of the first embodiment of the fishing reel are given the same reference numerals and the same elements are omitted from illustration.

The second embodiment is considerably different from the first embodiment in the positions of the plural magnets 16 and the annular conductive member 14". Specifically, the plural magnets 16 are provided for a portion of the lengthwise-directional movable member 28 according to the first embodiment which faces the side wall 12*a* of the reel body 12. The plural magnets 16 are disposed at the same intervals on concentric annular rings with respect to the center line of the rotations of the spool shaft 10a. Moreover, the annular conductive member 14" is disposed in a portion of the side wall 12a of the reel body 12 opposite to the plural magnets 16 of the lengthwise-directional movable member 28. The annular conductive member 14" is able to move in a direction along the center line of the rotations of the spool shaft 10a in a predetermined range so that the annular conductive member 14" forms a magnetic-force adjustment means 21.

When the annular conductive member 14" is moved in the direction along the center line in the predetermined range, the distance from the plural magnets 16 operation the lengthwise-directional movable member 28' which inhibits the movement in the direction along the center line of the rotations and the annular conductive member 14" can be changed within the predetermined range. Thus, magnitude of the magnetic force of the plural magnets 16 of the lengthwise-directional movable member 28' which inhibits the movement in the direction along the center line of the rotations on the annular conductive member 14" can be changed.

Third Embodiment

Referring to FIGS. 9 to 16B, a third embodiment of the fishing reel according to the projection will now be described.

Figure 10:
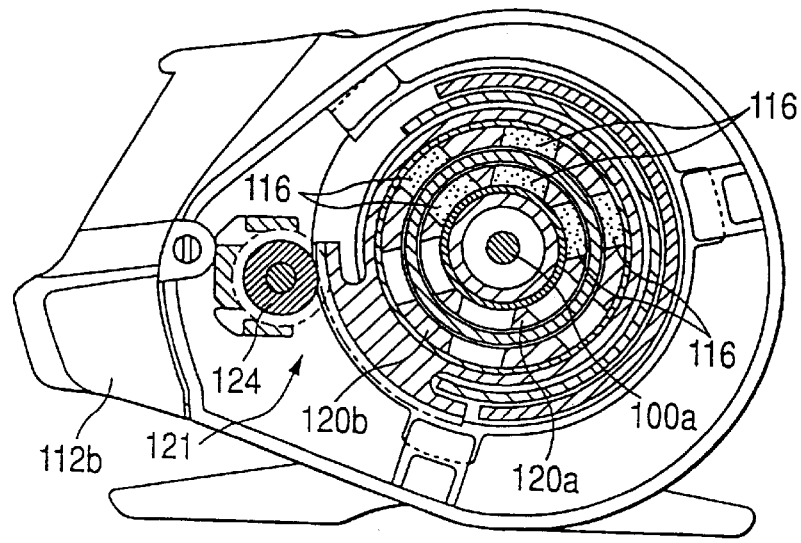
FIG. 10 is a horizontal cross sectional view taken along line 10—10 shown in FIG. 9.
Figure 11:
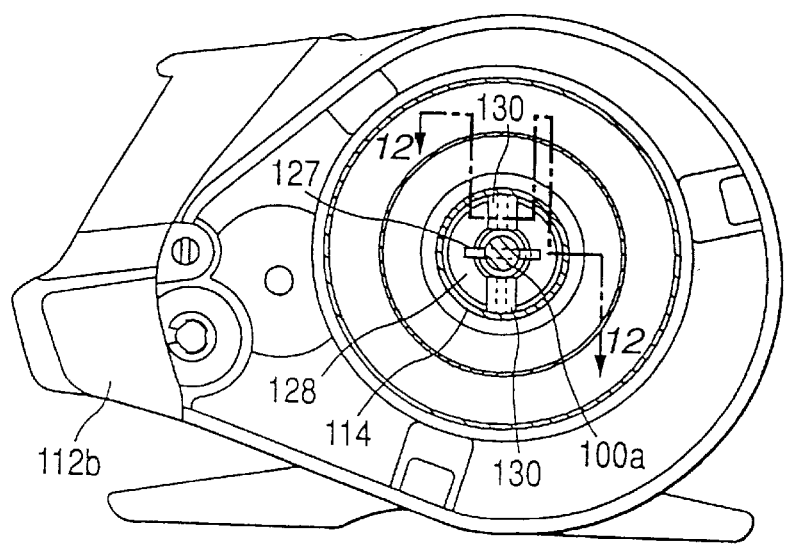
FIG. 11 is a schematic and horizontal cross sectional view taken along line 11—11 shown in FIG. 9.
Figure 12:
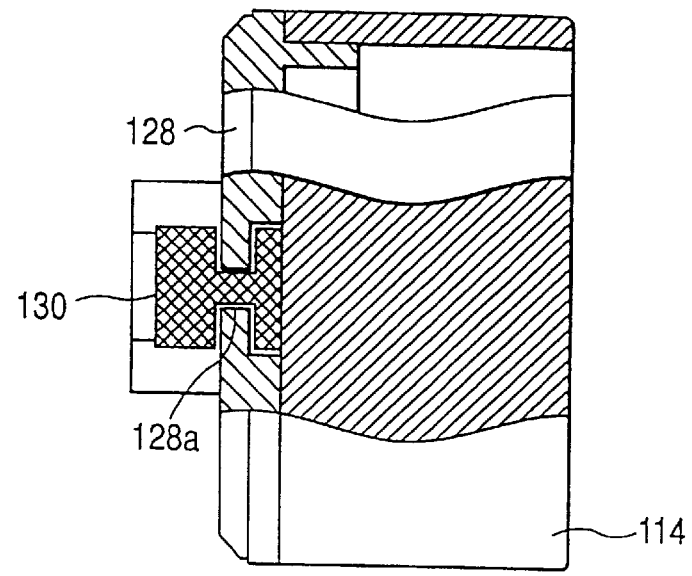
FIG. 12 is a plan view showing the lengthwise-directional movable member shown in FIG. 11 and combined with the cylindrical conductive member and the radial-directional movable member in such a manner that a partially-cut schematic and horizontal cross section taken along line 12—12 is shown.
Figure 13:
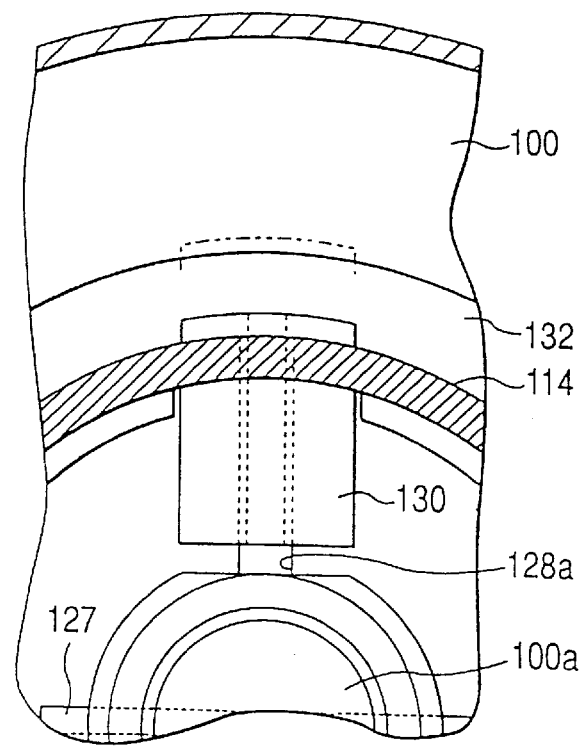
FIG. 13 is a partially-enlarged side view showing the combined lengthwise-directional movable member, the cylindrical conductive member and the radial-directional movable member shown in FIG. 11.
Figure 14A:
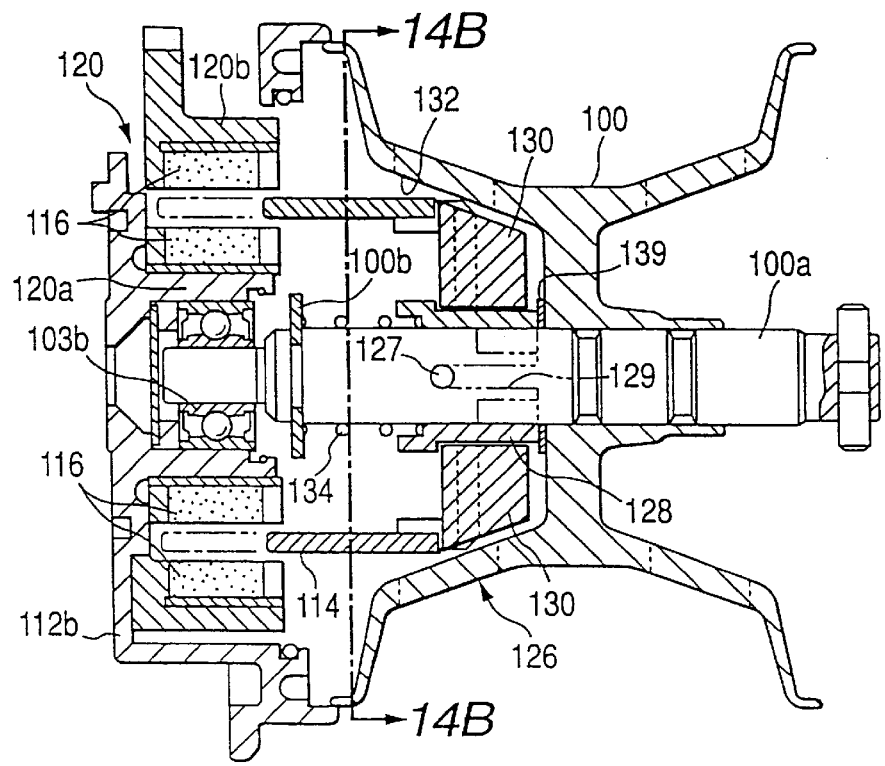
FIG. 14(A) is a schematic and horizontal cross sectional view showing an essential portion of the fishing reel shown in FIG. 9 in which a state from a moment at which the spool is not rotated and a moment at which the rotational speed of the spool reaches certain speed and a state in which the rotational speed of the spool has been reduced from certain speed are shown.
Figure 14B:
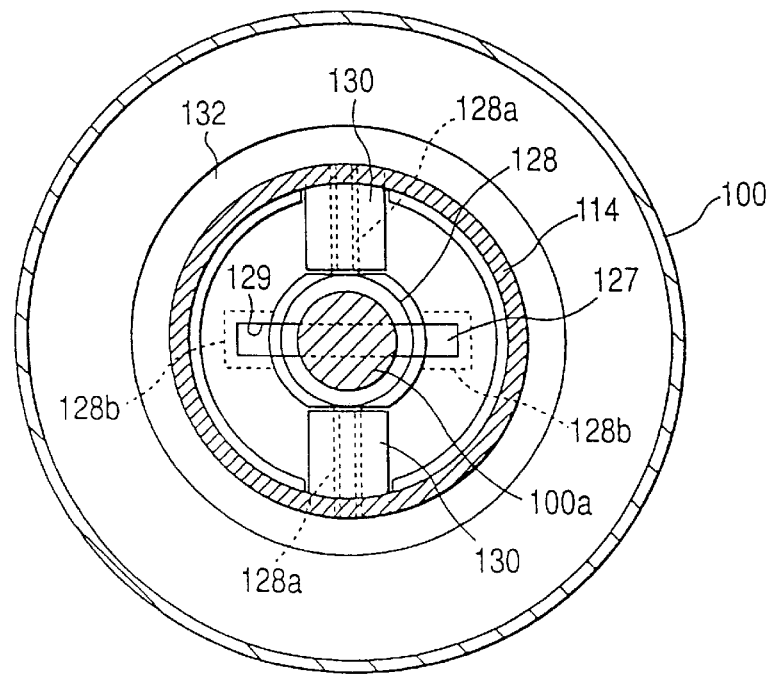
FIG. 14(B) is a horizontal cross sectional view taken along line 14B—14B shown in FIG. 14(A)
Figure 15A:
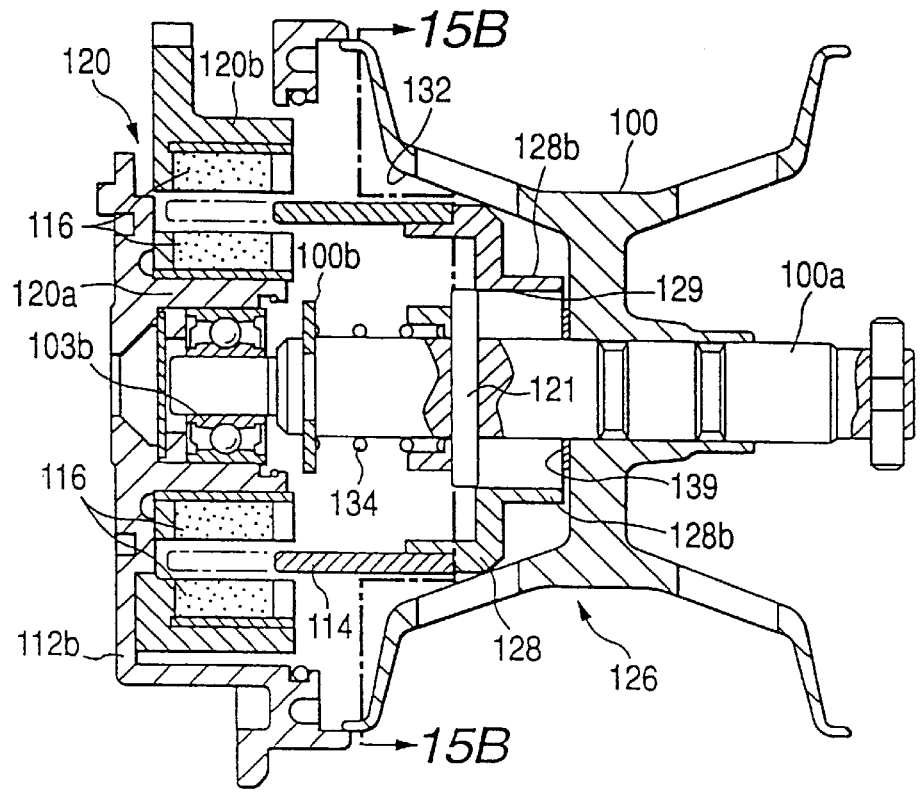
FIG. 15(A) is a vertical cross sectional view showing an essential portion of the fishing reel shown in FIG. 9 in which a state from a moment at which the spool is not rotated and a moment at which the rotational speed of the spool reaches certain speed and a state in which the rotational speed of the spool has been reduced from certain speed are shown.
Figure 15B:
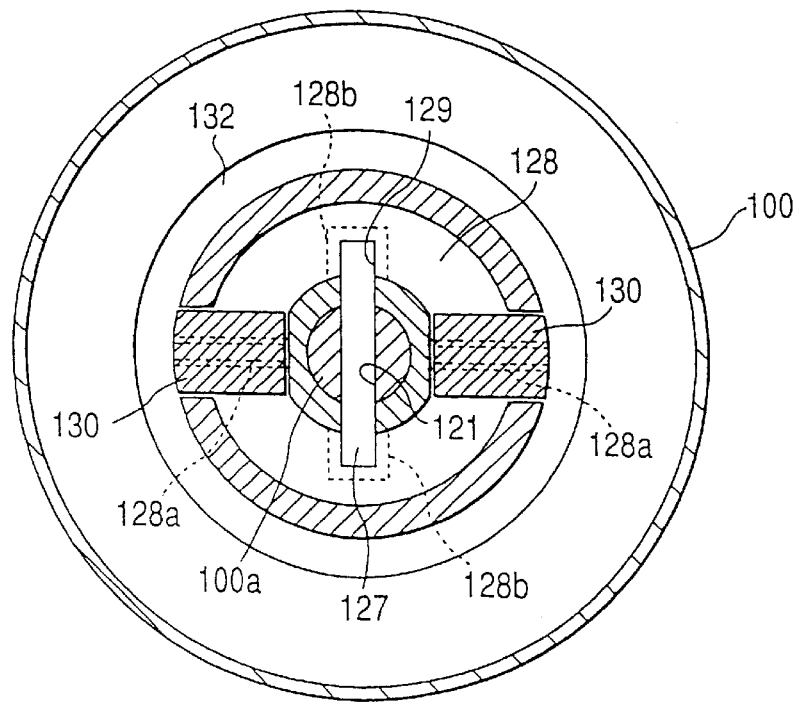
FIG. 15(B) is a horizontal cross sectional view taken along line 15B—15B shown in FIG. 15(A)
Figure 16A:
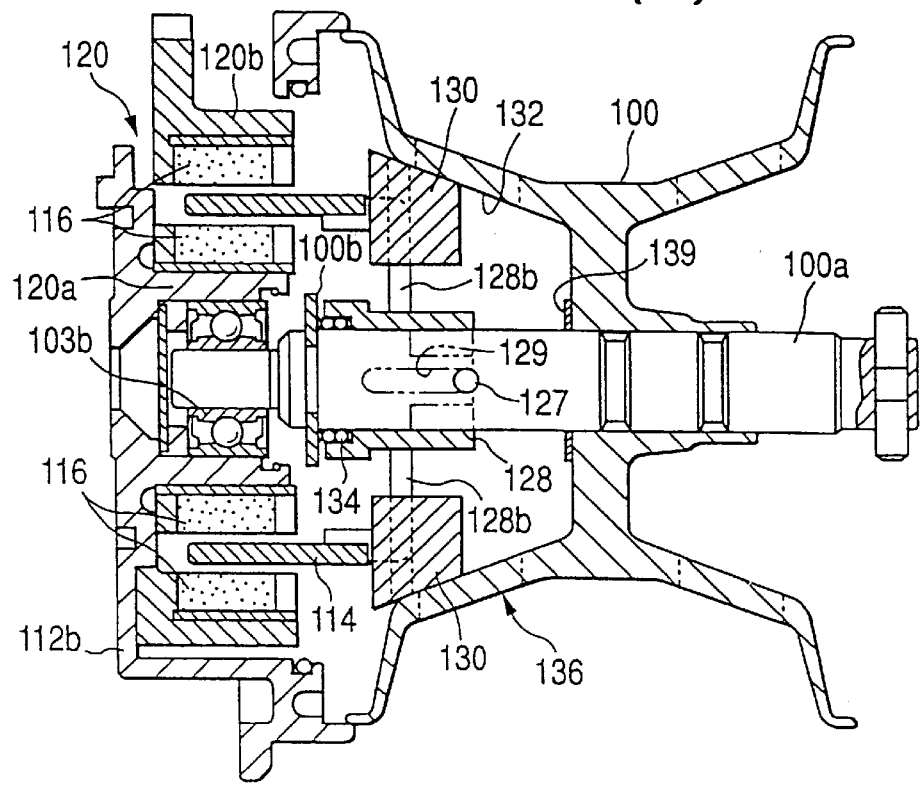
FIG. 16(A) is a horizontal cross sectional view showing an essential portion of the fishing reel shown in FIG. 9 in which a state is shown which is realized after the rotational speed of the spool has reached certain speed.
Figure 16B:
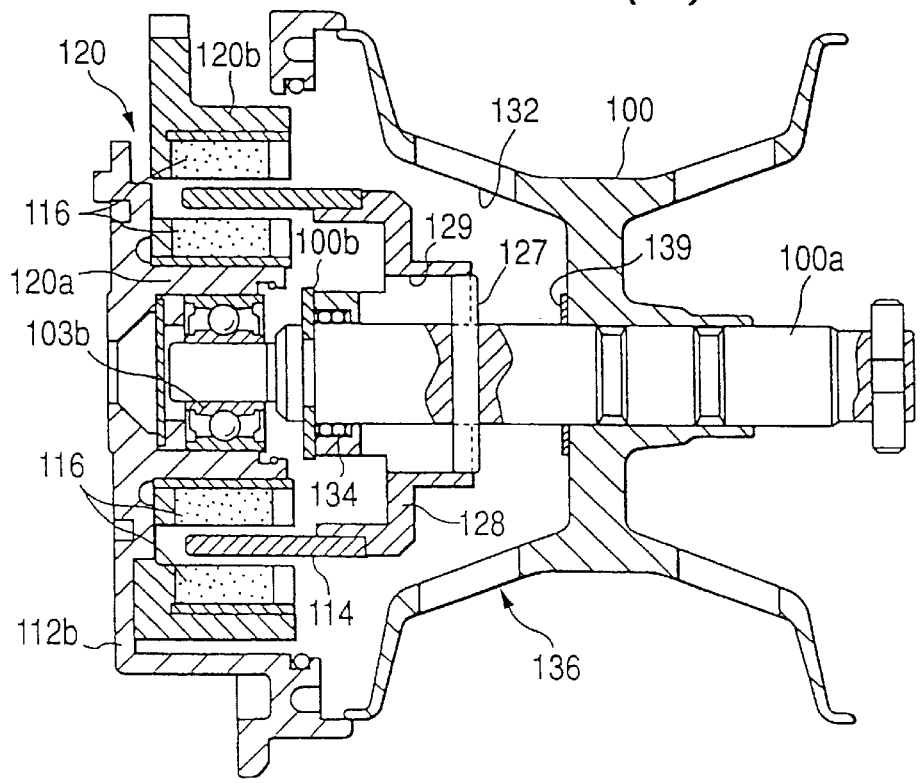
FIG. 16(B) is a schematic cross sectional view showing an essential portion of the fishing reel shown in FIG. 9 in which a state is shown which is realized after the rotational speed of the spool has reached certain speed.

FIG. 9 is a partially-cut plan view showing a third embodiment of the fishing reel according to the present invention. FIG. 10 is a horizontal cross sectional view taken along line 10—10 shown in FIG. 9. FIG. 11 is a schematic and horizontal cross sectional view taken along line 11—11 shown in FIG. 9. FIG. 12 is a plan view showing the lengthwise-directional movable member shown in FIG. 11 and combined with the cylindrical conductive member and the radial-directional movable member in such a manner that a partially-cut schematic and horizontal cross section taken along line 12—12 is shown. FIG. 13 is a partially-enlarged side view showing the combined lengthwise-directional movable member, the cylindrical conductive member and the radial-directional movable member shown in FIG. 11. FIG. 14(A) is a schematic and horizontal cross sectional view showing an essential portion of the fishing reel shown in FIG. 9 in which a state from a moment at which the spool is not rotated and a moment at which the rotational speed of the spool reaches certain speed and a state in which the rotational speed of the spool has been reduced from certain speed are shown. FIG. 14(B) is a horizontal cross sectional view taken along line 14B—14B shown in FIG. 14(A). FIG. 15(A) is a schematic vertical cross sectional view showing an essential portion of the fishing reel shown in FIG. 9 in which a state from a moment at which the spool is not rotated and a moment at which the rotational speed of the spool reaches certain speed and a state in which the rotational speed of the spool has been reduced from certain speed are shown. FIG. 15(B) is a horizontal cross sectional view taken along line 15B—15B shown in FIG. 15(A). FIG. 16(A) is a schematic horizontal cross sectional view showing an essential portion of the fishing reel shown in FIG. 9 in which a state is shown which is realized after the rotational speed of the spool has reached certain speed. FIG. 16(B) is a schematic cross sectional view showing an essential portion of the fishing reel shown in FIG. 9 in which a state is shown which is realized after the rotational speed of the spool has reached certain speed.

In the cross sectional views, only outlines of the cross sections are shown and a portion of outlines apart from the cross section and which are not cross sections is omitted.

As shown in FIG. 9, the fishing reel according to the third embodiment of the present invention comprises a spool 100 around which a fishing line (not shown) is wound in such a manner that the fishing line can be unreeled; and a reel body 112 for rotatively supporting two ends of a spool shaft 100a of the spool 100 through bearings 113a and 113b and rotatively holding the spool 100.

A conductive member 114 made of, for example, aluminum or copper, is disposed at an end of the spool shaft 100a at a position between an end surface of the spool 100 and a bearing 113b which rotatively supports an end (the left-hand end in FIG. 9) of the spool shaft 110a projecting over an end surface of the spool 100.

A side wall 112b of the reel body 112 provided with a bearing 113b which rotatively supports an end of the spool shaft 110a is provided with a plurality of magnets 116 corresponding to the conductive member 114 at the end of the spool shaft 100a.

Another side wall 112a provided with a bearing 113a, which rotatively supports another end (the left-hand end in FIG. 1) of the spool shaft 100a projecting over another end surface of the spool 100 is provided with a rotative handle 118. Moreover, a clutch-equipped rotational-force transmission means (not shown) for selectively transmitting rotational force supplied from the handle 118 to another end of the spool shaft 100a is provided. The clutch-equipped rotational-force transmission means (not shown) will now be described. When a clutch is operated by depressing an operation button (not shown), selection of a state from two states is permitted one of which is a spool free rotation state in which free rotation of the spool shaft 100a is permitted to permit unreeling (an arrow S shown in FIG. 9 indicates a direction in which the fishing line is unreeled) of a fishing line (not shown). Another state is a spool operation state in which rotational force supplied from the handle 118 is transmitted to the spool 100 through another end of the spool shaft 100a so as to wind the fishing line (not shown) around the spool 100 in a direction opposite to the unreeling direction indicated with the arrow S shown in FIG. 9. Since the structure of the clutch-equipped rotational-force transmission means (not shown) is a known fact, the description of the structure is omitted here.

As shown in FIGS. 9 and 10, the plural magnets 116 are provided for the side wall 112b of the reel body 102 through a magnetic-force adjustment means 120 for adjusting the magnetic force of the magnets 116 which acts on the stationary conductive member 114. In this embodiment the magnetic-force adjustment means 120 includes double annular rings 120a and 120b disposed concentrically with respect to the spool shaft 100a. The plural magnets 116 are disposed on the double annular rings 120a and 120b in such a manner that the magnets 116 are disposed apart from one another at predetermined intervals in the circumferential direction. The plurality of the magnets 116 of the inner annular ring 120a are disposed in such a manner that the magnetic poles facing outside in the radial direction of the inner annular ring 120a are different from each other. Also the plurality of the magnets 116 of the outer annular ring 120b are disposed in such a manner that the magnetic poles facing insides in the radial direction of the outer annular ring 120b are different from each other.

The inner annular ring 120a is secured to the side wall 112b. The outer annular ring 120b will now be described. When a magnetic force adjustment button 124 provided for the side wall 112b is rotated in a direction, the magnetic pole of the outer annular ring 120b opposite to the magnetic pole of the inner annular ring 120a is changed. Thus, the magnitude of the magnetic force which acts on the conductive member 114 is adjusted. That is, radial directional internal ends of the magnetic poles of the plural magnets 116 of the outer annular ring 120b which are different from the magnetic poles at the radial directional outer ends of the plural magnets 116 of the inner annular ring 120a are caused to face the magnetic poles at the radial directional outer ends of the plural magnets 116 of the outer annular ring 120b. Thus, a maximum attractive magnetic force state can be realized in which the radial directional outer end magnetic poles of the plural magnets 116 of the inner annular ring 120a and the radial direction inner end magnetic poles of the outer annular ring 120b generate maximum attractive magnetic forces. On the other hand, radial directional outer end magnetic poles of the plural magnets 116 of the inner annular ring 120a of the plural magnets 116 of the outer annular ring 120b are caused to face the radial direction inner end magnetic poles which are the same magnetic poles so that the radial directional outer end magnetic poles of the plural magnets 116 of the inner annular ring 120a and the radial directional inner end magnetic poles of the outer annular ring 120b generate maximum repulsive magnetic force. Thus, a maximum repulsive magnetic force state can be realized. The relative positions of the plural magnets 116 of the outer annular ring 120b are shifted with respect to the plural magnets 116 of the inner annular ring 120a between the above-mentioned two states. Thus, the magnitude of the magnetic force which acts on the conductive member 114 is adjusted to adjust the braking force which is applied to the spool 100.

As shown in FIG. 9, the conductive member 114 is disposed at the end of the spool shaft 100a through a spool rotational-speed control means 126 which changes the magnetic force of the plural magnets 116 of the side wall 112b of the reel body 112 which acts on the conductive member 114 in accordance with the rotational speed of the spool 100 so as to control the rotational speed of the spool 100 provided with the conductive member 114.

As shown in FIGS. 14(A) and 11, the spool rotational-speed control means 126 is provided with a lengthwise-directional movable member 128 at an end of the spool shaft 100a. The spool rotational-speed control means 126 is able to move in a direction (a lengthwise direction) along the center line of rotations of the spool shaft 10a.

Specifically, an engagement member, for example, an engagement pin 127 projects over a region of an outer surface at the end of the spool shaft 100a in which the lengthwise-directional movable member 128 is placed toward the outside in the radial direction of the spool shaft 100a. The lengthwise-directional movable member 128 is positioned movable in a direction (that is, the lengthwise direction) along the center line of the rotations of the spool shaft 100a on the outer surface of the spool shaft 10a. Moreover, the lengthwise-directional movable member 128 is rotative with respect to the outer surface in the circumferential around the center line of the rotations of the spool shaft 100a. An elongated hole 129 elongated in a direction (that is, the lengthwise direction) along the center line of the rotations of the spool shaft 100a is provided for the lengthwise-directional movable member 128. The elongated hole 129 is formed from an end surface opposite to the end surface of the spool 100 corresponding to the end of the spool shaft 100a in a direction away from the end surface of the spool 100. When the engagement member, for example, the engagement pin 127 on the outer surface at the end of the spool shaft 100a is inserted into the elongated hole 129 of the lengthwise-directional movable member 128 as shown in FIG. 14(A), the lengthwise-directional movable member 128 is made to be movable in a direction (the lengthwise direction) along the center line of the rotations of the spool shaft 100a on the outer surface at the end of the spool shaft 100a. Moreover, the lengthwise-directional movable member 128 is able to rotate together with the spool shaft 100a in the circumferential of the spool shaft 10a.

Description will now be described about the structure for connecting the lengthwise-directional movable member 128 which is movable in the direction (in the lengthwise direction) along the center line of the rotations of the spool shaft 10a at the end of the spool shaft 100a and which is rotative together with the spool shaft 100a in the circumferential direction of the spool shaft 10a. A flat portion extending in the direction (in the lengthwise direction) along the center line of the rotations of the spool shaft 100a is provided for the outer surface at the end of the spool shaft 100a. Moreover, a flat portion extending in the direction (in the lengthwise direction) along the center line of the rotations of the spool shaft 100a is provided for the inner surface of the lengthwise-directional movable member 128 which is used to cover the outer surface at the end of the spool shaft 100a. Thus, the inner surface of the lengthwise-directional movable member 128 is placed to cover the outer surface at the end of the spool shaft 100a in a state in which the flat portion of the outer surface at the end of the spool shaft 100a and the flat portion of the inner surface of the lengthwise-directional movable member 128 are made to coincide with each other. Thus, a so-called "slot structure" is constituted.

If the "slot structure" is subjected to a comparison with the combination structure according to this embodiment in which the engagement member, for example, the engagement pin 127 on the outer surface at the end of the spool shaft 100a and the elongated hole 129 of the lengthwise-directional movable member 128, the "slot structure" consumes time and labor. The reason for this lies in that the width of the flat portion of the outer surface at the end of the spool shaft 100a and the width of the flat portion of the inner surface of the lengthwise-directional movable member 128 must be made to precisely coincide with each other. Therefore, a large machining cost is required. If the precise coincidence cannot be realized, a gap is generated between the flat portion of the outer surface at the end of the spool shaft 100a and the flat portion of the inner surface of the lengthwise-directional movable member 128. It leads to a fact that the rotations of the lengthwise-directional movable member 128 in the circumferential direction on the outer surface at the end of the spool shaft 100a encounters so-called looseness. What is worse, also movement of the lengthwise-directional movable member 128 in the direction along the direction (the lengthwise direction) of the center line of the rotations of the spool shaft 100a on the outer surface at the end of the spool shaft 100a encounters so-called looseness.

As compared with the above-mentioned "slot structure", this embodiment employs the combination structure of the engagement member, for example, the engagement pin 127 on the outer surface at the end of the spool shaft 100a and the elongated hole 129 of the lengthwise-directional movable member 128. The outer surface at the end of the spool shaft 100a and the inner surface of the lengthwise-directional movable member 128 may have the circular cross sectional shapes. Therefore, the dimension accuracy can easily be improved. The engagement member, for example, the engagement pin 127 is projected over and secured to the outer surface at the end of the spool shaft 100a, as shown in FIGS. 15(A) and 15(B). That is, a through hole 121 elongated in the direction of the diameter of the spool shaft 100a is formed in the outer surface at the end of the spool shaft 100*a*. The engagement member, for example, the engagement pin 127 allowed to penetrate the through hole 121 is secured by a known securing means, such as an adhesive agent or by welding. Also the operation for forming the elongated hole 129 in the lengthwise-directional movable member 128 can easily and precisely be performed from outside of the lengthwise-directional movable member 128.

The conductive member 114 has a cylindrical shape. The end of the conductive member 114 opposite to the magnet 106 is secured to the lengthwise-directional movable member 128 concentrically with the spool shaft 100*a*.

In this embodiment, the conductive member 114 and the lengthwise-directional movable member 128 are individually formed, and then secured.

Free ends of the conductive member 114 secured to the lengthwise-directional movable member 128 are disposed opposite to an annular gap between the concentric double annular rings 120*a* and 120*b* of the side wall 112*b* of the reel body 102.

The lengthwise-directional movable member 128 has radial-directional movable members 130 movable in the radial direction of the spool shaft 100*a* and disposed apart from each other at predetermined intervals at plural positions (two positions in the first embodiment) of the spool shaft 100*a*.

To support the radial-directional movable members 130 movably in the radial direction of the spool shaft 10*a*, the lengthwise-directional movable member 128 has guide holes 128*a*. The guide holes 128*a* are elongated in the radial direction of the spool shaft 100*a* and formed at plural positions (two positions in the first embodiment) apart from one another at predetermined intervals in the circumferential direction of the outer surface thereof, as shown in FIGS. 12, 13 and 14(B). As shown in FIG. 12, each of the radial-directional movable members 130 has an H-shape horizontal cross section. When a central bridge-like portion of the radial-directional movable member 130 is received in a guide holes 128*a*, movements of the radial-directional movable members 130 along the guide holes 128*a* are permitted. That is, the guide holes 128*a* serve as guide portions for movably guiding the radial-directional movable members 130 in the radial direction of the spool shaft 100*a*. The plural radial-directional movable members 130 are able to cross the outer surface of the conductive member 114 along the corresponding guide holes 128*a* and move to further outside portions.

In this embodiment, the conductive member 114 and the lengthwise-directional movable member 128 are individually formed, and then secured to each other. In this case, the conductive member 114 can be formed by simply formed into the cylindrical shape to have a required size. Therefore, the conductive member 114 can easily be manufactured. The lengthwise-directional movable member 128 having a complicated shape because it has the central hole for the spool shaft 100*a*, the guide hole 128*a* and the elongated hole 129 for the engagement member, for example, the engagement pin of the spool shaft 100*a* can be formed by integrally molding synthetic resin. Also the lengthwise-directional movable member 128 can easily be manufactured. The elongated hole 129 for the engagement member of the spool shaft 100*a*, for example, the engagement pin is, as shown in FIGS. 14(B), 15(A) and 15(B), surrounded by a flange portion 128*b* outwardly projecting in the radial direction of the spool shaft 100*a* from a position of the outer surface of the lengthwise-directional movable member 128 corresponding to the elongated hole 129 and elongated in the lengthwise direction of the elongated hole 129. Thus, the pressure of force per unit area which is transmitted from the engagement member of the spool shaft 100*a*, for example, the engagement pin 127 through the elongated hole 129 can be lowered. As a result, the strength of the lengthwise-directional movable member 128 can be enlarged and the lifetime of the same can be elongated. Moreover, the lengthwise-directional movable member 128 can smoothly be moved in the direction (the lengthwise direction) along the center line of the rotations of the spool shaft 100*a* with respect to the engagement member of the spool shaft 100*a*, for example, the engagement pin 127. Thus, the lengthwise-directional movable member 128 can be engaged to the engagement member of the spool shaft 100*a*, for example, the engagement pin 127 without looseness in the circumferential direction around the center line of the rotations of the spool shaft 100*a*.

As shown in FIGS. 14(A) and 14(B), a tapered inner surface 132 is provided for the end surface at the end of the spool 100. The tapered inner surface 132 surrounds the plural radial-directional movable members 130 of the spool shaft 100*a* and has a large-diameter opening which faces the plural magnets 116 of the side wall 112*b* of the reel body 112 opposite to the plural radial-directional movable members 130 in the radial direction of the spool shaft 100*a*. The tapered inner surface 132 is formed concentrically with respect to the center line of rotations of the spool shaft 100*a*. The tapered inner surface 132 has a smooth surface having a small coefficient of friction. In this embodiment, the tapered inner surface 132 is formed individually from the spool 100. Then, the inner surface of the tapered inner surface 132 secured to the end surface at the end of the spool 100 is formed into a smooth surface having a small coefficient of friction. The tapered inner surface 132 may be formed by forming the inner surface of the end surface at the end of the spool 100 into a smooth surface having a small coefficient of friction.

As shown in FIG. 14(A), the lengthwise-directional movable member 128 provided with the conductive member 114 is urged by an urging means 134 so as to be moved apart from the plural magnets 116 of the side wall 112*b* of the reel body 112 facing the end surface of the spool 100 at the end of the spool shaft 100*a*. In this embodiment, the urging means 134 is a compression coil spring wound around a portion at the end of the spool shaft 100*a* between the lengthwise-directional movable member 128 and an engagement member 100*b*, which is a stopper ring or a washer, disposed adjacent to the bearing 113*b* which rotatively supports the end of the spool shaft 10*a*.

As shown in FIG. 14(A), the lengthwise-directional movable member 128 urged by the urging means 134 is disposed adjacent to the end surface of the spool 100 at the end of the spool shaft 10*a*. The radial-directional movable members 130 on the lengthwise-directional movable member 128 are adjacent to the tapered inner surface 132 of the end surface of the spool 100 and the smallest opening.

In this embodiment, a washer 139 impregnated with oil is disposed on the end of the spool shaft 100*a* at a position adjacent to the end surface of the spool 100. In order to prevent generation of noise because of the conflict of the end of the lengthwise-directional movable member 128 with the end surface of the spool 100 and to use oil for the purpose of reducing frictional resistance which takes when the lengthwise-directional movable member 128 is moved in the lengthwise direction at the position on the end of the spool shaft 100*a*, the washer 139 is made of felt-type material which exhibits excellent shock absorbing effect and capable of holding oil in a satisfactorily large quantity.

The operation of the fishing reel according to the third embodiment having the above-mentioned structure will now be described.

When a fishing rod having the fishing reel according to the third embodiment is swung for performing a casting operation, a tackle (not shown) which flies toward a target position on the water surface pulls a fishing line (not shown). Thus, the spool 100 starts rotating in a predetermined direction.

The centrifugal force which is generated in the radial-directional movable members 130 which is rotated together with the spool shaft 100*a* is weak in the initial stage immediately after the casting operation has been started until the rotational speed of the spool 100 reaches predetermined speed. The force which is generated when the radial-directional movable members 130 is pressed against the tapered inner surface 132 by the centrifugal force and which acts in a direction opposite to the urging force of the urging means 134 is smaller than the urging force of the urging means 134. Therefore, the lengthwise-directional movable member 128 cannot approach the plural magnets 116 of the side wall 112*b* of the reel body 112. Thus, the free end of the cylindrical conductive member 114 secured to the lengthwise-directional movable member 128 is not introduced into the annular gap between the double annular rings 122*a* and 122*b* provided with the plural magnets 116 of the side wall 112*a* of the reel body 112. Therefore, no eddy current is generated in the conductive member 114 because of the magnetic force of the plural magnets 116. Thus, no braking force is generated in the spool 100 which is rotated together with the conductive member 114. Even if a small eddy current is generated in the conductive member 114 by dint of a leaked magnetic flux from the plural magnets 116, the braking force generated because of the small eddy current is extremely small.

Therefore, substantially no braking force acts in the initial stage immediately after the casting operation has been started until the rotational speed of the spool 100 reaches certain speed. Therefore, the initial rotational speed of the spool 100 can be raised. As a result, the distance for which the tackle can be thrown can be elongated in the overall period from a moment at which the casting operation has been started to the end of the casting operation. As a matter of course, the rotational speed of the spool 100 which can be raised in the overall period is higher than the rotational speed which can be realized by a conventional fishing reel comprising the spool rotational-speed control means using the braking force which is generated by the centrifugal force. Moreover, the rotational speed according to this embodiment is higher than a conventional fishing reel comprising a spool rotational-speed control means using only magnetic force. The reason for this lies in that the braking force which is generated by the magnetic force is enlarged in substantially proportion to the rise in the rotational speed of the spool 100 from the moment at which the rotation of the spool 10 has been started in the case of the conventional fishing reel comprising the spool rotational-speed control means using only the magnetic force. As a matter of course, the distance for which the tackle (not shown) can be thrown can be elongated in the initial stage immediately after the casting operation has been started until the rotational speed of the spool 100 reaches certain speed as compared with the conventional fishing reel comprising the spool rotational-speed control means using only the frictional force generated by the centrifugal force. The distance can be elongated as compared with the conventional fishing reel comprising the spool rotational-speed control means using only magnetic force.

In an intermediate period of the casting operation, the rotational speed of the spool 100 is reached certain speed. In this period, the force which is generated because the radial-directional movable members 130, which is rotated together with the spool shaft 100*a*, is pressed against the tapered inner surface 132 by dint of the centrifugal force and which acts in a direction opposite to the urging force of the urging means 134 in the axial direction along the spool shaft 100*a* is made to be larger than the urging force of the urging means 134. As the rotational speed of the spool 100 exceeding certain speed is enlarged, the radial-directional movable members 130 is moved along the tapered inner surface 132 to the outside in the radial direction as shown in FIGS. 16(A) and 16(B). Moreover, the lengthwise-directional movable member 128 is caused to overcome the urging force of the urging means 134 to gradually approach the plural magnets 116 of the side wall 112*b* of the reel body 112, as shown in FIGS. 16(A) and 16(B). As a result, the free end of the cylindrical conductive member 114 secured to the lengthwise-directional movable member 128 is gradually introduced into the annular gap between the double annular rings 122*a* and 122*b* provided with the plural magnets 116 of the side wall 112*b* of the reel body 112. Thus, the amount of superimposition between the double annular rings 122*a* and 122*b* and the magnets 116 is enlarged. It leads to a fact that the area of the conductive member 114 which traverses the magnetic flux generated by the plural magnets 116 is gradually enlarged.

As a result, the level of the eddy current generated in the conductive member 114 by dint of the magnetic force of the plural magnets 116 is enlarged in proportion to the area of the conductive member 114 which traverses the magnetic flux generated by the plural magnets 116 and the rotational speed of the spool 100. Also the braking force generated by the eddy current is enlarged in proportion to the area of the conductive member 114 which traverses the magnetic flux generated by the plural magnets 116 and the rotational speed of the spool 100.

Similarly to the conventional fishing reel comprising the spool rotational-speed control means using only the magnetic force, the braking force which can be generated by the structure according to this embodiment is smaller than that generated by the conventional fishing reel comprising the spool rotational-speed control means using the frictional force generated by the centrifugal force. Therefore, the rotational speed of the spool in the initial stage of the casting operation is higher than that of the conventional fishing reel comprising the spool rotational-speed control means using only the magnetic force. Therefore, also the rotational speed in a period from the initial stage to the intermediate stage of the casting operation is higher than that of the conventional fishing reel comprising the spool rotational-speed control means using only the magnetic force. As a matter of course, the rotational speed is significantly higher than that of the conventional fishing reel comprising the spool rotational-speed control means using the frictional force generated by the centrifugal force.

That is, the distance for which the tackle (not shown) can be thrown in a period from the initial stage of the casting operation to the intermediate stage in which the rotational speed of the spool 100 has reached certain speed can be elongated as compared with the conventional fishing reel comprising the spool rotational-speed control means using only the magnetic force and the conventional fishing reel comprising the spool rotational-speed control means using only the frictional force generated by the centrifugal force.

Moreover, excessive rotational speed of the spool 100 which causes critical backlash at a late time can satisfactorily be prevented by dint of an appropriate braking effect obtainable from the combination of the conductive member 114 of the spool 100 and the plural magnets 116 of the side wall 112b of the reel body 112.

When the rotational speed of the spool 100 has been reduced and the centrifugal force generated in the radial-directional movable members 130 which is rotated together with the spool shaft 100a has been weakened in the final stage of the casting operation, the force which is generated because the radial-directional movable members 130 is pressed against the tapered inner surface 132 by dint of the centrifugal force and which acts on the direction opposite to the urging force of the urging means 134 is made to be smaller than the urging force of the urging means 134. Thus, the lengthwise-directional movable member 128 is, by the urging force of the urging means 134, pushed in a direction apart from the plural magnets 116 of the side wall 112b of the reel body 112. The free end of the cylindrical conductive member 114 secured to the lengthwise-directional movable member 128 is gradually removed from the annular gap between the double annular rings 122a and 122b provided with the plural magnets 116 of the side wall 112b of the reel body 112. Thus, the area of the conductive member 114 which traverses the magnetic flux generated by the plural magnets 116 is gradually reduced.

As a result, the level of the eddy current generated in the conductive member 114 by dint of the magnetic force of the plural magnets 116 is reduced in proportion to the area of the conductive member 114 which traverses the magnetic flux generated by the plural magnets 116 and the rotational speed of the spool 100. Also the braking force generated by the eddy current is reduced in proportion to the area of the conductive member 114 which traverses the magnetic flux generated by the plural magnets 116 and the rotational speed of the spool 100.

The braking force according to this embodiment is smaller than that which is generated by the conventional fishing reel comprising the spool rotational-speed control means using only the magnetic force. Moreover, rapid reduction in the braking force can be prevented which takes place with the conventional fishing reel comprising the spool rotational-speed control means using the frictional force generated by the centrifugal force. Therefore, the rotational speed of the spool in the final period of the casting operation is higher than the rotational speed which can be realized by the conventional fishing reel comprising the spool rotational-speed control means using only the magnetic force. Moreover, the rapid reduction in the reduction ratio of the rotational speed can be prevented which takes place with the conventional fishing reel comprising the spool rotational-speed control means using the frictional force generated by the centrifugal force.

That is, the distance for which the tackle (not shown) can be thrown in the final period of the casting operation in which the rotational speed of the spool 100 has gradually be reduced can be elongated as compared with that of the conventional fishing reel comprising the spool rotational-speed control means using only the magnetic force and that of the conventional fishing reel comprising the spool rotational-speed control means using only the frictional force generated by the centrifugal force.

Moreover, the excessively high rotational speed of the spool 100 which cause critical backlash with respect to the flying speed of the tackle at a later time is appropriately restrained in the intermediate period of the casting operation. The rapid reduction in the reduction ratio of the rotational speed of the spool 100 which takes in the final stage of the casting operation with the conventional fishing reel comprising the spool rotational-speed control means using only the frictional force generated by the centrifugal force can be prevented. If there is apprehension that the backlash phenomenon of the fishing line (not shown) takes place because of rapid reduction in the pulling speed of the fishing line which occurs because the tackle (not shown) reaches the water surface and inertia of the rotations of the spool 100 after the tackle (not shown) has reached the water surface, only a simple operation which can be performed by a person which is not skilled in the casting operation is required to prevent the backlash phenomenon. The operation is performed in such a manner that, for example, the spool or the surface of the fishing line wound around the spool is pressed by, for example, the finger. Therefore, the operation for unreeling the fishing line for performing casting can easily be performed.

Figure 17:
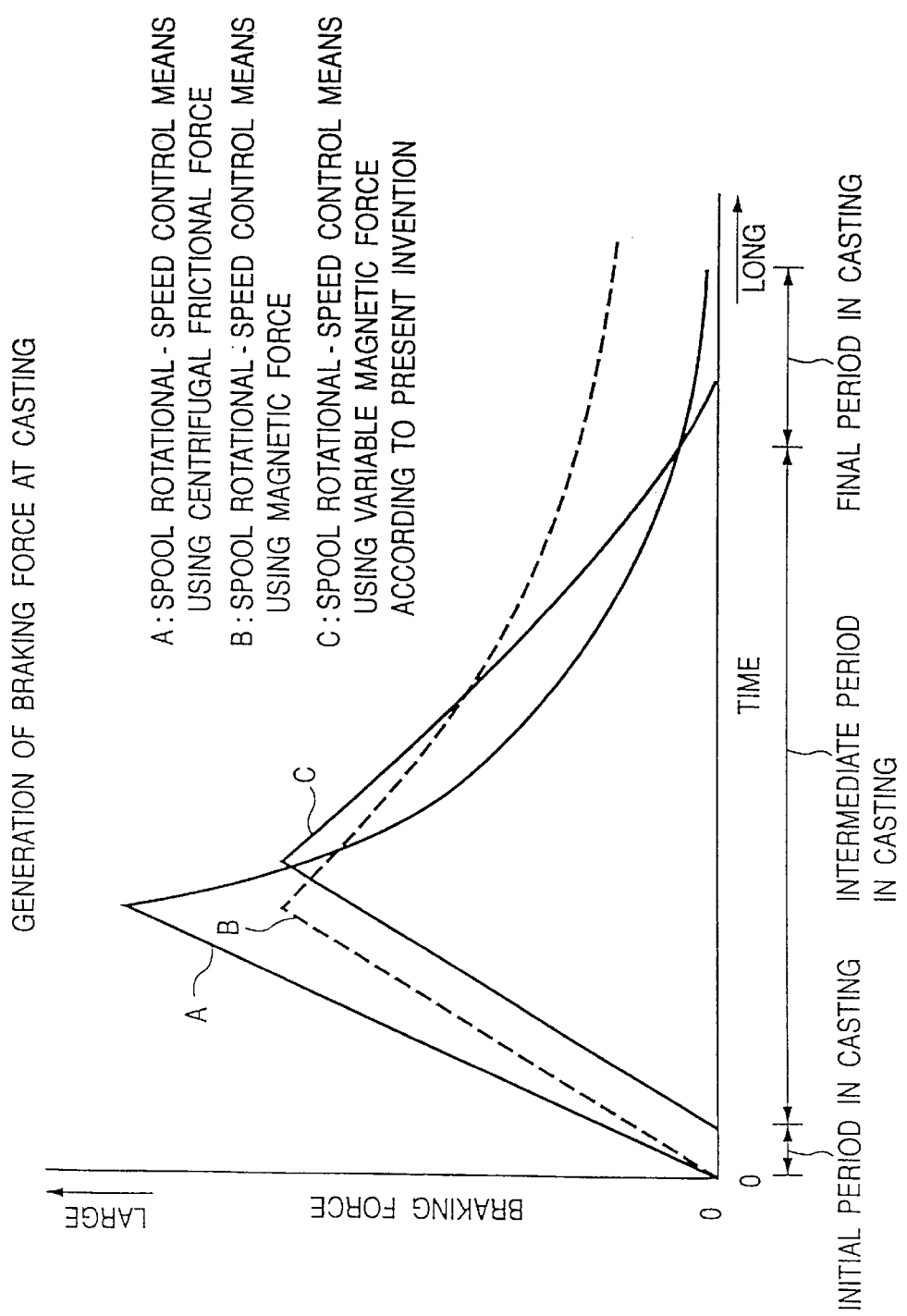
FIG. 17 is a graph showing change in braking force as the casting time elapses for a fishing reel according to the present invention comprising a spool rotational-speed control means using variable magnetic force, a fishing reel comprising a conventional spool rotational-speed control means using only centrifugal frictional force and a fishing reel comprising a conventional spool rotational-speed control means using only magnetic force.
Figure 18:
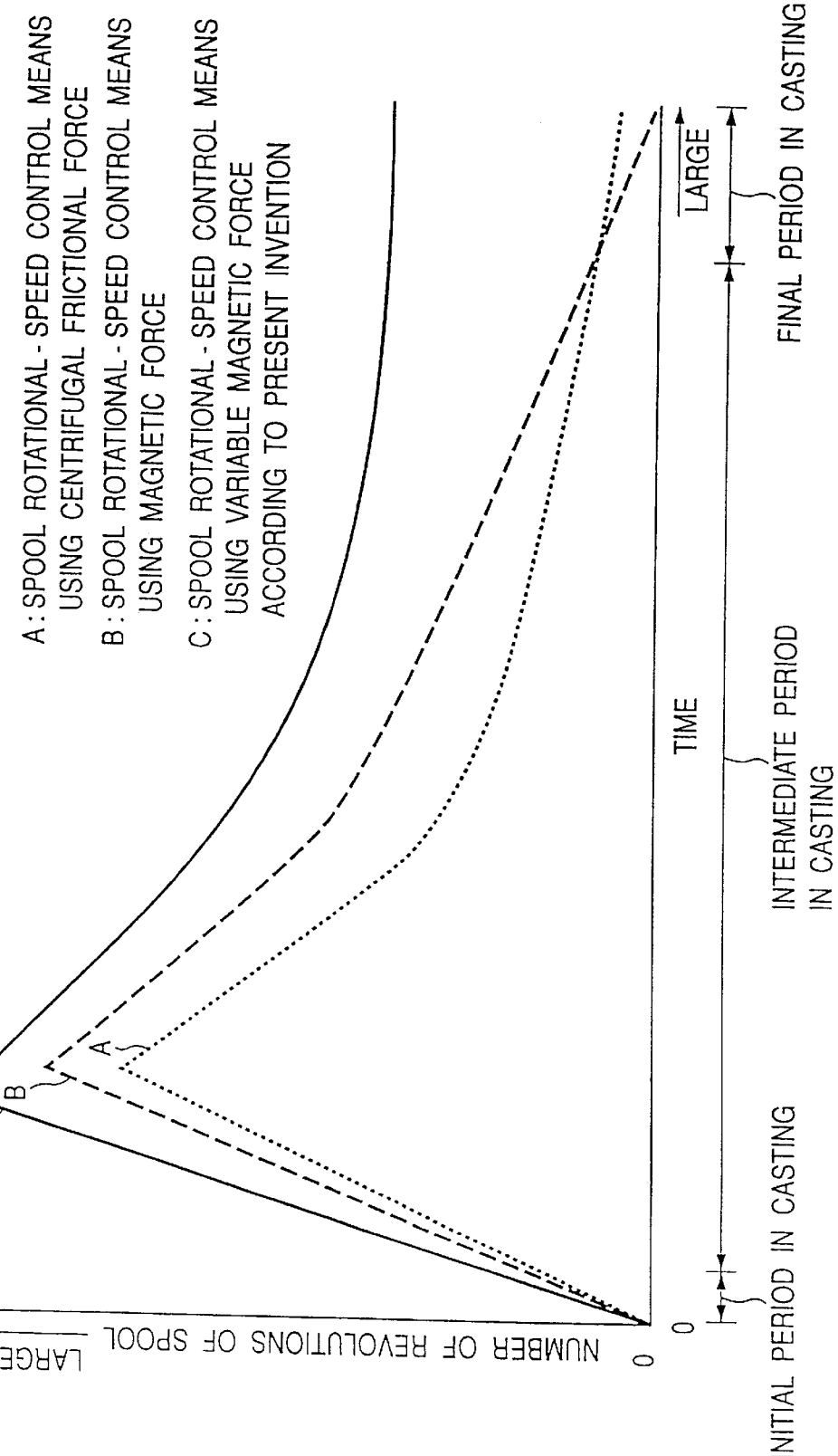
FIG. 18 is a graph showing change in the number of revolutions of the spool caused from change in the braking force as the casting time elapses for the fishing reel according to the present invention comprising the spool rotational-speed control means using variable magnetic force, the fishing reel comprising the conventional spool rotational-speed control means using only centrifugal frictional force and the fishing reel comprising the conventional spool rotational-speed control means using only magnetic force.

Referring to FIGS. 17 and 18, change in the braking force of a fishing reel having a spool rotational-speed control means using variable magnetic force as the casting period of time elapses according to the embodiments and modifications and change in the number of revolutions of the spool which is controlled by the braking force will now be described. The changes will be described in comparison the changes in the braking force as the casting period of time elapses and the number of revolutions of the spool which is controlled by the braking force which occur with the conventional fishing reel comprising the spool rotational-speed control means using only the centrifugal frictional force and the conventional fishing reel comprising the spool rotational-speed control means using only the magnetic force.

As can be understood from FIG. 17, the conventional fishing reel comprising the spool rotational-speed control means using only the frictional force generated by the centrifugal force (that is, the centrifugal frictional force) easily encounters backlash of the fishing line when the braking force enlarged rapidly is changed to rapid reduction in a period from the initial stage of the casting operation to the intermediate stage. Moreover, moderate reduction in the braking force occurring from the intermediate period of the casting operation to the final stage of the same cause a person who plays fishing to feel enlargement of the unreeled fishing line from the spool in the final period of the casting operation, that is, elongation of the distance for which the tackle can be thrown.

The conventional fishing reel comprising the spool rotational-speed control means using only the magnetic force encounters change in the braking force as the casting period of time elapses in such a manner that the braking force is enlarged substantially corresponding to the rise in the rotational speed of the spool occurring from the initial period of the casting operation to the intermediate period. Thus, the enlargement prevents generation of the backlash of the fishing line. Moderate reduction in the braking force occurring from the intermediate period of the casting operation to the final stage of the same while the braking force is remained by a certain degree causes a person who plays fishing to feel interruption of unreeling of the fishing line from the spool in the final stage of the casting operation, that is, interruption of the elongation of the distance for which the tackle can be thrown.

The fishing reel comprising the spool rotational-speed control means using the variable magnetic force according to the various embodiments and modifications of the present invention as the casting period time elapses will now be described. The lengthwise-directional movable member does not move in the lengthwise direction along the center line of the rotations of the spool against the urging force of the urging means in the initial period immediately after the casting operation has been started until the rotational speed of the spool is raised to certain speed and also the centrifugal force is enlarged to certain magnitude, and substantially no eddy current is generated in the conductive member because the area of the conductive member which traverses the magnetic flux generated by the plural magnets is zero or extremely small and thus the braking force is substantially zero; in the intermediate period of the casting operation in which the rotational speed of the spool exceeds certain speed, enlargement of the centrifugal force occurring because of the rise in the rotational speed causes the lengthwise-directional movable member to start moving the in the lengthwise direction along the center line of rotations of the spool against the foregoing of the urging means, thus causing the amount of superimposition of the conductive member on the plural magnets to be enlarged or the distance for which the conductive member is disposed opposite to the plural magnets to be shortened, as a result of which the braking force is enlarged because of the eddy current generated in the conductive member is raised by dint of the interaction of the enlargement of the area of the conductive member which traverses the magnetic flux generated by the plural magnets and the rise in the rotational speed; when the rotational speed of the spool exceeds a peak and then gradually reduced and also the centrifugal force is gradually reduced and the lengthwise-directional movable member starts moving the original position in the lengthwise direction along the center line of the rotations of the spool because of the urging force of the urging means, the eddy current generated in the conductive member is reduced because of the interaction of the reduction in the rotational speed and the reduction in the area of the conductive member which traverses the magnetic flux generated by the plural magnets, thus causing the braking force is reduced; when the rotational speed of the spool is reduced and also the centrifugal force is furthermore reduced in the final period of the casting operation, the area of the conductive member which traverses the magnetic flux generated by the plural magnets is made to be zero or extremely small and therefore substantially no eddy current is generated in the conductive member as a result of which the braking force is made to be substantially zero.

In the initial stage of the casting operation, the rotational speed of the spool is rapidly raised in a period in which the braking force is substantially zero as compared with the conventional fishing reel comprising the spool rotational-speed control means using only the frictional force generated by the centrifugal force and the conventional fishing reel comprising the spool rotational-speed control means using only the magnetic force. Moreover, time required to the rotational speed to reach the maximum rotational speed can be shortened. In the intermediate period of the casting operation, moderate enlargement/reduction in the braking force occurring similarly to the conventional fishing reel comprising the spool rotational-speed control means using only the magnetic force prevents generation of the backlash of the fishing line. In the final period of the casting operation, the reduction ratio of the braking force is raised as compared with the conventional fishing reel comprising the spool rotational-speed control means using only the magnetic force. Thus, the person who plays fishing feels enlargement in unreeling of the fishing line from the spool in the final stage of the casting operation, that is, elongation in the distance for which the tackle can be thrown.

Referring to FIG. 18, change in the rotational speed of the spool of the conventional fishing reel comprising the spool rotational-speed control means using only the frictional force generated by the centrifugal force occurring as the casting period of time elapses will now be described. As a result of the rapid enlargement and following rapid reduction and moderation reduction after the rapid reduction in the braking force shown in if 18, enlargement of the rotation of the spool in the initial stage immediately after the casting operation has been started is limited. The maximum number of revolutions of the spool is the lowest and time required for the number of revolutions reaches the maximum number of revolutions is long as compared with the fishing reels according to the embodiments and modifications each having the spool rotational-speed control means using the variable magnetic force and the conventional fishing reel comprising the spool rotational-speed control means using only the magnetic force. In the final stage of the casting operation, the reduction ratio of the number of revolutions of the spool is moderated.

The change in the number of revolutions of the spool of the conventional fishing reel comprising the spool rotational-speed control means using only the magnetic force occurring as the casting period of time elapses will now be described. The enlargement of the braking force substantially corresponding to the enlargement of the number of revolutions of the spool occurring from the initial stage to the intermediate period of the casting operation is not rapid as compared with the conventional fishing reel comprising the spool rotational-speed control means using only the frictional force generated by the centrifugal force. The maximum number of revolutions of the spool is enlarged. Also the braking force substantially corresponds to the reduction in the number of revolutions of the spool occurring from the intermediate period to the final stage of the casting operation. Since the braking force generated by the magnetic force affects the rotations of the spool until the rotation of the spool is interrupted, the reduction ratio of the rotations of the spool is enlarged as compared with the conventional fishing reel comprising the spool rotational-speed control means using only the frictional force generated by the centrifugal force.

The fishing reels according to the embodiments and modifications of the present invention and each having the spool rotational-speed control means using the variable magnetic force enables the distance for which the tackle can be thrown which is realized by one casting operation to be elongated as compared with the conventional fishing reel comprising the spool rotational-speed control means using only the frictional force generated by the centrifugal force and the conventional fishing reel comprising the spool rotational-speed control means using only the magnetic force. Moreover, the backlash phenomenon of the fishing line can effectively be prevented. Moreover, the distance for which the tackle can be thrown in the final stage of the casting operation can be elongated.

In accordance with results of a multiplicity of experiments performed by the inventors of the present invention, control of the number of revolutions of the spool 100 by the spool rotational-speed control means 26 enables the distance for which the tackle can be thrown in one casting operation to be elongated even by a beginner. Moreover, the backlash phenomenon of the fishing line can effectively prevented. In addition, the distance for which the tackle can be thrown in the final period of the casting operation can be elongated.

When the number of revolutions of the spool 10 or 100 is raised, the spool rotational-speed control means 26 or 126 starts substantial control of the rotations of the spool 10 or 100 when the number of revolutions of the spool 10 or 100 reaches about 4500 rpm (that is, the lengthwise-directional movable member 28, 28', 28", 28'" or 128 starts moving along the spool shaft 10a, thus shortening of the distance from the conductive member 14, 14', 14" or 114 to the magnets 16 or 116 or superimposition of the projecting surface is started so that generation of substantial braking force which acts on the rotations of the spool 10 or 100 by the conductive member 14, 14', 14" or 114 and the magnets 16 or 116 is started). When the number of revolutions of the spool 10 or 100 reaches about 5500 rpm, the spool rotational-speed control means 26 or 126 is able to most effectively control the rotational speed of the spool to correspond to the number of revolutions of the spool 10 or 100 (that is, the distance from the conductive member 14, 14', 14" or 114 to the magnets 16, 116, 116'a or 116'b is shortened maximally or the superimposition of the projecting surface is enlarged to the maximum so that the conductive member 14, 14', 14" or 114 of the spool rotational-speed control means 26 or 126 and the magnets 16, 116, 116'a and 116'b generate the braking force with the highest efficiency). When the number of revolutions of the spool 10 or 100 is reduced, reduction in the efficiency of the control of the rotational speed of the spool 10 or 100 which is performed by the spool rotational-speed control means 26 or 126 is started in a case where the number of revolutions of the spool 10 or 100 reaches about 3000 rpm (that is, elongation of the distance from the conductive member 14, 14', 14" or 114 to the magnets 16 or 116 is started or reduction of the superimposition of the projecting surface is started, and the reduction in the generation efficiency of the braking force which is generated by the conductive member 14, 14', 14" or 114 of the spool rotational-speed control means 26 or 126 and the magnets 16, 116, 116'a and 116'b is started to correspond to the number of revolutions of the spool 10 or 100). The spool rotational-speed control means 26 or 126 interrupts the substantial control of the rotations of the spool 10 or 100 before the rotations of the spool 10 or 100 is completely interrupted (that is, the lengthwise-directional movable member 28, 28', 28", 28'" or 128 returns to the position before the rotation of the spool 10 or 100 along the spool shaft 10a or 10a so that the distance from the conductive member 14, 14', 14" or 114 to the magnets 16, 116, 116'a and 116'b is elongated or the superimposition of the projecting surface is suspended, as a result of which generation of the substantial braking force which acts on the rotations of the spool 10 or 100 which is performed by the conductive member 14, 14', 14" or 114 and the magnets 16, 116, 116'a and 116'b is interrupted). Therefore, the spool 10 or 100 is freed from the rotational speed control which is performed by the spool rotational-speed control means 26 or 126 in the final stage of the rotations. Thus, the spool 10 or 100 continuously rotates until the rotations are naturally interrupted.

The above-mentioned control of the rotational speed of the spool can be performed by the spool rotational-speed control means 26 or 126 by adjusting the weight of the lengthwise-directional movable member 28, 28', 28", 28'" or 128, that of the radial-directional movable members 30, 30', 30", 30'" or 130, the inclined angle of the tapered inner surface 42, 44, 48 or 132 or the urging force of the urging means 34, 34' or 134 according to the various embodiments of the present invention.

Fourth Embodiment

Referring to FIGS. 19 to 22B, a fourth embodiment of the fishing reel according to the present invention will now be described.

Figure 19:
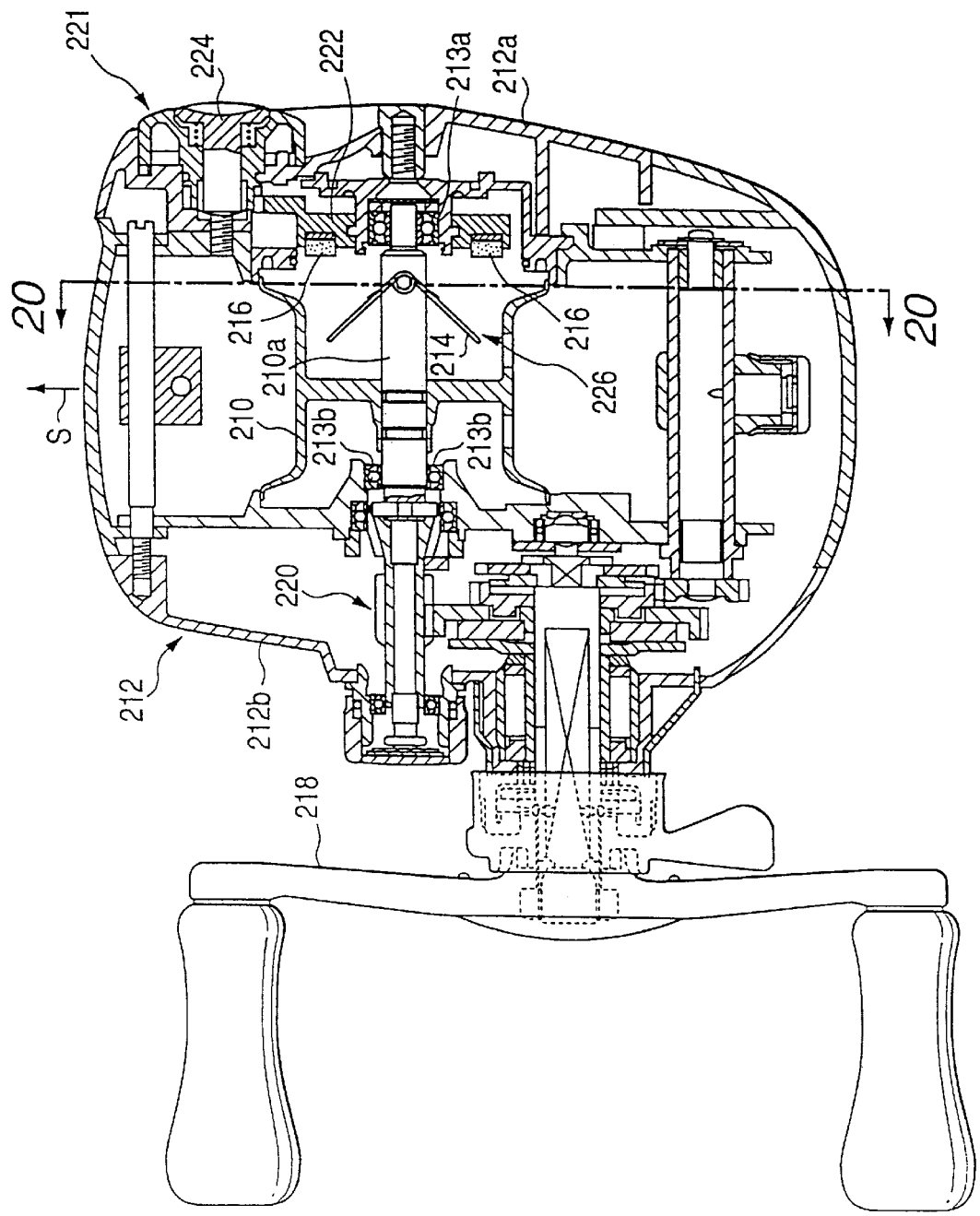
FIG. 19 is a schematic and horizontal cross sectional view showing a fourth embodiment of the fishing reel according to the present invention.

As shown in FIG. 19, the fishing reel according to the first embodiment of the present invention comprises a spool 210 around which a fishing line (not shown) is wound in such a manner that the fishing line can be unreeled; and a reel body 212 for rotatively supporting two ends of a spool shaft 210a of the spool 210 through bearings 213a and 213b and rotatively holding the spool 210.

A conductive member 214 made of, for example, aluminum or copper, is disposed at an end of the spool shaft 210a at a position between an end surface of the spool 210 and a bearing 213a which rotatively supports an end (the right-hand end in FIG. 19) of the spool shaft 210a projecting over an end surface of the spool 210. A side wall 212a of the reel body 12 provided with a bearing 213a which rotatively supports an end of the spool shaft 210a is provided with a plurality of magnets 216 corresponding to the conductive member 214 at the end of the spool shaft 210a.

Another side wall 212b provided with a bearing 213b, which rotatively supports another end (the left-hand end in FIG. 19) of the spool shaft 210a projecting over another end surface of the spool 210 is provided with a rotative handle 218. Moreover, a clutch-equipped rotational-force transmission means 220 for selectively transmitting rotational force supplied from the handle 218 to another end of the spool shaft 210a is provided. The clutch-equipped rotational-force transmission means 220 will now be described. When a clutch is operated by depressing an operation button (not shown), selection of a state from two states is permitted one of which is a spool free rotation state in which free rotation of the spool shaft 210a is permitted to permit unreeling (an arrow S shown in FIG. 19 indicates a direction in which the fishing line is unreeled) of a fishing line (not shown). Another state is a spool operation state in which rotational force supplied from the handle 218 is transmitted to the spool 210 through another end of the spool shaft 210a so as to wind the fishing line (not shown) around the spool 210 in a direction opposite to the unreeling direction indicated with the arrow S shown in FIG. 19. Since the structure of the clutch-equipped rotational-force transmission means 220 is a known fact, the description of the structure is omitted here.

As shown in FIG. 19, the plural magnets 216 are provided for the side wall 212a of the reel body 212 through a magnetic-force adjustment means 221 for adjusting the magnetic force of the magnets 216 which acts on the stationary conductive member 214. In this embodiment, the magnetic-force adjustment means 221 includes an annular ring 22 disposed on the inner surface of the side wall 212a concentrically with the end of the spool shaft spool shaft 210a. The side surface of the annular ring 222 facing the spool 210 has the plural magnets 216 concentrically disposed apart from one another at the same intervals. The annular ring 222 is, with a thread, engaged to the inner surface of the side wall 212a so as to be capable of moving in a direction (in the lengthwise direction) along the center line of the rotations of the spool shaft 210a. When a magnetic force adjustment button 224 provided for the side wall 212a is rotated in a direction, the annular ring 222 is moved in the direction along the center line of the rotations of the spool shaft 210a to adjust the magnitude of the magnetic force which acts on the conductive member 214. Thus, the braking force which acts on the spool 210 having the spool shaft 210a which is rotated together with the conductive member 214 can be adjusted.

As shown in FIG. 19, the conductive member 214 is disposed at the end of the spool shaft 210a through a spool rotational-speed control means 226 which moves the conductive member 214 in the radial direction of the spool 210 in accordance with the rise or reduction in the rotational speed of the spool 210 to enlarge/reduce the magnetic force of the magnets 216 which acts on the conductive member 214 so as to control the rotational speed of the spool 210.

Figure 20:
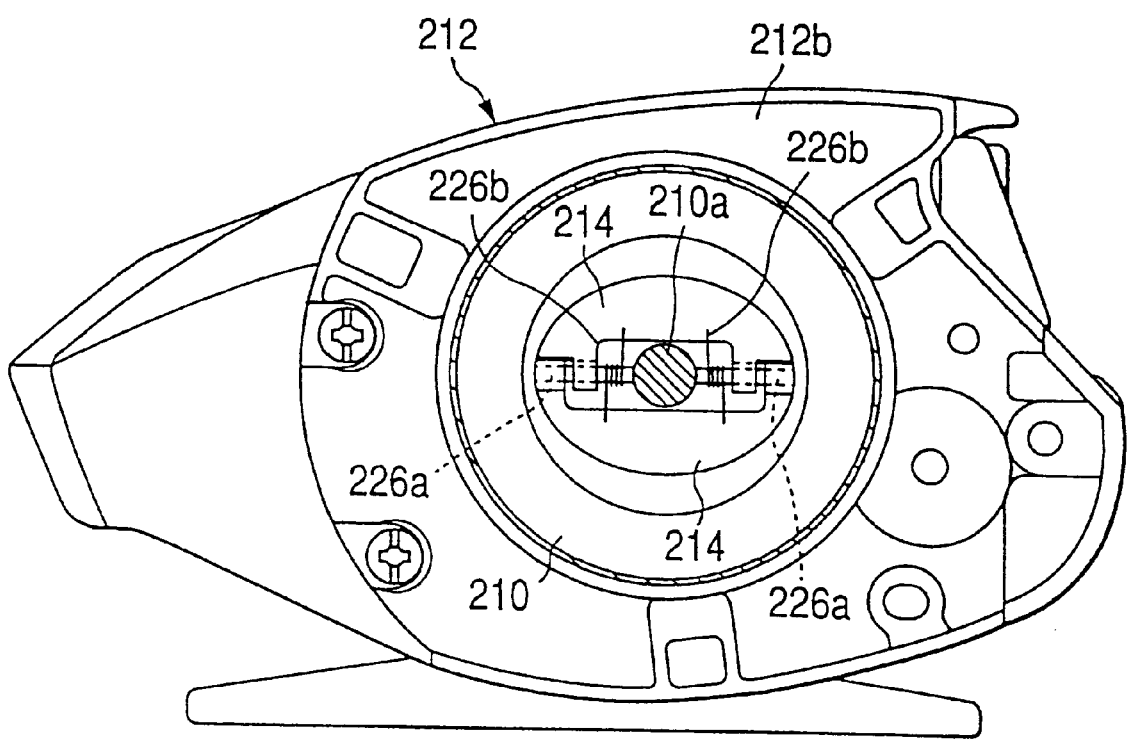
FIG. 20 is a schematic and horizontal cross sectional view taken along line 20—20 shown in FIG. 19.
Figure 21A:
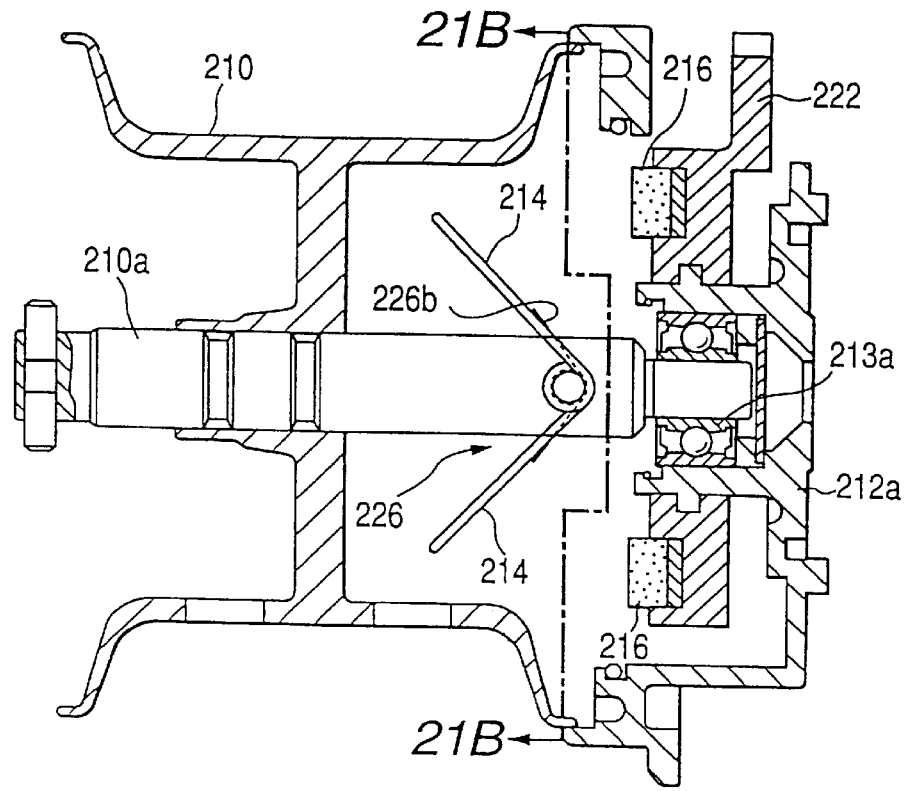
FIG. 21(A) is a schematic and vertical cross sectional view showing an essential portion of the fishing reel shown in FIG. 19 in which a state from a moment at which the spool is not rotated and a moment at which the rotational speed of the spool reaches certain speed and a state in which the rotational speed of the spool has been reduced from certain speed are shown.
Figure 21B:
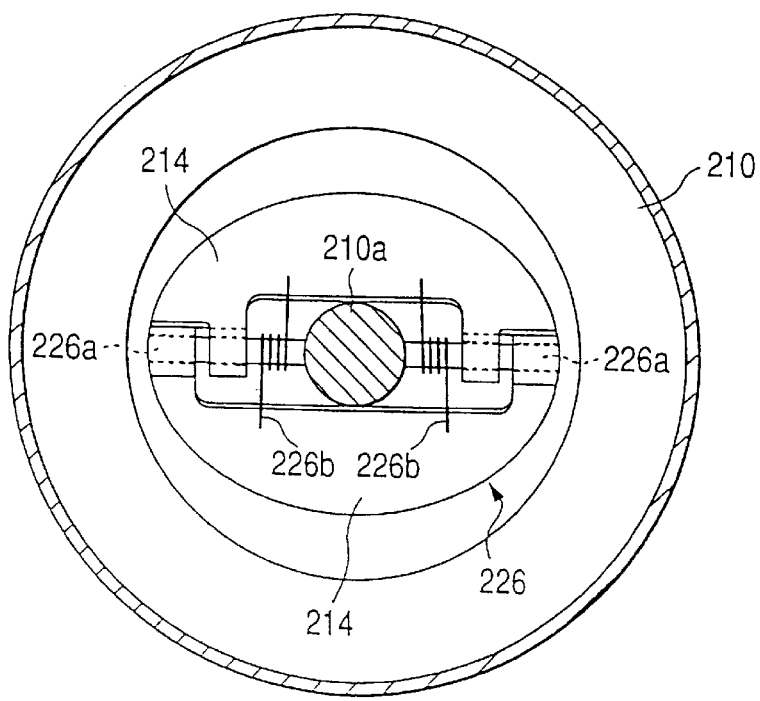
FIG. 21(B) is a schematic and horizontal cross sectional view taken along line 21B—21B shown in FIG. 21(A)

In this embodiment, as shown in FIGS. 20, 21(A) and 21(B), the spool rotational-speed control means 226 has a pair of swing central shafts 226a extending into a straight form in the radial direction of the spool shaft 210a at the end of the spool shaft 210a; a pair of swing members each having a semi-circular shape and a chord portion, the two ends of which are rotatively connected to the pair of the swing central shafts 226a; and an urging means 226b for urging the pair of the swing members toward the center line of the rotations of the spool shaft 210a. Specifically, the pair of the swing members are formed by the conductive member 214. The urging means 226b is composed of a pair of coil springs 226b each of which is wound around the swing central shaft 226a and the two ends of which are secured to the pair of the swing members (the conductive members 214). The pair of the swing members and the conductive member 214 may individually be formed from different materials, and then joined together.

The pair of the swing members (the conductive members 214) urged by the urging means 226b are disposed along the center line of the rotations of the spool shaft 210a at the end of the spool shaft 210a as indicated by a solid line shown in FIGS. 20, 21(A) and 21(B) when the spool 210 is not rotated and no centrifugal force acts on the pair of the swing members (the conductive members 214). The above-mentioned positions for the pair of the swing members (the conductive members 214) are called "laid-down positions" for the pair of the swing members (the conductive members 214).

The operation of the fishing reel according to the fourth embodiment of the present invention having the above-mentioned structure will now be described.

When a fishing rod having the fishing reel according to the first embodiment is swung for performing a casting operation, a tackle (not shown) which flies toward a target position on the water surface pulls a fishing line (not shown). Thus, the spool 210 starts rotating in a predetermined direction.

The centrifugal force which is generated in the pair of the swing members (the conductive members 214) which are rotated together with the spool shaft 210a is weak in the initial stage immediately after the casting operation has been started until the rotational speed of the spool 210 reaches predetermined speed. Therefore, the pair of the swing members (the conductive members 214) cannot be raised toward the outside in the radial direction of the spool shaft 210a against the urging force of the urging means 226b. Therefore, the pair of the swing members (the conductive members 214) cannot approach the plural magnets 216 of the side wall 212a of the reel body 212 in the radial direction of the spool shaft 210a and the direction (the lengthwise direction) along the center line of the rotations of the spool shaft 210a. Therefore, no eddy current is generated in the pair of the swing members (the conductive members 214) because of the magnetic force of the plural magnets 216. Thus, no braking force is generated in the spool 210 which is rotated together with the pair of the swing members (the conductive members 214). Even if a small eddy current is generated in the pair of the swing members (the conductive members 214) at the laid-down positions by dint of a leaked magnetic flux from the plural magnets 216, the braking force generated because of the small eddy current is extremely small.

Therefore, substantially no braking force acts in the initial stage immediately after the casting operation has been started until the rotational speed of the spool 210 reaches certain speed. Therefore, the initial rotational speed of the spool 210 can be raised. As a result, the distance for which the tackle can be thrown can be elongated in the overall period from a moment at which the casting operation has been started to the end of the casting operation. As a matter of course, the rotational speed of the spool 210 which can be raised in the overall period is higher than the rotational speed which can be realized by a conventional fishing reel comprising the spool rotational-speed control means using the braking force which is generated by the centrifugal force. Moreover, the rotational speed according to this embodiment is higher than a conventional fishing reel comprising a spool rotational-speed control means using only magnetic force. The reason for this lies in that the braking force which is generated by the magnetic force is enlarged in substantially proportion to the rise in the rotational speed of the spool 210 from the moment at which the rotation of the spool 210 has been started in the case of the conventional fishing reel comprising the spool rotational-speed control means using only the magnetic force. As a matter of course, the distance for which the tackle (not shown) can be thrown can be elongated in the initial stage immediately after the casting operation has been started until the rotational speed of the spool 210 reaches certain speed as compared with the conventional fishing reel comprising the spool rotational-speed control means using only the frictional force generated by the centrifugal force. The distance can be elongated as compared with the conventional fishing reel comprising the spool rotational-speed control means using only magnetic force.

In an intermediate period of the casting operation, the rotational speed of the spool 210 is reached certain speed. In this period, the centrifugal force which is generated in the pair of the swing members (the conductive members 214) which are rotated together with the spool shaft 210a is enlarged. Thus, the pair of the swing members (the conductive members 214) are able to be raised against the urging force of the urging means 226b from the laid-down position indicated with an alternate long and two dashes line shown in FIGS. 4(A) and 4(B) to the raised position on the outside in the radial direction of the spool shaft 210a indicated by a solid line shown in FIGS. 4(A) and 4(B). Therefore, the pair of the swing members (the conductive members 214) gradually approach the plural magnets 216 of the side wall 212a of the reel body 212 in the radial direction of the spool shaft 210a and also in the direction (the lengthwise direction) along the center line of the rotations of the spool shaft 210a. Therefore, the level of the eddy current is generated in the pair of the swing members (the conductive members 214) by dint of the magnetic force of the plural magnets 216 is enlarged in proportion to the area of the pair of the swing members (the conductive members 214) which traverse the magnetic flux generated by the plural magnets 216 and the rotational speed of the spool 210. Also the braking force generated by the eddy current is enlarged in proportion to the area of the pair of the swing members (the conductive members 214) which traverse the magnetic flux generated by the plural magnets 216 and the rotational speed of the spool 210.

Similarly to the conventional fishing reel comprising the spool rotational-speed control means using only the magnetic force, the braking force which can be generated by the structure according to this embodiment is smaller than that generated by the conventional fishing reel comprising the spool rotational-speed control means using the frictional force generated by the centrifugal force. Therefore, the rotational speed of the spool in the initial stage of the casting operation is higher than that of the conventional fishing reel comprising the spool rotational-speed control means using only the magnetic force. Therefore, also the rotational speed in a period from the initial stage to the intermediate stage of the casting operation is higher than that of the conventional fishing reel comprising the spool rotational-speed control means using only the magnetic force. As a matter of course, the rotational speed is significantly higher than that of the conventional fishing reel comprising the spool rotational-speed control means using the frictional force generated by the centrifugal force.

That is, the distance for which the tackle (not shown) can be thrown in a period from the initial stage of the casting operation to the intermediate stage in which the rotational speed of the spool 210 has reached certain speed can be elongated as compared with the conventional fishing reel comprising the spool rotational-speed control means using only the magnetic force and the conventional fishing reel comprising the spool rotational-speed control means using only the frictional force generated by the centrifugal force.

Moreover, excessive rotational speed of the spool 210 which causes critical backlash at a late time can satisfactorily be prevented by dint of an appropriate braking effect obtainable from the combination of the pair of the swing members (the conductive members 214) of the spool 210 the plural magnets 216 of the side wall 212a of the reel body 212.

Figure 22A:
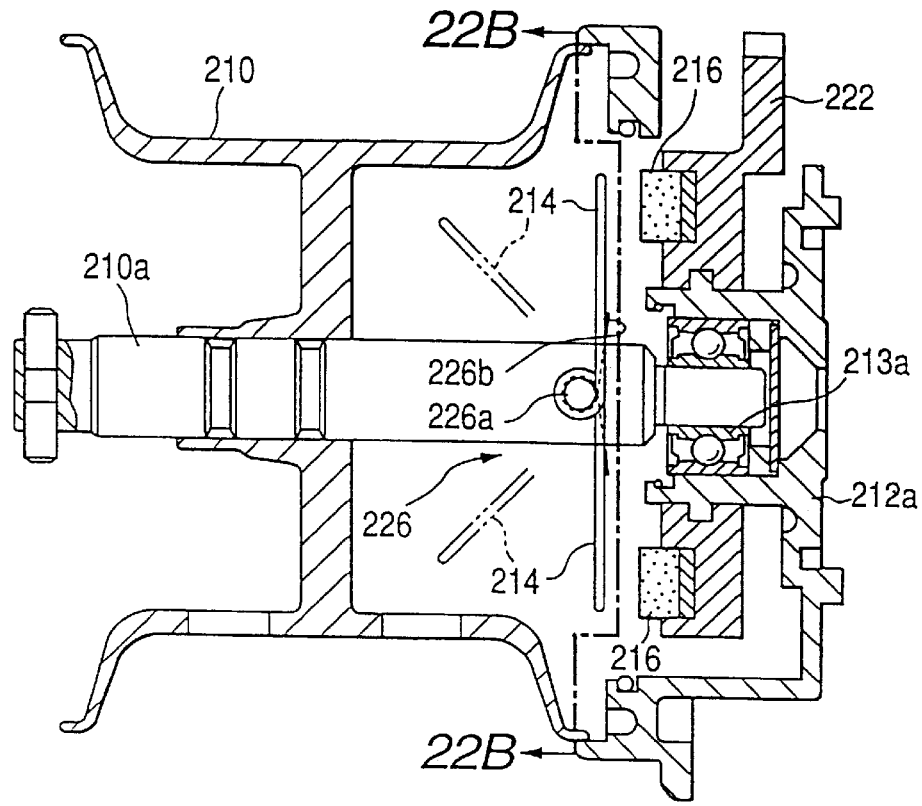
FIG. 22(A) is a schematic and vertical cross sectional view showing an essential portion of the fishing reel shown in FIG. 19 in which a state is shown in which the spool is being rotated at high speed higher than certain rotational speed.
Figure 22B:
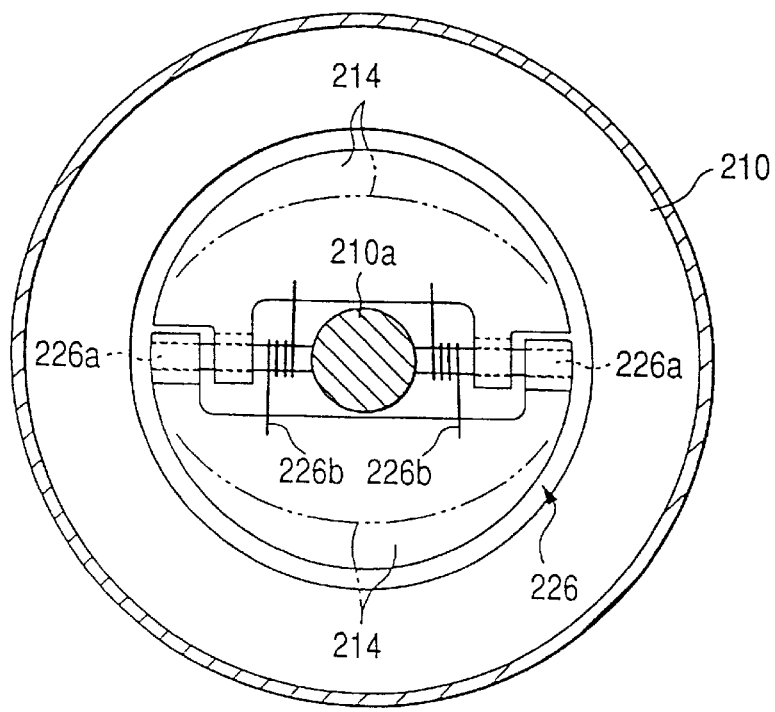
FIG. 22(B) is a schematic and horizontal cross sectional view taken along line 22B—22B shown in FIG. 22.

When the rotational speed of the spool 210 has been reduced and the centrifugal force generated in the pair of the swing members (the conductive members 214) which are rotated together with the spool shaft 210a has been weakened in the final stage of the casting operation, the pair of the swing members (the conductive members 214) are, by the urging force of the urging means 226b, pulled from the raised position on the outside in the radial direction of the spool shaft 210a indicated with a solid line shown in FIGS. 22(A) and 22(B) to the laid-down position on the inside portion in the radial direction of the spool shaft 210a long the center line of the rotations of the spool shaft 210a and indicated with an alternate long and two dashes line. Therefore, the pair of the swing members (the conductive members 214) are gradually moved from the plural magnets 216 of the side wall 212a of the reel body 212 in the radial direction of the spool shaft 210a and also in the direction (the lengthwise direction) along the center line of the rotations of the spool shaft 210a. Therefore, the level of the eddy current which is generated in the pair of the swing members (the conductive members 214) by dint of the magnetic force of the plural magnets 216 is reduced in proportion to the area of the pair of the swing members (the conductive members 214) which traverse the magnetic flux generated by the plural magnets 216 and the rotational speed of the spool 210. Also the braking force generated by the eddy current is reduced in proportion to the area of the pair of the swing members (the conductive members 214) which traverse the magnetic flux generated by the plural magnets 216 and the rotational speed of the spool 210.

The braking force according to this embodiment is smaller than that which is generated by the conventional fishing reel comprising the spool rotational-speed control means using only the magnetic force. Moreover, rapid reduction in the braking force can be prevented which takes place with the conventional fishing reel comprising the spool rotational-speed control means using the frictional force generated by the centrifugal force. Therefore, the rotational speed of the spool 210 in the final period of the casting operation is higher than the rotational speed which can be realized by the conventional fishing reel comprising the spool rotational-speed control means using only the magnetic force. Moreover, the rapid reduction in the reduction ratio of the rotational speed can be prevented which takes place with the conventional fishing reel comprising the spool rotational-speed control means using the frictional force generated by the centrifugal force.

That is, the distance for which the tackle (not shown) can be thrown in the final period of the casting operation in which the rotational speed of the spool 210 has gradually be reduced can be elongated as compared with that of the conventional fishing reel comprising the spool rotational-speed control means using only the magnetic force and that of the conventional fishing reel comprising the spool rotational-speed control means using only the frictional force generated by the centrifugal force.

Moreover, the excessively high rotational speed of the spool 210 which cause critical backlash with respect to the flying speed of the tackle at a later time is appropriately restrained in the intermediate period of the casting operation. The rapid reduction in the reduction ratio of the rotational speed of the spool 210 which takes in the final stage of the casting operation with the conventional fishing reel comprising the spool rotational-speed control means using only the frictional force generated by the centrifugal force can be prevented. If there is apprehension that the backlash phenomenon of the fishing line (not shown) takes place because of rapid reduction in the pulling speed of the fishing line which occurs because the tackle (not shown) reaches the water surface and inertia of the rotations of the spool 210 after the tackle (not shown) has reached the water surface, only a simple operation which can be performed by a person which is not skilled in the casting operation is required to prevent the backlash phenomenon. The operation is performed in such a manner that, for example, the spool or the surface of the fishing line wound around the spool is pressed by, for example, the finger. Therefore, the operation for unreeling the fishing line for performing casting can easily be performed.

Fifth Embodiment

Referring to FIGS. 23(A), 23(B), 24(A) and 24(B), a fifth embodiment of the fishing reel according to the present invention will now be described.

The fifth embodiment is different from the spool rotational-speed control means 226 of the fishing reel according to the fourth embodiment of the present invention in the structure of a spool rotational-speed control means 230 for controlling the rotational speed of the spool 210 provided with the conductive member 214" by enlarging/reducing the magnetic force generated by the magnets 216 which acts on the conductive member 214" by moving the conductive members 214" in the radial direction of the spool 210 in accordance with the rise/reduction in the rotational speed of the spool 210.

Figure 23A:
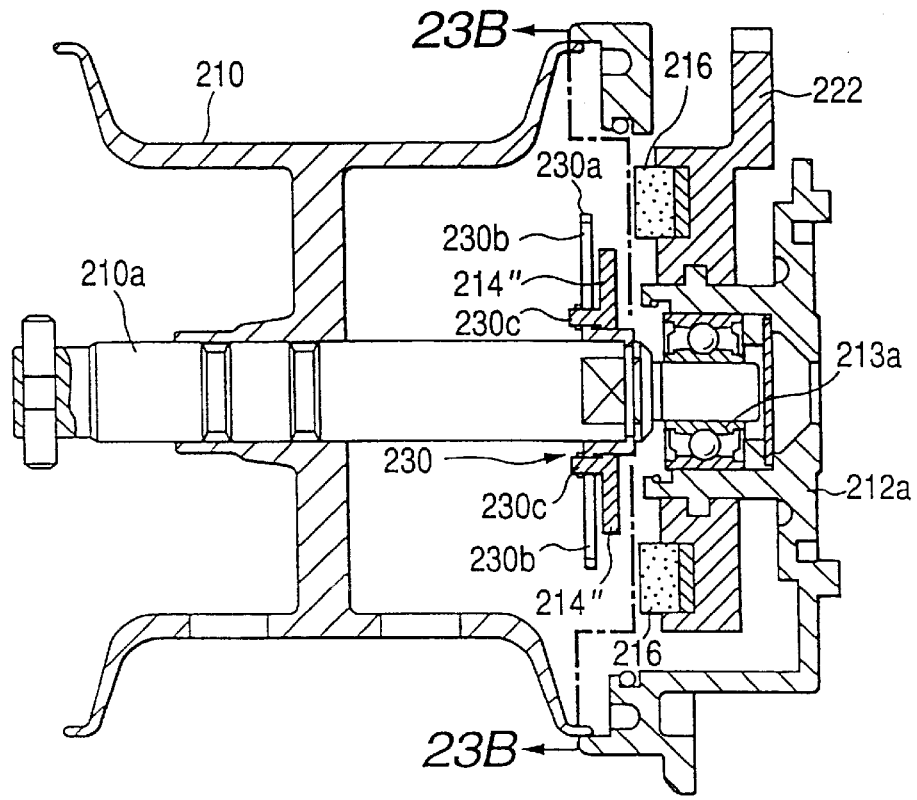
FIG. 23(A) is a schematic and vertical cross sectional view showing an essential portion of the fishing reel according to a fifth embodiment of the present invention in which a state from a moment at which the spool is not rotated and a moment at which the rotational speed of the spool reaches certain speed and a state in which the rotational speed of the spool has been reduced from certain speed are shown.
Figure 23B:
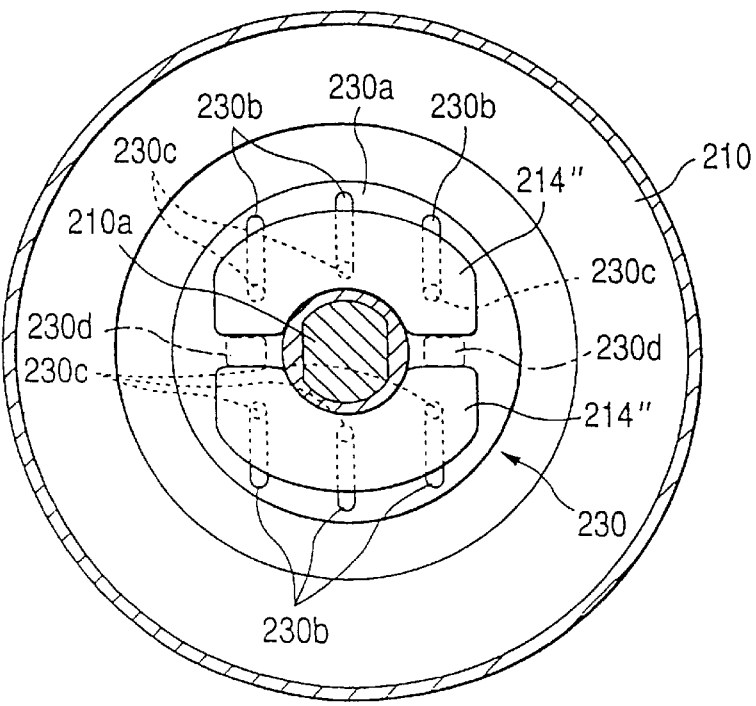
FIG. 23(B) is a schematic and horizontal cross sectional view taken along line 23B—23B shown in FIG. 23(A)

In this embodiment, the spool rotational-speed control means 230, as shown in FIGS. 23(A) and 23(B), has a support frame 230a expanding to the outside in the radial direction at the end of the spool shaft 210a, a radial-directional-movement enable support means for movably supporting the pair of the conductive members 214" disposed on the side surface of the support frame 230a facing the plural magnets 216 of the side wall 212a, disposed around the spool shaft 210a across the spool shaft 210a and each having a semi-circular shape in the radial direction in a predetermined range, and an urging means 230d for urging the pair of the conductive members 214" in the radial direction toward the spool shaft 210a. The radial-directional-movement enable support means has a plurality of guide holes 230b extending in the support frame 230a in the radial direction in the predetermined range and a movement guide projection 30c movably inserted into the plural guide holes 230b along the plural guide holes 230b and secured to the pair of the conductive members 214". The urging means 230d is constituted by a pair of tension springs having two ends connected to the pair of the conductive members 214" on the two sides of the spool shaft 210a.

The centrifugal force which is generated in the pair of the conductive members 214" which are rotated together with the spool shaft 210a is weak in the initial stage immediately after the casting operation has been started until the rotational speed of the spool 210 reaches predetermined speed. Thus, the pair of the conductive members 214" cannot move to the outside in the radial direction of the spool shaft 210a against the urging force of the urging means 230d. Thus, the conductive members 214" are disposed in the retracting position adjacent to the center line of the rotations of the spool shaft 210a, as shown in FIGS. 23(A) and 23(B). Therefore, the pair of the conductive members 214" cannot approach the plural magnets 216 of the side wall 212a of the reel body 212 in the radial direction of the spool shaft 210a. Thus, the magnetic force of the plural magnets 216 does not generate any eddy current in the pair of the conductive members 214". Therefore, no braking force is generated in the spool 210 which is rotated together with the pair of the conductive members 214". Even if a small eddy current is generated in the pair of the conductive members 214" at the retracted position by dint of the magnetic flux generated by the plural magnets 216, the braking force generated by the small eddy current is very small.

Figure 24A:
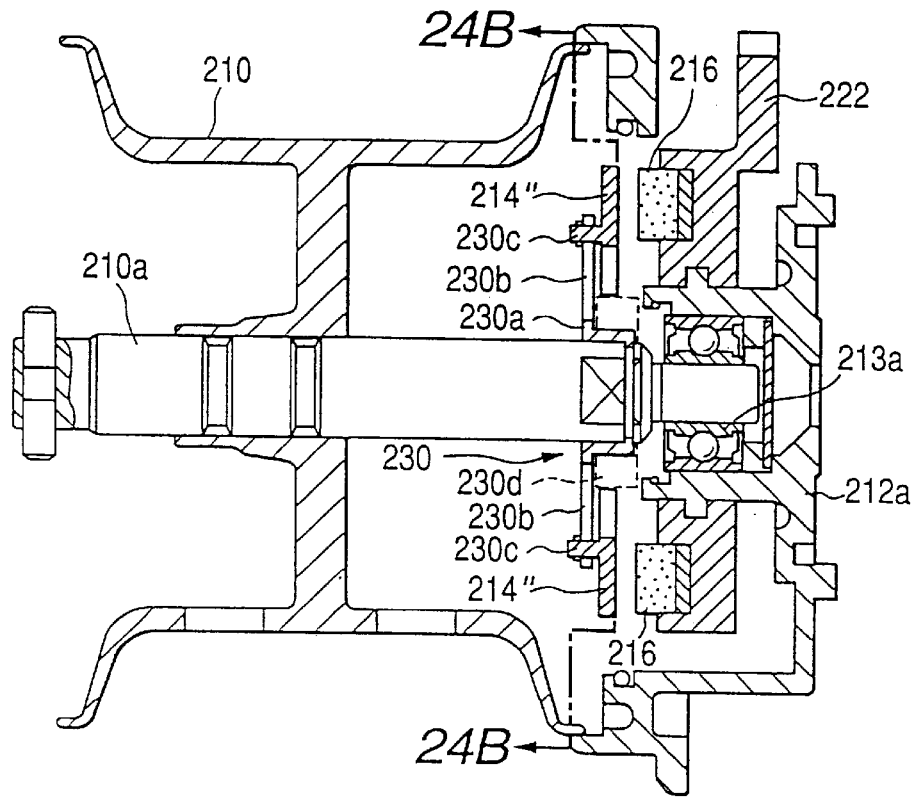
FIG. 24(A) is a schematic and vertical cross sectional view showing an essential portion of a fishing reel according to a fifth embodiment of the present invention in which a state is shown in which the spool is being rotated at high speed higher than certain rotational speed.
Figure 24B:
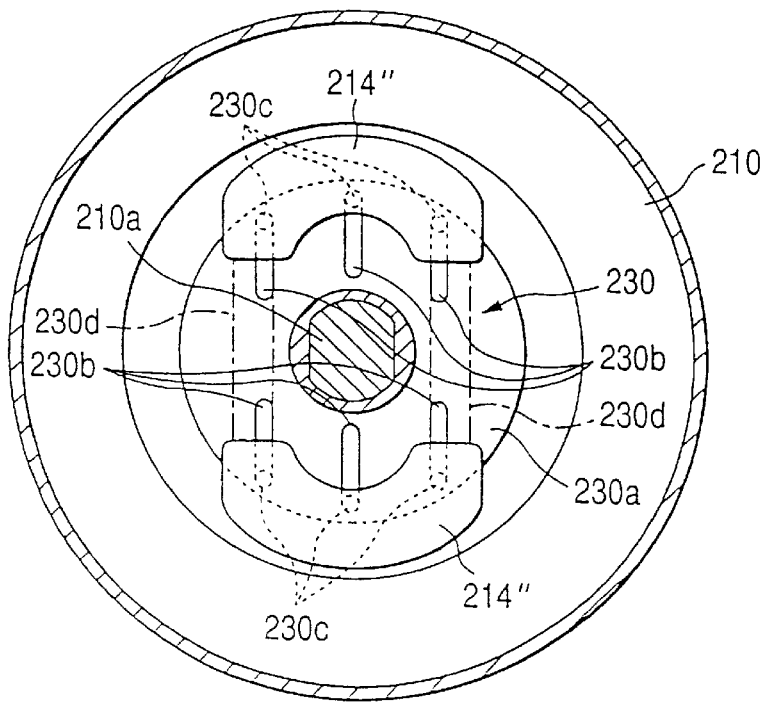
FIG. 24(B) is a schematic and horizontal cross sectional view taken along line 24B—24B shown in FIG. 24.

In an intermediate period of the casting operation, the rotational speed of the spool 210 is reached certain speed. In this period, the centrifugal force generated in the pair of the conductive members 214" which are rotated together with the spool shaft 210a is enlarged. Thus, the pair of the conductive members 214" are able to move from the retracted position adjacent to the center line of the rotations of the spool shaft 210a as shown in FIGS. 23(A) and 23(B) to the projecting position apart from the center line of the rotations of the spool shaft 210a in the radial direction of the spool shaft 210a as shown in FIGS. 24(A) and 24(B) against the urging force of the urging means 230d. Therefore, the pair of the conductive members 214" gradually approach the plural magnets 216 of the side wall 212a of the reel body 212 in the radial direction of the spool shaft 210a. Therefore, the magnetic force of the plural magnets 216 enlarges the level of the eddy current which is generated in the pair of the conductive members 214" in proportion to the area of the pair of the conductive members 214'" traversing the magnetic flux generated by the plural magnets 216 and the rotational speed of the spool 210. Also the braking force generated by the eddy current is enlarged in proportion to the area of the pair of the conductive members 214" traversing the magnetic flux generated by the plural magnets 216 and the rotational speed of the spool 210.

In the final period of the casting operation in which the rotational speed of the spool 210 has been reduced and the centrifugal force which is generated in the pair of the conductive members 214'" which are rotated together with the spool shaft 210a has been reduced, the pair of the conductive members 214" are, by the urging force of the urging means 230d, pulled from the projecting position on the outside in the radial direction of the spool shaft 210a indicated with a solid line shown in FIGS. 24(A) and 24(B) to the retracted position adjacent to the center line of the rotations of the spool shaft 210a on the inside of the radial direction of the spool shaft 210a, adjacent to the center line of the rotations of the spool shaft 210a and shown in FIGS. 23(A) and 23(B). Therefore, the pair of the conductive members 214" are gradually moved from the plural magnets 216 of the side wall 212a of the reel body 212 in the radial direction of the spool shaft 210a. Therefore, the level of the eddy current which is generated in the pair of the conductive members 214" by the magnetic force of the plural magnets 216 is reduced in proportion to the area of the pair of the conductive members 214" traversing the magnetic flux generated by the plural magnets 216 and the rotational speed of the spool 210. Also the braking force generated by the eddy current is reduced in proportion to the area of the pair of the conductive members 214" traversing the magnetic flux generated by the plural magnets 216 and the rotational speed of the spool 210.

The effect of the operation of the fishing reel according to the fifth embodiment and obtainable in the casting operation is the same as the above-mentioned effect obtainable from the fishing reel according to the fourth embodiment in the casting operation.

In this embodiment, the braking force which is generated by the spool rotational-speed control means 230 and which acts on the spool 210 can be adjusted to correspond to the rise/reduction in the rotational speed of the spool 210 by adjusting the weight and shape of the pair of the conductive members 214" or the urging force of the urging means 230d. Thus, the control of the rotational speed of the spool 210 can be adjusted.

In this embodiment, the same effect can be obtained if the positions of the pair of the conductive members 214" and the magnets 216 are changed. That is, the pair of the conductive members 214" are disposed on the inner surface of the side wall 212a of the reel body 212. Moreover, the pair of the radial-directional movable member are movably supported along the plural guide holes 230b of the support frame 230a by the movement guide projection 30d of the radial-directional-movement enable support means so that the plural magnets 216 are secured to the pair of the radial-directional movable members. The pair of the radial-directional movable member may directly be constituted by the plural magnets 216.

Sixth Embodiment

Figure 25:
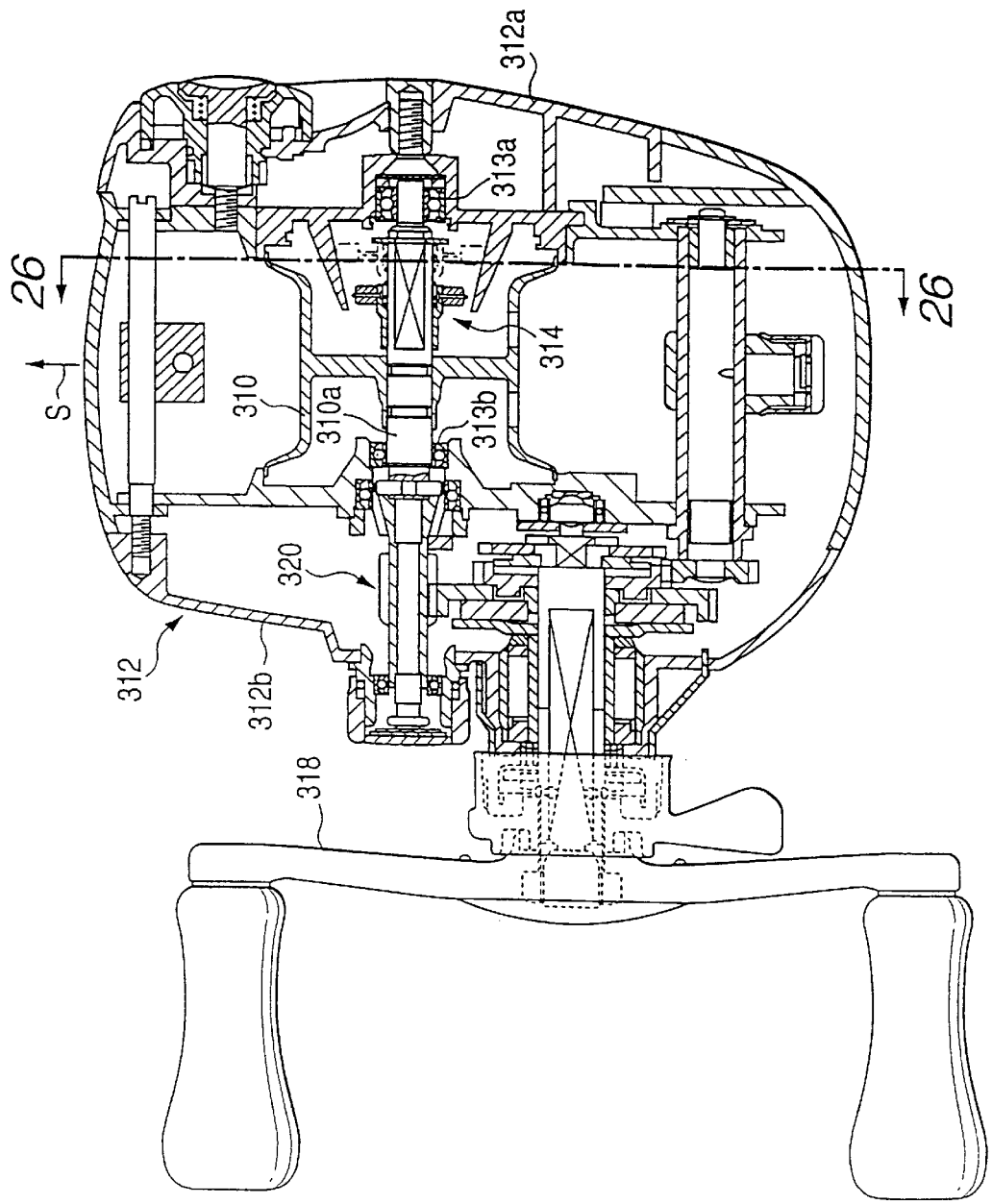
FIG. 25 is a schematic and horizontal cross sectional view showing a fishing reel according to a sixth embodiment of the projection.
Figure 27A:
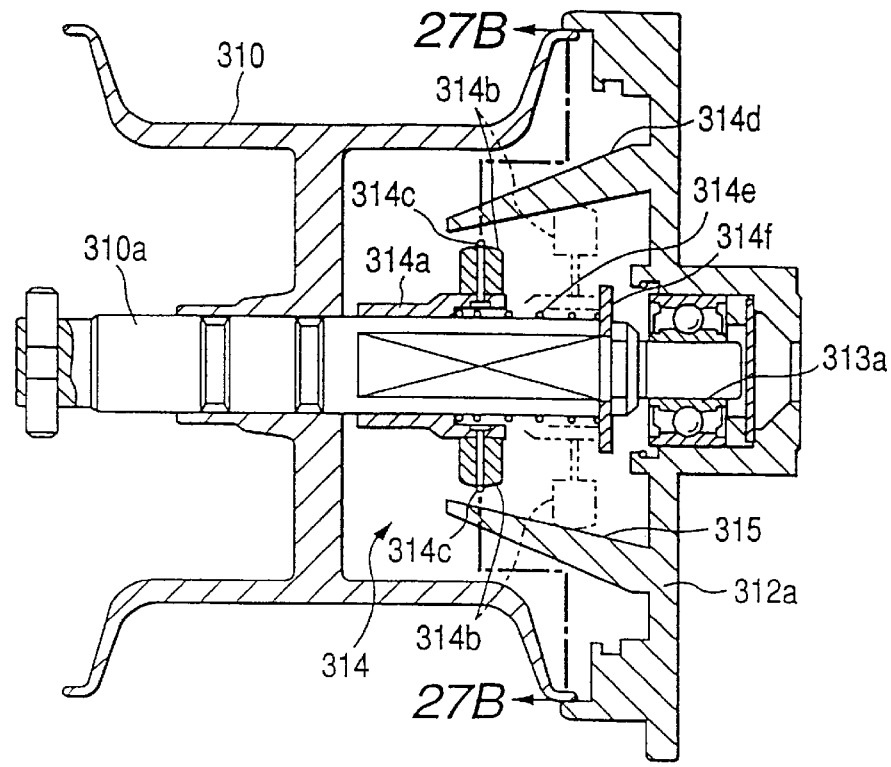
FIG. 27(A) is a schematic and vertical cross sectional view showing an essential portion of the fishing reel shown in FIG. 25 in which a state from a moment at which the spool is not rotated and a moment at which the rotational speed of the spool reaches certain speed is shown with a solid line and a state in which the rotational speed of the spool has been reduced from certain speed is shown with an alternate long and two dashes line.
Figure 27B:
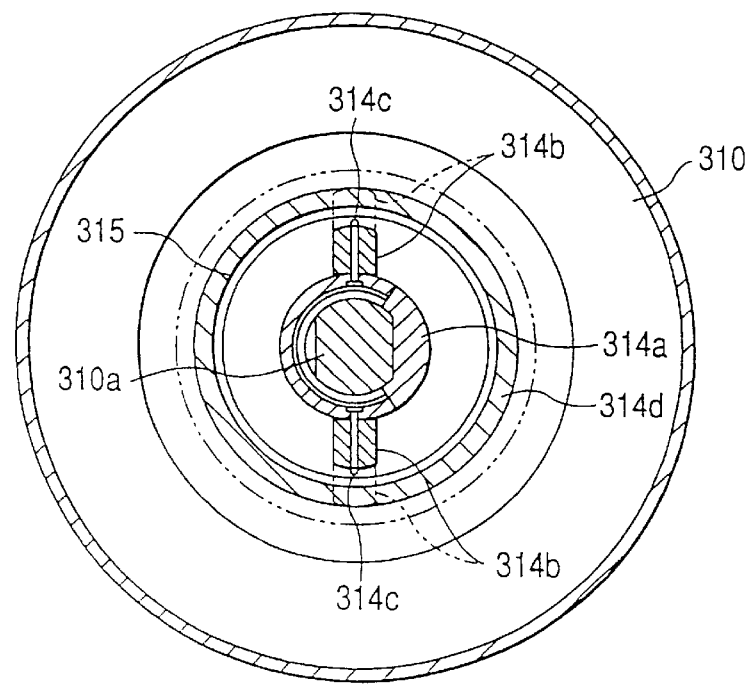
FIG. 27(B) is a schematic and horizontal cross sectional view taken along line 27B—27B shown in FIG. 27.

Referring to FIGS. 25, 27(A) and 27(B), a seventh embodiment of the fishing reel according to the present invention will now be described.

Figure 26:
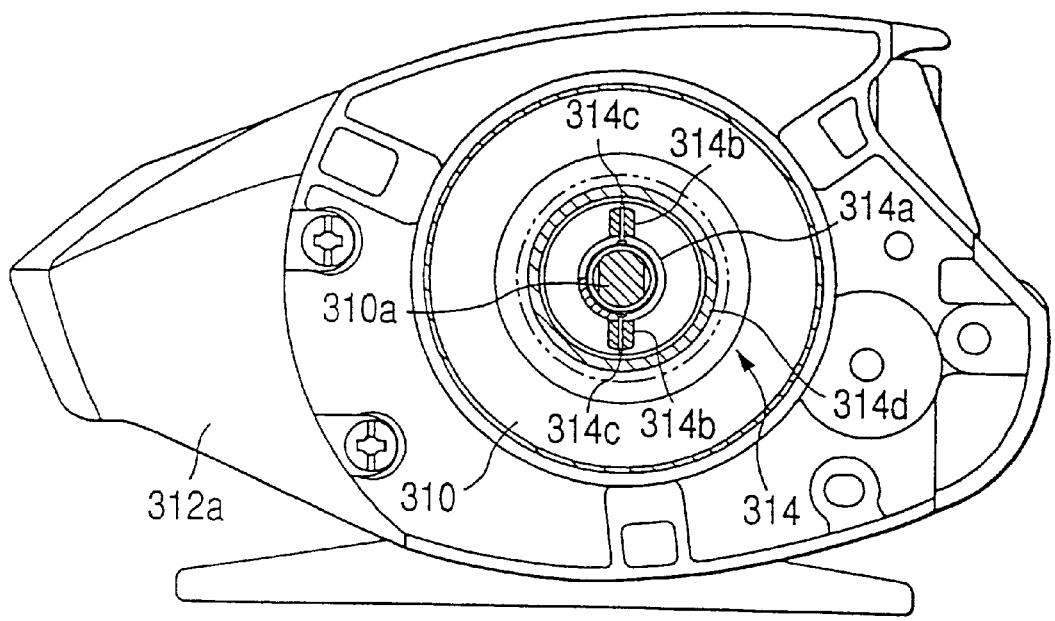
FIG. 26 is a schematic and horizontal cross sectional view taken along line 26—26 shown in FIG. 25.

FIG. 25 is a schematic and horizontal cross sectional view showing a fishing reel according to a sixth embodiment of the projection. FIG. 26 is a schematic and horizontal cross sectional view taken along line 26—26 shown in FIG. 25. FIG. 27(A) is a schematic and vertical cross sectional view showing an essential portion of the fishing reel shown in FIG. 25 in which a state from a moment at which the spool is not rotated and a moment at which the rotational speed of the spool reaches certain speed is shown with a solid line and a state in which the rotational speed of the spool has been reduced from certain speed is shown with an alternate long and two dashes line. FIG. 27(B) is a schematic and horizontal cross sectional view taken along line 27B—27B shown in FIG. 27.

A spool rotational-speed control mechanism 314 for controlling the rotational speed of the spool 310 when the spool 310 is freely rotated by using frictional braking force is disposed between an end surface of the spool 310 and a side wall 312a of the reel body 312 provided with a bearing 313a which rotatively supports an end (a right-hand end shown in FIG. 25) of the spool shaft 310a projecting over an end surface of the spool 310.

Another side wall 312b provided with a bearing 313b which rotatively supports another end (the left-hand end shown in FIG. 25) of the spool shaft 310a projecting over another end surface of the spool 310 has a rotative handle 318. Moreover, a clutch-equipped rotational-force transmission means 320 for selectively transmitting rotational force supplied from the handle 318 to another end of the spool shaft 310a is provided. The clutch-equipped rotational-force transmission means 320 will now be described. When a clutch is operated by depressing an operation button (not shown), selection of a state from two states is permitted one of which is a spool free rotation state in which free rotation of the spool shaft 310a is permitted to permit unreeling (an arrow S shown in FIG. 25 indicates a direction in which the fishing line is unreeled) of a fishing line (not shown). Another state is a spool operation state in which rotational force supplied from the handle 318 is transmitted to the spool 310 through another end of the spool shaft 310a so as to wind the fishing line (not shown) around the spool 310 in a direction opposite to the unreeling direction indicated with the arrow S shown in FIG. 25. Since the structure of the clutch-equipped rotational-force transmission means 320 is a known fact, the description of the structure is omitted here.

The spool rotational-speed control mechanism 314, as shown in FIGS. 26, 27(A) and 27(B), comprises a movable member 314a movable member 314a disposed at an end of the spool shaft 310a, arranged to be rotated together with the spool shaft 310a and made to be movable in a direction (the lengthwise direction) along the center line of the rotations of the spool shaft 310a; and a plurality of braking members 314b provided for the movable member 314a movable in the radial direction of the spool shaft 310a and arranged to be moved to the outside in the radial direction by the centrifugal force which is generated when the spool 310 is rotated. In this embodiment, two braking members 314b are provided at the same intervals in the circumferential direction of the spool shaft 310a. Two or more braking members 314b may be provided in the circumferential direction. In this embodiment, the plurality of the braking members 314b are penetrated by a pair of guide rods 314c projecting over the outer surface at the end of the 10a into a straight shape in the direction of the diameter of the spool shaft 310a so that the movements of the braking members 314b are guided in the radial direction. The braking members 314b may be received by guide grooves formed in a support member extending from the outer surface of the end of the spool shaft 310a to the outside in the radial direction, the guide grooves being elongated to the outside in the radial direction. Thus, the radial-directional movements may be guided.

The spool rotational-speed control mechanism 314 has an annular braking member 314d which surrounds the end of the spool shaft 310a on the inner surface of the side wall 312a of the reel body 312. The annular braking member 314d is disposed opposite to the braking members 314b from the outside in the radial direction in the range of the movement of the braking members 314b in the direction along the center line of the rotations of the spool shaft 310a when the movable member 314a is moved at the end of the spool shaft 310a. An inner surface 315 of the annular braking member 314d is tapered in such a manner that the diameter of the inner surface 315 is gradually enlarged along the center line of the rotations from the end surface of the spool 310 toward the inner surface of the side wall 312a of the reel body 312.

The spool rotational-speed control mechanism 314 further comprises an urging means 314e for urging the movable member 314a to be moved away from the inner surface of the side wall 312a of the reel body 312 along the center line of the rotations at the end of the spool shaft 310a. The urging means 314e will now be described. In this embodiment, an engagement member 314f is secured at a position adjacent to a bearing 313a of the side wall 312a of the reel body 312 at the end of the spool shaft 310a. A compression coil spring wound between the engagement member 314f and the movable member 314a at the end of the spool shaft 310a constitutes the urging means 314e.

Although this embodiment has the structure that the annular braking member 314d is integrally formed with the side wall 312a of the reel body 312, the annular braking member 314d may independently be formed from the side wall 312a of the reel body 312. Then, the annular braking member 314d is secured to the side wall 312a of the reel body 312.

The plurality of the braking members 314b on the movable member 314a which is being urged by the urging means 314e are positioned opposite to a minimum opening portion of the tapered inner surface 315 of the annular braking member 314d in the radial direction.

The operation of the fishing reel according to the first embodiment of the present invention and having the above-mentioned structure will now be described.

When a fishing rod having the fishing reel according to the sixth embodiment is swung for performing a casting operation, a tackle (not shown) which flies toward a target position on the water surface pulls a fishing line (not shown). Thus, the spool 310 starts rotating in a predetermined direction.

The centrifugal force which is generated in the plurality of the braking members 314b on the movable member 314a which is rotated together with the spool shaft 310a is weak in the initial stage immediately after the casting operation has been started until the rotational speed of the spool 10 reaches predetermined speed. Also frictional braking force which is generated when the plurality of the braking members 314b are pressed against the tapered inner surface 315 of the annular braking member 314d by the centrifugal force is weak. Since the inner surface 315 is inclined, weak frictional braking force is generated as compared with that which is generated when the braking members 314b are pressed against the conventional cylindrical inner surface if the spool 310 is rotated at the same rotational speed.

Therefore, the rotational speed of the spool 310 can be raised considerably until the rotational speed of the spool 310 reaches certain speed in the initial stage of the casting operation immediately after the casting operation has been started as compared with the conventional structure. Thus, the distance for which the tackle can be thrown in the initial period of the casting operation, that is, the distance for which the tackle can be thrown in a period from the start to the end of the casting operation can be elongated as compared with the conventional structure.

Since the plurality of the braking members 314b are pressed against the tapered inner surface 315 of the annular braking member 314d by the centrifugal force, movable-member moving force for moving the plurality of the braking members 314b together with the movable member 314a toward the large diameter portion of the tapered inner surface 315 is generated.

When the rotational speed of the spool 310 has reached certain speed and thus the movable-member moving force which moves the plurality of the braking members 314*b* together with the movable member 314*a* toward the large diameter portion of the tapered inner surface 315 and which is generated from a portion of the centrifugal force generated by the plurality of the braking members 314*b* overcomes the urging force of the urging means 314*e*, the movable member 314*a* cannot move toward the inner surface of the side wall 312*a* of the reel body 312 along the center line of the rotations on the end of the spool shaft 310*a*.

In an intermediate period of the casting operation, the rotational speed of the spool 310 is reached certain speed. In this period, the frictional braking force which is generated when the plurality of the braking members 314*b* on the movable member 314*a* which is rotated together with the spool shaft 310*a* are pressed against the tapered inner surface 315 of the annular braking member 314*d* is enlarged as compared with the initial period. Since the inner surface 315 is inclined, the generated frictional braking force is small when the spool 310 is rotated at the same rotational speed as compared with the braking members 314*b* is pressed against the cylindrical inner surface of the conventional structure.

Therefore, the rotational speed of the spool 310 can be raised as compared with the conventional structure even after the rotational speed has reached the certain speed in the intermediate period of the casting operation. Therefore, the distance for which the tackle can be thrown in the intermediate period of the casting operation, that is the distance for which the tackle can be thrown can be elongated as compared with the conventional structure during the overall period from the start to the end of the casting operation. Moreover, the frictional braking force generated as described above is able to satisfactorily prevent excessive rotation state in which the rotational speed of the spool 310 is raised excessively as compared with the flying speed for the tackle. Thus, generation of the backlash phenomenon of the fishing line in the intermediate period of the casting operation can be prevented.

When the plurality of the braking members 314*b* are pressed against the tapered inner surface 315 of the annular braking member 314*d*, movable-member moving force is generated which moves the plurality of the braking members 314*b* together with the movable member 314*a* toward the large diameter portion of the tapered inner surface 315.

When the rotational speed of the spool 310 has reached certain speed, the movable member moving force which is generated from a portion of the centrifugal force generated in the plurality of the braking members 314*b* and which moves the plurality of the braking members 314*b* together with the movable member 314*a* toward the large diameter portion of the tapered inner surface 315 overcomes the urging force of the urging means 314*e*. Thus, the plurality of the braking members 314*b* and the movable member 314*a* are gradually moved from the position adjacent to the small diameter portion of the tapered inner surface 315 of the annular braking member 314*d* as shown in the solid line shown in FIG. 27(A) to the position adjacent to the large diameter portion of the tapered inner surface 315 of the annular braking member 314*d* shown in an alternate long and two short dashes line shown in FIG. 27(A) at the end of the spool shaft 310*a* along the center line of the rotations and toward the inner surface of the side wall 312*a* of the reel body 312.

The tapered inner surface 315 of the annular braking member 314*d* against which the plurality of the braking members 314*b* are pressed by the centrifugal force constitutes the movable member moving means which moves the movable member 314*a* together with the plurality of the braking members 314*b* along the center line of the rotations toward the inner surface of the side wall 312*a* of the reel body 312 by the centrifugal force generated in the plurality of the braking members 314*b* when the spool 310 is rotated.

When the rotational speed of the spool 310 has been reduced in the final stage of the casting operation, the centrifugal force generated in the plurality of the braking members 314*b* on the spool rotational-speed control mechanism 314 which is rotated together with the spool shaft 310*a* is reduced. Thus, the frictional braking force which is generated when the plurality of the braking members 314*b* are pressed against the tapered inner surface 315 of the annular braking member 314*d* by the centrifugal force is reduced. Simultaneously, the movable member moving force which is generated from a portion of the centrifugal force generated in the plurality of the braking members 314*b* and which moves the plurality of the braking members 314*b* together with the movable member 314*a* toward the large diameter portion of the tapered inner surface 315 cannot overcome the urging force of the urging means 314*e*. Thus, the movable member 314*a* is, together with the plurality of the braking members 314*b*, gradually moved in a direction apart from the inner surface of the side wall 312*a* of the reel body 312 along the center line of the rotations on the end of the spool shaft 310*a* from a position adjacent to the large diameter portion of the tapered inner surface 315 of the annular braking member 314*d* indicated with an alternate long and two dashes line shown in FIG. 27(A) to the position adjacent to the small diameter portion of the tapered inner surface 315 of the annular braking member 314*d* indicated with a solid line shown in FIG. 27(A). During the movement, the plurality of the braking members 314*b* are, as it is, in contact with the tapered inner surface 315 of the annular braking member 314*d*.

Therefore, in the final stage of the casting operation, rapid reduction in the braking force can be prevented which takes place with the conventional fishing reel comprising the spool rotational-speed control means using only the frictional force generated by the centrifugal force. Thus, the excessive rotation state in which the rotational speed of the spool 310 is raised as compared with the flying speed of the tackle can satisfactorily be prevented. Also in the final stage of the casting operation, generation of the backlash phenomenon can be prevented.

Seventh Embodiment

Referring to FIGS. 28(A), 28(B), 29(A) and 29(B), a seventh embodiment of the fishing reel according to the present invention will now be described.

Figure 28A:
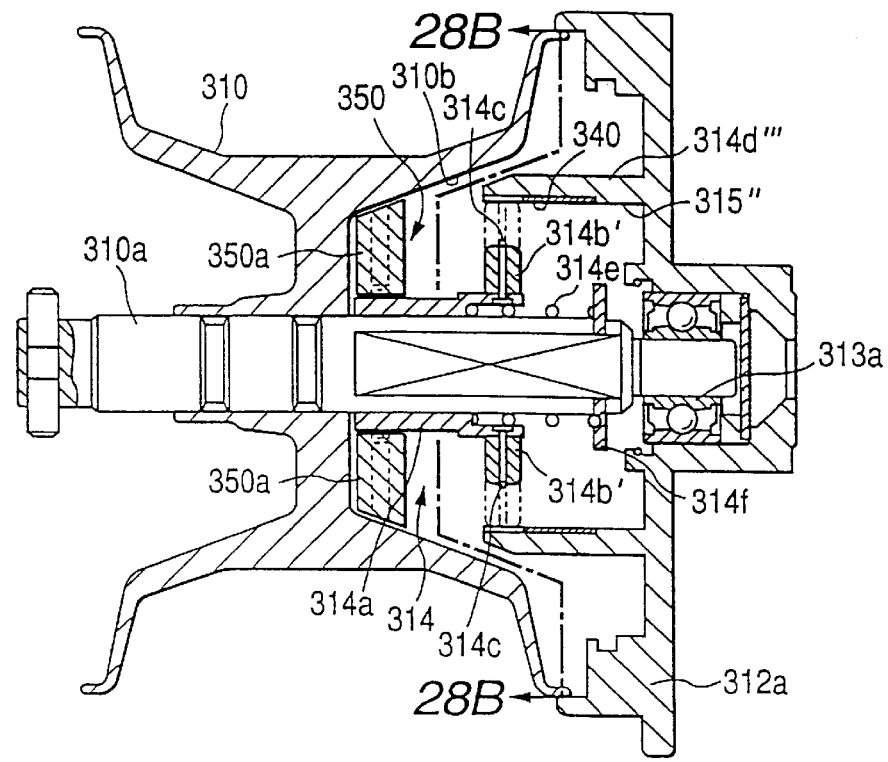
FIG. 28(A) is a schematic and vertical cross sectional view showing an essential portion of a fishing reel according to a seventh embodiment of the present invention in which a state from a moment at which the spool is not rotated and a moment at which the rotational speed of the spool reaches certain speed and a state in which the rotational speed of the spool has been reduced from certain speed are shown.
Figure 28B:
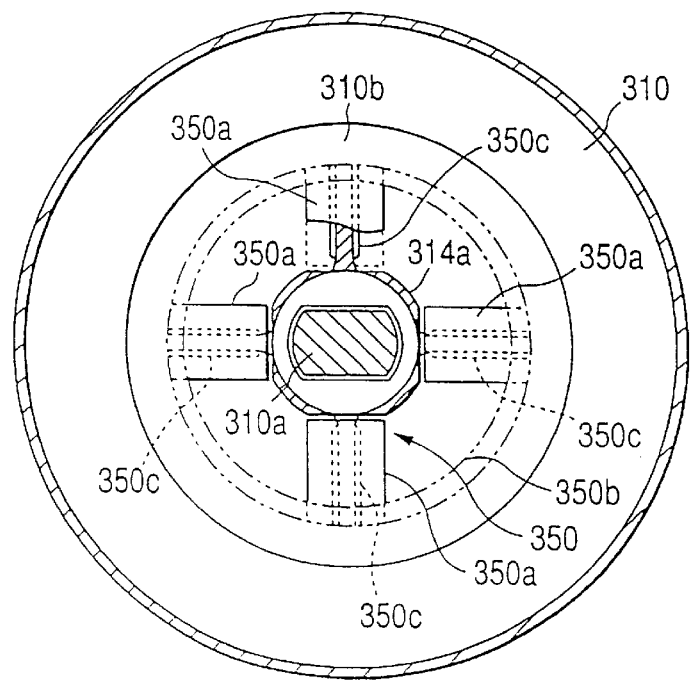
FIG. 28(B) is a schematic and horizontal cross sectional view taken along line 28B—28B shown in FIG. 28(A)
Figure 29A:
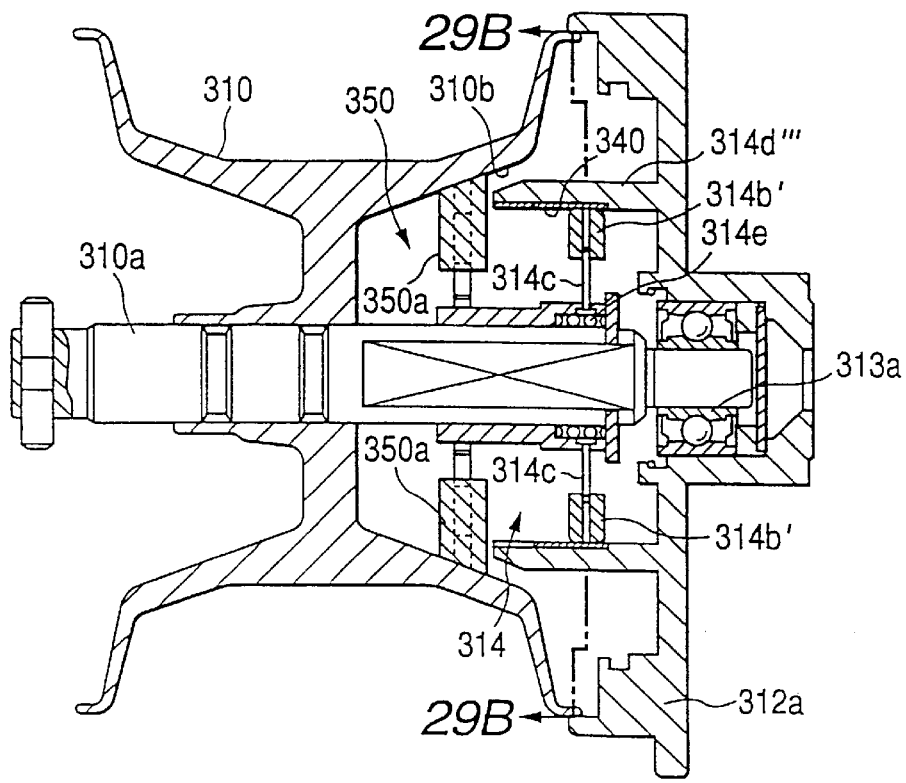
FIG. 29(A) is a schematic and horizontal cross sectional view showing an essential portion of a fishing reel according to a seventh embodiment of the present invention in which a state is shown in which the rotational speed of the spool has reached speed not lower than certain speed.
Figure 29B:
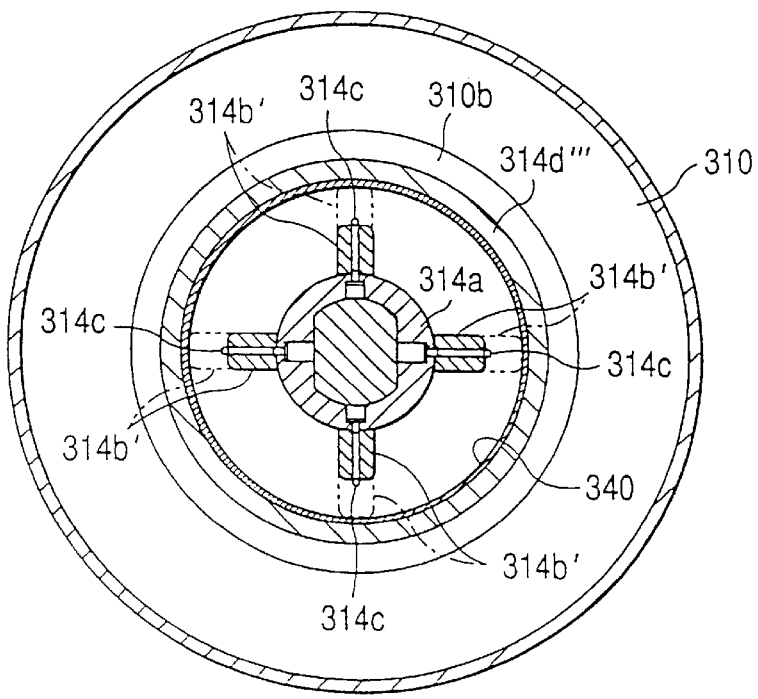
FIG. 29(B) is a schematic and horizontal cross sectional view taken along line 29B—29B shown in FIG. 29(A)

FIG. 28(A) is a schematic and vertical cross sectional view showing an essential portion of a fishing reel according to a seventh embodiment of the present invention in which a state from a moment at which the spool is not rotated and a moment at which the rotational speed of the spool reaches certain speed and a state in which the rotational speed of the spool has been reduced from certain speed are shown. FIG. 28(B) is a schematic and horizontal cross sectional view taken along line 28B—28B shown in FIG. 28(A). FIG. 29(A) is a schematic and horizontal cross sectional view showing an essential portion of a fishing reel according to a seventh embodiment of the present invention in which a state is shown in which the rotational speed of the spool has reached speed not lower than certain speed. FIG. 29(B) is a schematic and horizontal cross sectional view taken along line 29B—29B shown in FIG. 29(A).

The major portion of the fishing reel according to the fifth embodiment of the present invention is common to the major portion of the fishing reel according to the sixth embodiment of the present invention shown in FIGS. 25 to 27(A) and 27(B). Therefore, the same elements as those according to the sixth embodiment are given the same reference numerals and the same elements are omitted from description.

This embodiment is different from the sixth embodiment in that an inner surface 315" of an annular braking member 314d'" formed on the inner surface of the side wall 312a of the reel body 312 is formed into a cylindrical shape extending in parallel to the center line of the rotations of the spool shaft 310a. Moreover, a cylindrical ring 340 having a different coefficient of friction is secured to the inner surface 315" of the annular braking member 314d'" in a direction along the center line of the rotations of the spool shaft 310a. In addition, a movable member moving means 350 is provided for the movable member 314a at a position adjacent to the end surface of the spool 310.

The movable member moving means 350 includes a plurality of radial-directional movable members 350a disposed apart from each other at the same intervals in the circumferential direction of the spool shaft 310a and provided for the movable member 314a at positions adjacent to the end surface of the spool 310, the radial-directional movable members 350a being movable in a radial direction of the spool shaft 310a.

Specifically, the movable member moving means 350 according to this embodiment has a support frame 350b extending from a position adjacent to the end surface of the spool 310 toward the outside in the radial direction of the spool shaft 310a and a plurality of guide holes 350c provided for the support frame 350b and formed at a plurality of positions apart from each other at the same intervals in the circumferential direction of the spool shaft 310a toward the outside of the radial direction. The plurality of the radial-directional movable members 350a are engaged to the plurality of the guide holes 350c of the support frame 350b so as to be capable of moving only in the radial direction along the plurality of the guide holes 350c.

The coefficient of friction of the cylindrical ring 340 is gradually enlarged as the distance from the end surface of the spool 310 is elongated in the direction along the center line of the rotations of the spool shaft 310a.

When a fishing rod having the fishing reel according to the seventh embodiment is swung to perform the casting operation, small centrifugal force is generated in the plurality of the braking members 314b' on the movable member 314a which is rotated together with the spool shaft 310a in the initial period of the casting operation until the rotational speed of the spool 310 reaches certain speed. Also the frictional braking force which is generated because the plurality of the braking members 314b' are pressed against the cylindrical inner surface 315" of the annular braking member 314d'" is weak.

Moreover, the coefficient of friction of the cylindrical ring 340 of the inner surface 315" at the position at which the plurality of the braking members 314b' are pressed is the smallest. Therefore, the frictional braking force generated as described above is weakened.

Therefore, the rotational speed of the spool 310 can be raised as compared with the conventional structure until the rotational speed of the spool 310 reaches certain speed in the initial period of the casting operation. Thus, the distance for which the tackle can be thrown can be elongated as compared with the conventional structure during the overall period from start to the end of the casting operation.

Since the plurality of the radial-directional movable members 350a are pressed against the tapered inner surface 310b which is expanded toward the inner surface of the side wall 312a of the reel body 312 in a portion around the end surface of the spool 310 by the centrifugal force, movable-member moving force for moving the plurality of the radial-directional movable members 350a together with the movable member 314a to the inner surface of the side wall 312a of the reel body 312 is generated.

When the rotational speed of the spool 310 has reached certain speed and thus the movable-member moving force which moves the plurality of the radial-directional movable members 350a together with the movable member 314a toward the inner surface of the side wall 312a of the reel body 312 and which is generated from a portion of the centrifugal force generated by the plurality of the radial-directional movable members 350a overcomes the urging force of the urging means 314e, the movable member 314a cannot move toward the inner surface of the side wall 312a of the reel body 312 along the center line of the rotations on the end of the spool shaft 310a.

In an intermediate period of the casting operation, the rotational speed of the spool 310 is reached certain speed. In this period, the movable member moving force which is generated when the plurality of the radial-directional movable members 350a on the movable member 314a which is rotated together with the spool shaft 310a are pressed against the tapered engagement member 310b around the end surface of the spool 310 by the centrifugal force overcomes the urging force of the urging means 314e. As a result, the movable member 314a is gradually moved from a position adjacent to the end surface of the spool 310 indicated with a solid line shown in FIG. 28(A) toward the inner surface of the side wall 312a of the reel body 312 indicated with a solid line shown in FIG. 29(A).

In an intermediate period of the casting operation in which the rotational speed of the spool 310 has reached certain speed, the frictional braking force which is generated when the plurality of the braking members 314b' on the movable member 314a which is rotated together with the spool shaft 310a are pressed against the cylindrical inner surface 315" of the annular braking member 314d by the frictional force is enlarged as compared with that in the initial period. Moreover, the coefficient of friction is enlarged at the cylindrical ring 340 with which the plurality of the braking members 314b' which are moved together with the movable member 314a from position adjacent to the end surface of the spool 310 toward the inner surface of the side wall 312a of the reel body 312 is brought into contact. The generated frictional braking force is able to satisfactorily prevent the excessive rotation state in which the rotational speed of the spool 310 is raised as compared with the flying speed of the tackle. As a result, the backlash phenomenon of the fishing line in the intermediate period of the casting operation can be prevented.

When the rotational speed of the spool 310 has been reduced in the final stage of the casting operation, the movable member moving force which is generated when the plurality of the radial-directional movable members 350a on the spool rotational-speed control mechanism 314 which is rotated together with the spool shaft 310a are pressed against the tapered engagement member 310b around the end surface of the spool 310 by the centrifugal force and which moves the plurality of the radial-directional movable members 350a together with the movable member 314a toward the inner surface of the side wall 312a of the reel body 312 is reduced. Thus, the movable member 314a is gradually pushed rearwards by the urging force of the urging means 314e from a position adjacent to the inner surface of the side wall 312a of the reel body 312 as indicated with a solid line shown in FIG. 29(A) to a position adjacent to the end surface of the spool 310 as indicated with a solid line shown in FIG. 28 (A).

In the final period of the casting operation in which the rotational speed of the spool 310 is reduced and the centrifugal force which is generated in the plurality of the braking members 314b' on the spool rotational-speed control mechanism 314 which is rotated together with the spool shaft 310a is reduced. Thus, the frictional braking force which is generated when the plurality of the braking members 314b' are, by the centrifugal force, pressed against the cylindrical ring 340 of the cylindrical inner surface 315" of the annular braking member 314d''' is reduced. Moreover, the coefficient of friction at the cylindrical ring 340 with which the plurality of the braking members 314b' which are moved together with the movable member 314a from a portion adjacent to the inner surface of the side wall 312a of the reel body 312 to the position adjacent to the end surface of the spool 310 are brought into contact with is reduced.

Therefore, rapid reduction in the braking force which is experienced with the conventional fishing reel comprising the spool rotational-speed control means using only the frictional force generated by the centrifugal force can be prevented. Therefore, the excessive rotation state in which the rotational speed of the spool 310 is raised as compared with the flying speed of the tackle can satisfactorily be prevented. Thus, generation of the backlash phenomenon of the fishing line can be prevented also in the final stage of the casting operation.

In the above-mentioned embodiment, the cylindrical ring 340 constitutes the frictional braking force changing means which changes the magnitude of the frictional braking force which is generated between the plurality of the braking members 314b' and the cylindrical inner surface 315" of the of the annular braking member 314d by dint of the movements of the plurality of the braking members 314b' along the center line of the rotations which take place when the movable member 314a is moved.

The cylindrical ring 340 is detachably secured to the inner surface 315" of the annular braking member 314d. A plurality of the cylindrical rings 340 having different coefficients of friction in the direction along the center line of the rotations of the spool shaft 310a are manufactured. A required cylindrical ring 340 is selected from the plurality of the cylindrical rings 340 to detachably secure the same to the cylindrical inner surface 315" of the annular braking member 314d'''. Thus, the frictional braking force which is generated by the frictional braking force changing means can be varied.

In the seventh embodiment, the braking force which is generated by the spool rotational-speed control mechanism 314 in accordance with the rotational speed of the spool 310 can be adjusted by changing the inclination of the tapered inner surface 310b around the end surface of the spool 310 against which the plural radial-directional movable members 350a are pressed. As an alternative to this, the material or the surface finish of the spool shaft 310a may be changed or the number, material, weight or the shape of the plural radial-directional movable members 350a may be changed. Moreover, the urging force of the urging means 314e may be changed or the number, material, weight or the shape of the plural braking members 314b' may be changed.

Eighth Embodiment

Referring to FIGS. 30 to 34, a first embodiment of the fishing reel according to the present invention will now be described.

Figure 30:
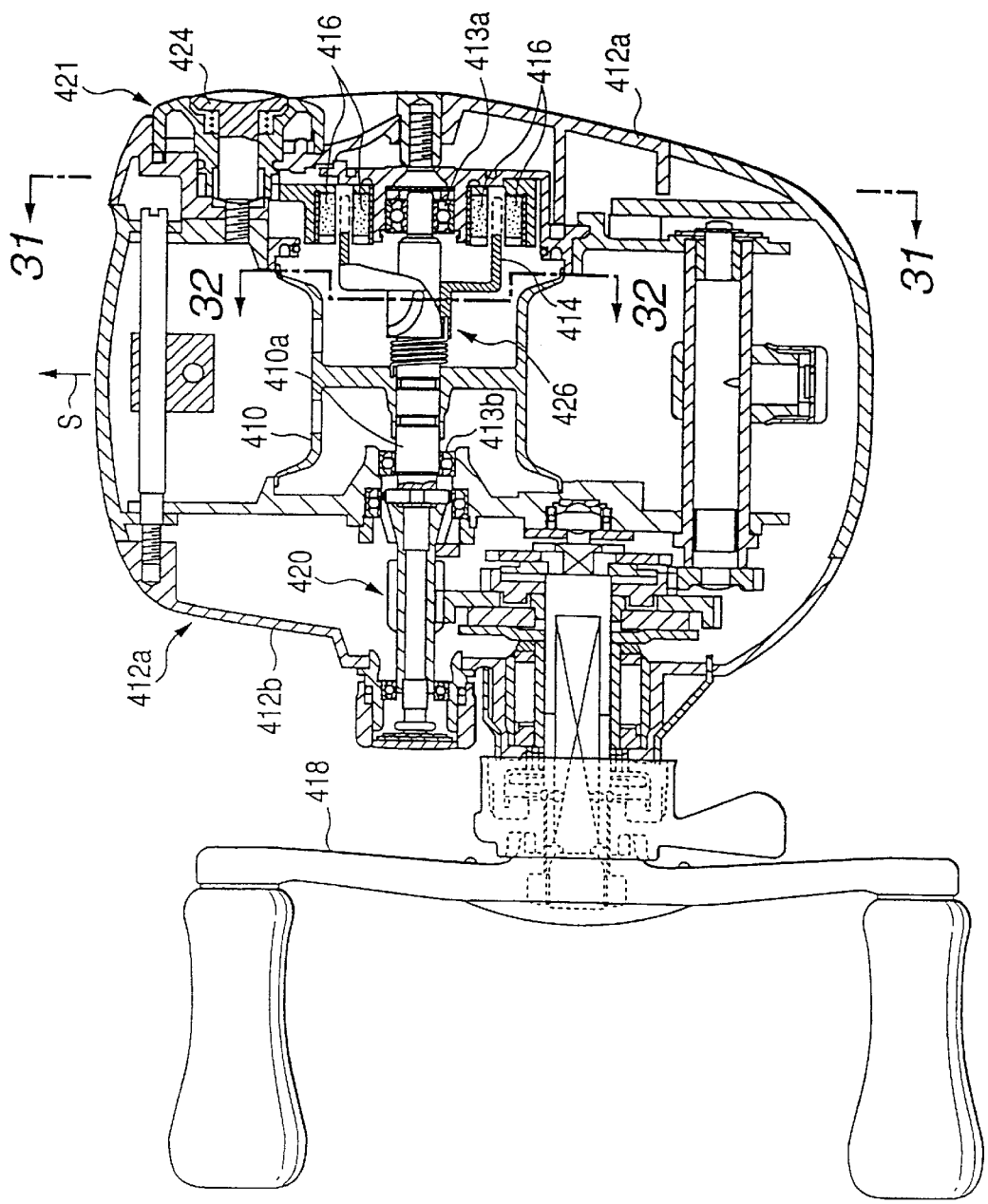
FIG. 30 is a schematic and horizontal cross sectional view showing a fishing reel according to an eighth embodiment of the present invention.

As shown in FIG. 30, the fishing reel according to the first embodiment of the present invention comprises a spool 410 around which a fishing line (not shown) is wound in such a manner that the fishing line can be unreeled; and a reel body 412 for rotatively supporting two ends of a spool shaft 410a of the spool 410 through bearings 413a and 413b and rotatively holding the spool 410.

A conductive member 414 made of, for example, aluminum or copper, is disposed at an end of the spool shaft 410a at a position between an end surface of the spool 410 and a bearing 413a which rotatively supports an end (the right-hand end in FIG. 30) of the spool shaft 410a projecting over an end surface of the spool 410. A side wall 412a of the reel body 412 provided with a bearing 413a which rotatively supports an end of the spool shaft 410a is provided with a plurality of magnets 416 corresponding to the conductive member 414 at the end of the spool shaft 410a.

Another side wall 412b provided with a bearing 413b, which rotatively supports another end (the left-hand end in FIG. 30) of the spool shaft 410a projecting over another end surface of the spool 410 is provided with a rotative handle 418. Moreover, a clutch-equipped rotational-force transmission means 420 for selectively transmitting rotational force supplied from the handle 418 to another end of the spool shaft 410a is provided. The clutch-equipped rotational-force transmission means 420 will now be described. When a clutch is operated by depressing an operation button (not shown), selection of a state from two states is permitted one of which is a spool free rotation state in which free rotation of the spool shaft 410a is permitted to permit unreeling (an arrow S shown in FIG. 30 indicates a direction in which the fishing line is unreeled) of a fishing line (not shown). Another state is a spool operation state in which rotational force supplied from the handle 418 is transmitted to the spool 410 through another end of the spool shaft 410a so as to wind the fishing line (not shown) around the spool 410 in a direction opposite to the unreeling direction indicated with the arrow S shown in FIG. 1. Since the structure of the clutch-equipped rotational-force transmission means 420 is a known fact, the description of the structure is omitted here.

Figure 31:
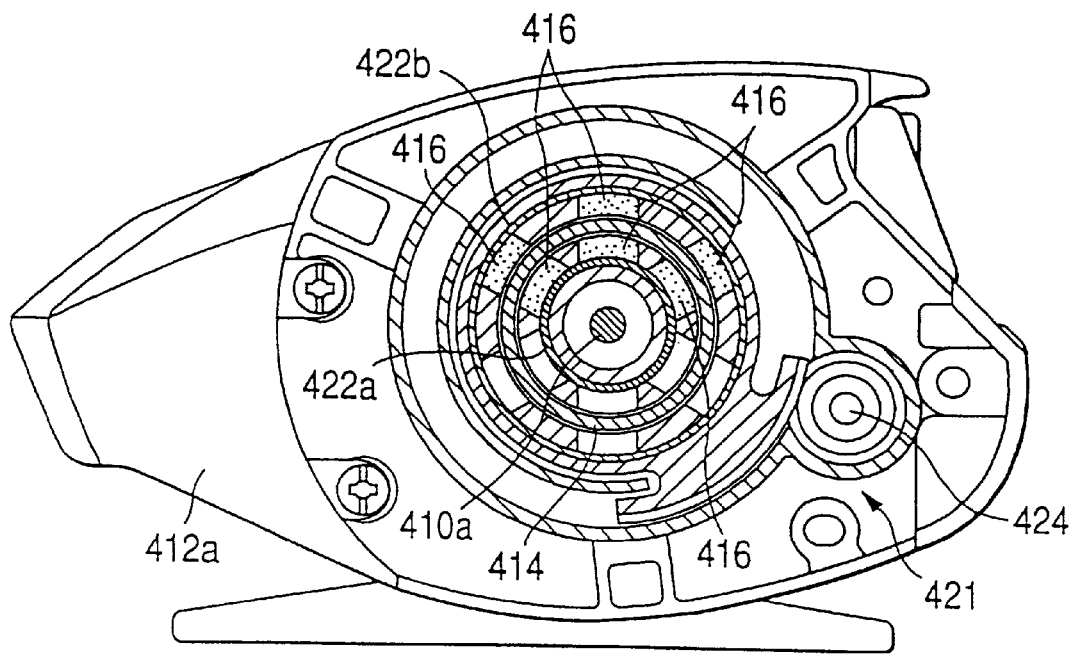
FIG. 31 is a schematic and horizontal cross sectional view taken along line 31—31 shown in FIG. 30.

As shown in FIGS. 30 and 31, the plural magnets 416 are provided for the side wall 412a of the reel body 412 through a magnetic-force adjustment means 421 for adjusting the magnetic force of the magnets 416 which acts on the stationary conductive member 414. In this embodiment, the magnetic-force adjustment means 421 includes double annular rings 422a and 42b disposed concentrically with respect to the spool shaft 410a. The plural magnets 416 are disposed on the double annular rings 422a and 422b in such a manner that the magnets 416 are disposed apart from one another at predetermined intervals in the circumferential direction.

The plurality of the magnets 416 of the inner annular ring 422a are disposed in such a manner that the magnetic poles facing outside in the radial direction of the inner annular ring 422a are different from each other. Also the plurality of the magnets 416 of the outer annular ring 422b are disposed in such a manner that the magnetic poles facing insides in the radial direction of the outer annular ring no 422b are different from each other.

The inner annular ring 422a is secured to the side wall 412a. The outer annular ring 422b will now be described. When a magnetic force adjustment button 424 provided for the side wall 412a is rotated in a direction, the magnetic pole of the outer annular ring 422b opposite to the magnetic pole of the inner annular ring 422a is changed.

Thus, the magnitude of the magnetic force which acts on the conductive member 414 is adjusted. That is, radial directional internal ends of the magnetic poles of the plural magnets 416 of the outer annular ring 422b which are different from the magnetic poles at the radial directional outer ends of the plural magnets 416 of the inner annular ring 422a are caused to face the magnetic poles at the radial directional outer ends of the plural magnets 416 of the outer annular ring 422b. Thus, a maximum attractive magnetic force state can be realized in which the radial directional outer end magnetic poles of the plural magnets 416 of the inner annular ring 422a and the radial direction inner end magnetic poles of the outer annular ring 422b generate maximum attractive magnetic forces. On the other hand, radial directional outer end magnetic poles of the plural magnets 416 of the inner annular ring 422a of the plural magnets 416 of the outer annular ring 422b are caused to face the radial direction inner end magnetic poles which are the same magnetic poles so that the radial directional outer end magnetic poles of the plural magnets 416 of the inner annular ring 422a and the radial directional inner end magnetic poles of the outer annular ring 422b generate maximum repulsive magnetic force. Thus, a maximum repulsive magnetic force state can be realized. The relative positions of the plural magnets 416 of the outer annular ring 422b are shifted with respect to the plural magnets 416 of the inner annular ring 422a between the above-mentioned two states. Thus, the magnitude of the magnetic force which acts on the conductive member 414 is adjusted to adjust the braking force which is applied to the spool 410.

As shown in FIG. 30, the conductive member 414 is disposed at the end of the spool shaft 410a through a spool rotational-speed control means 426 which changes the magnetic force of the plural magnets 416 of the side wall 412a of the reel body 412 which acts on the conductive member 414 in accordance with the rotational speed of the spool 410 so as to control the rotational speed of the spool 410 provided with the conductive member 414.

Figure 33A:
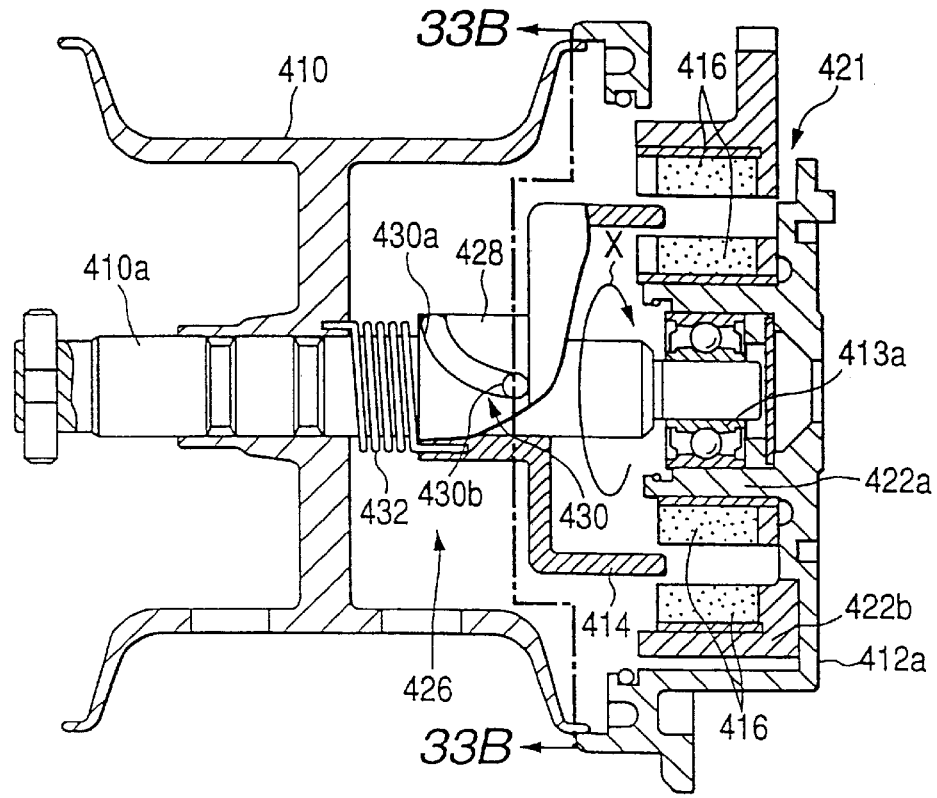
FIG. 33(A) is a schematic and vertical cross sectional view showing an essential portion of the fishing reel shown in FIG. 8 in which a state from a moment at which the spool is not rotated and a moment at which the rotational speed of the spool reaches certain speed and a state in which the rotational speed of the spool has been reduced from certain speed are shown.

As shown in FIG. 33(A), the spool rotational-speed control means 426 is provided with a movable member 428 at an end of the spool shaft 410a. The spool rotational-speed control means 426 is able to move in a direction (a lengthwise direction) along the center line of rotations of the spool shaft 410a. The lengthwise-directional movable member 428 is rotated together with the spool shaft 410a in the circumferential direction of the spool shaft 410a. The conductive member 414 is formed into a cylindrical shape. An end of the conductive member 414 opposite to the magnets 416 of the conductive member 414 is secured to the movable member 428 concentrically to the spool shaft 410a.

In this embodiment, the conductive member 414 and the movable member 428 are individually formed, and then secured. However, the conductive member 414 and the movable member 428 may integrally be made of the material of the conductive member 414.

Free ends of the conductive member 414 are disposed opposite to an annular gap between the concentric double annular rings 422a and 422b of the side wall 412a of the reel body 412, as shown in FIGS. 31 and 33(A).

Figure 32:
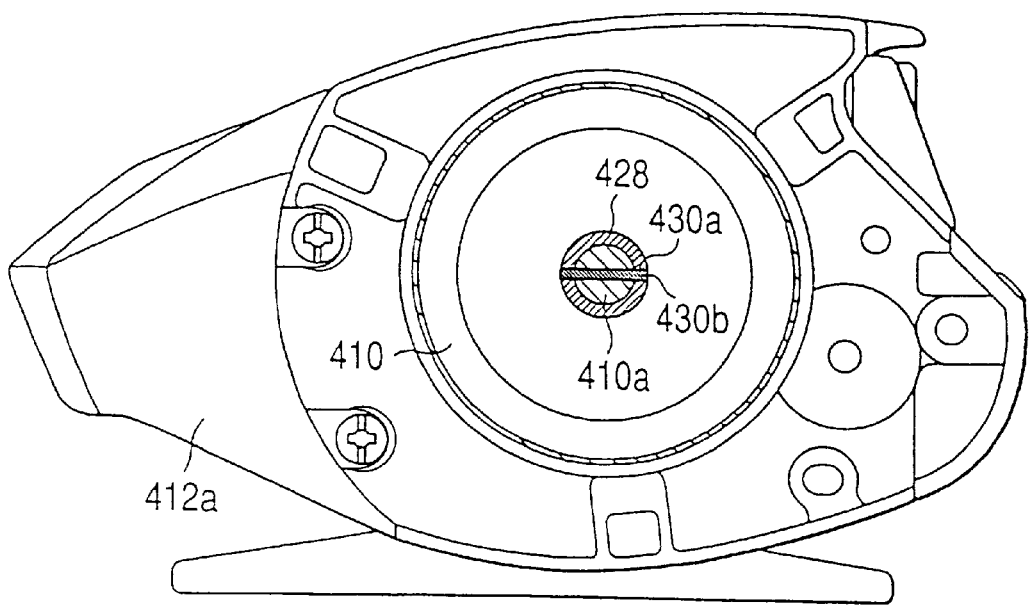
FIG. 32 is a schematic and horizontal cross sectional view taken along line 32—32 shown in FIG. 30.
Figure 33B:
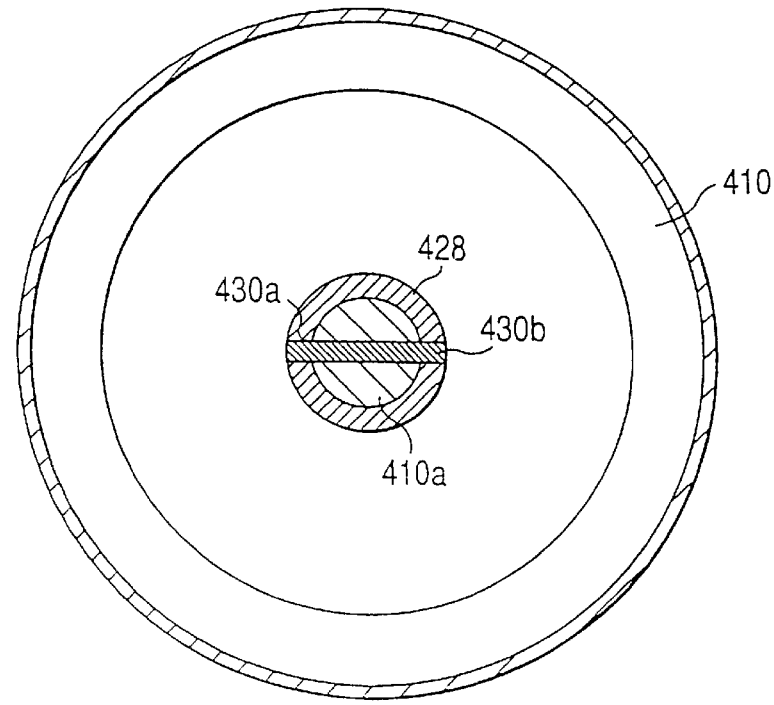
FIG. 33(B) is a schematic and horizontal cross sectional view taken along line 33B—33B shown in FIG. 33(A)

As shown in FIG. 33(A), the movable member 428 has a circular-arc cam groove 430a, the direction of which is changed toward the circumferential direction of the spool shaft 410a as the cam groove 430a extends in a direction along the center line of the rotations of the spool shaft 410a. A cam projection 430b secured to an end of the spool shaft 410a is inserted into the cam groove 430a as shown in FIGS. 32, 33(A) and 33(B) so that a conversion means 430 is constituted. In this embodiment, the cam groove 430a extends in the circular arc shape formed clockwise as the cam groove 430a is formed from the position adjacent to the side wall 412a of the reel body 412 toward the end surface of the spool 410 along the center line of the rotations.

As shown in FIG. 33(A), the movable member 428 provided with the conductive member 414 is urged by an urging means 432 so as to be moved apart from the plural magnets 416 of the side wall 412a of the reel body 412 facing the end surface of the spool 410 at the end of the spool shaft 410a. In this embodiment, the urging means 432 is a tension coil spring wound around a portion at the end of the spool shaft 410a between the movable member 428 and an engagement member 410b.

As shown in FIG. 33(A), the movable member 428 urged by the urging means 434 is disposed adjacent to the end surface of the spool 410 on the end of the spool shaft 410a because the cam projection 430b on the spool shaft 410a is brought into contact with the end of the cam groove 430a adjacent to the side wall 412a of the reel body 412. The free end of the conductive member 414 on the movable member 428 is separated from the annular gap between the conical double annular rings 422a and 422b of the side wall 412a of the reel body 412.

The operation of the fishing reel according to the eight embodiment having the above-mentioned structure will now be described.

When a fishing rod having the fishing reel according to the eighth embodiment is swung for performing a casting operation, a tackle (not shown) which flies toward a target position on the water surface pulls a fishing line (not shown). Thus, the spool 410 starts rotating in a predetermined direction (in the first embodiment, a direction indicated with an arrow X shown in FIG. 33(A). The movable member 428 follows the rotation of the spool shaft 410a because the cam groove 430a and the cam projection 430b are engaged to each other. Then, the movable member 428 is moved from an initial portion adjacent to the end surface of the spool 410 shown in FIG. 33(A) toward the side wall 412a of the reel body 412 along the center line of the rotations of the spool shaft 410a against the urging force of the urging means 432 by dint of the cam groove 430a and the cam projection 430b.

In the initial period of the casting operation, the rotational energy of the spool 410 is small until the rotational speed of the spool 410 reaches certain speed. Therefore, the effect of the cam groove 430a and the cam projection 430b is insufficient to move the movable member 428 from the initial position adjacent to the end surface of the spool 410 as shown in FIG. 33(A) toward the side wall 412a of the reel body 412 along the center line of the rotations of the spool shaft 410a against the urging force of the urging means 432. Therefore, the movable member 428 cannot approach the plural magnets 416 of the side wall 412a of the reel body 412. Thus, the free end of the cylindrical conductive member 414 secured to the movable member 428 is not introduced into the annular gap between the double annular rings 422a and 422b in which the plural magnets 416 of the side wall 412a of the reel body 412 are disposed. Therefore, no eddy current is generated in the conductive member 414 by the magnetic force of the plural magnets 416. Therefore, no braking force for the spool 410 which is rotated together with the conductive member 414 is generated. Even if a small eddy current is generated in the conductive member 14 by dint of a leaked magnetic flux from the plural magnets 16, the braking force generated because of the small eddy current is extremely small.

Therefore, substantially no braking force acts in the initial stage immediately after the casting operation has been started until the rotational speed of the spool 410 reaches certain speed. Therefore, the initial rotational speed of the spool 410 can be raised. As a result, the distance for which the tackle can be thrown can be elongated in the overall period from a moment at which the casting operation has been started to the end of the casting operation. As a matter of course, the rotational speed of the spool 410 which can be raised in the overall period is higher than the rotational speed which can be realized by a conventional fishing reel comprising the spool rotational-speed control means using the braking force which is generated by the centrifugal force. Moreover, the rotational speed according to this embodiment is higher than a conventional fishing reel comprising a spool rotational-speed control means using only magnetic force. The reason for this lies in that the braking force which is generated by the magnetic force is enlarged in substantially proportion to the rise in the rotational speed of the spool 410 from the moment at which the rotation of the spool 410 has been started in the case of the conventional fishing reel comprising the spool rotational-speed control means using only the magnetic force. As a matter of course, the distance for which the tackle (not shown) can be thrown can be elongated in the initial stage immediately after the casting operation has been started until the rotational speed of the spool 410 reaches certain speed as compared with the conventional fishing reel comprising the spool rotational-speed control means using only the frictional force generated by the centrifugal force. The distance can be elongated as compared with the conventional fishing reel comprising the spool rotational-speed control means using only magnetic force.

In an intermediate period of the casting operation, the rotational speed of the spool 410 is reached certain speed. In this period, the rotational energy of the spool 410 is enlarged to move the movable member 428 against the urging force of the urging means 432 by dint of the cam groove 430*a* and the cam projection 430*b* from the initial position adjacent to the end surface of the spool 410 as shown in FIG. 33(A) toward the side wall 412*a* of the reel body 412 along the center line of the rotations of the spool shaft 410*a*. Therefore, the movable member 428 gradually approaches the plural magnets 416 of the side wall 412*a* of the reel body 412. The free end of the cylindrical conductive member 414 secured to the movable member 428 is gradually introduced into the annular gap between the double annular rings 422*a* and 422*b* in which the plural magnets 416 of the side wall 412*a* of the reel body 412 are disposed. Thus, the amount of superimposition between the double annular rings 422*a* and 422*b* and the magnets 416 is enlarged. It leads to a fact that the area of the conductive member 414 which traverses the magnetic flux generated by the plural magnets 416 is gradually enlarged. As a result, the level of the eddy current generated in the conductive member 414 by dint of the magnetic force of the plural magnets 416 is enlarged. As a result, the braking force which acts on the spool 410 which is rotated together with the conductive member 414 is enlarged.

Figure 34:
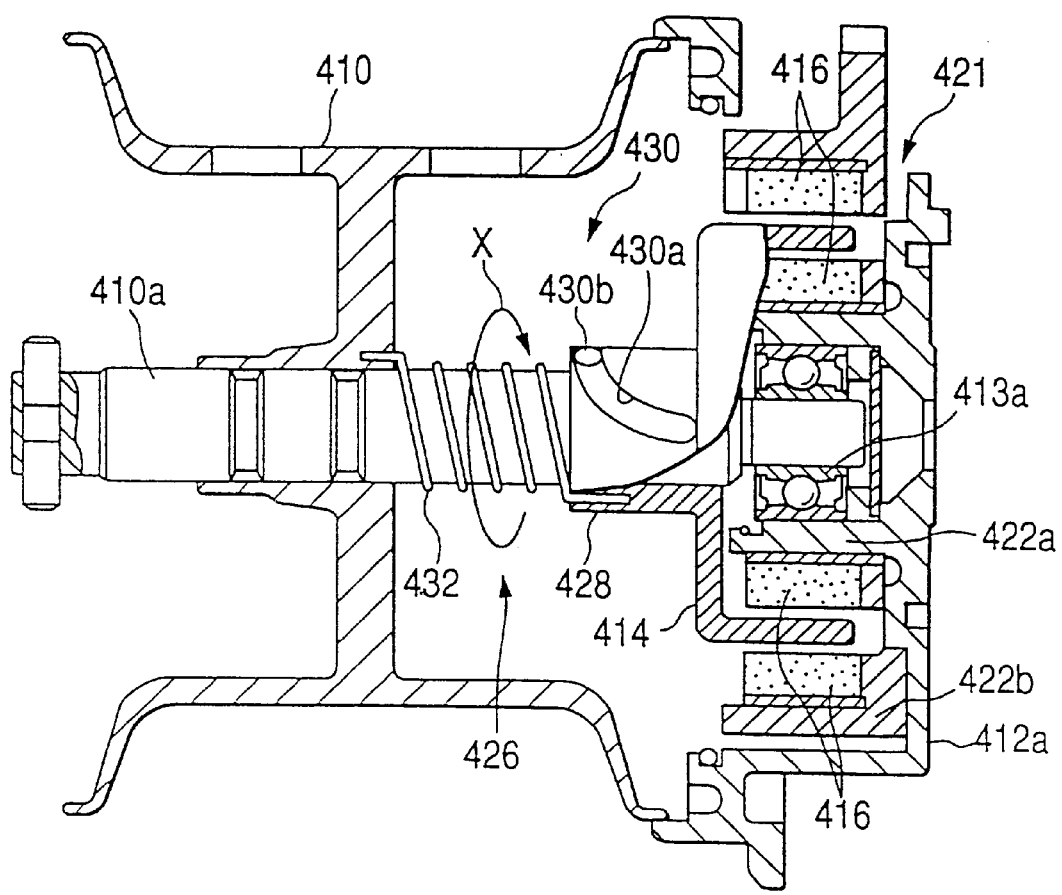
FIG. 34 is a schematic and vertical cross sectional view showing an essential portion of the fishing reel shown in FIG. 30 in a state is shown in which the spool is being rotated at high speed not lower than certain speed.

Note that the movement of the movable member 428 toward the plural magnets 416 of the side wall 412*a* of the reel body 412 is, as shown in FIG. 34, restrained because the cam projection 430*b* is brought into contact with the end of the cam groove 430*a* adjacent to the end surface of the spool 410.

Therefore, the level of the eddy current which is generated in the conductive member 414 by the magnetic force of the plural magnets 416 is enlarged in proportion to the area of the conductive member 414 which traverses the magnetic flux generated by the plural magnets 416 and the rotational speed of the spool 410. Also the braking force generated by the eddy current is enlarged in proportion to the area of the conductive member 414 which traverses the magnetic flux generated by the plural magnets 416 and the rotational speed of the spool 410.

Similarly to the conventional fishing reel comprising the spool rotational-speed control means using only the magnetic force, the braking force which can be generated by the structure according to this embodiment is smaller than that generated by the conventional fishing reel comprising the spool rotational-speed control means using the frictional force generated by the centrifugal force. Therefore, the rotational speed of the spool in the initial stage of the casting operation is higher than that of the conventional fishing reel comprising the spool rotational-speed control means using only the magnetic force. Therefore, also the rotational speed in a period from the initial stage to the intermediate stage of the casting operation is higher than that of the conventional fishing reel comprising the spool rotational-speed control means using only the magnetic force. As a matter of course, the rotational speed is significantly higher than that of the conventional fishing reel comprising the spool rotational-speed control means using the frictional force generated by the centrifugal force.

That is, the distance for which the tackle (not shown) can be thrown in a period from the initial stage of the casting operation to the intermediate stage in which the rotational speed of the spool 410 has reached certain speed can be elongated as compared with the conventional fishing reel comprising the spool rotational-speed control means using only the magnetic force and the conventional fishing reel comprising the spool rotational-speed control means using only the frictional force generated by the centrifugal force.

Moreover, excessive rotational speed of the spool 410 which causes critical backlash at a late time can satisfactorily be prevented by dint of an appropriate braking effect obtainable from the combination of the conductive member 414 of the spool 410 and the plural magnets 416 of the side wall 412*a* of the reel body 412.

When the rotational speed of the spool 410 has been reduced and the rotational energy of the spool 410 has been reduced, the effect of the cam groove 430*a* and the cam projection 430*b* is insufficient for the movable member 428 to overcome the urging force of the urging means 432. The urging force of the urging means 432 gradually attracts the movable member 428 from the position adjacent to the plural magnets 416 of the side wall 412*a* of the reel body 412 as shown in FIG. 34 to the initial position adjacent to the end as surface of the spool 410 as shown in FIG. 33(A) along the center line of the rotations of the spool shaft 410*a*. Therefore, the movable member 428 is moved gradually apart from the plural magnets 416 of the side wall 412*a* of the reel body 412. The free end of the cylindrical conductive member 414 secured to the movable member 428 is gradually separated from the annular gap between the double annular rings 422*a* and 422*b* in which the plural magnets 416 of the side wall 412*a* of the reel body 412 are disposed. As a result, the area of the conductive member 414 which traverses the magnetic flux generated by the plural magnets 416 is gradually reduced.

As a result, the level of the eddy current generated in the conductive member 414 by dint of the magnetic force of the plural magnets 416 is reduced in proportion to the area of the conductive member 414 which traverses the magnetic flux generated by the plural magnets 416 and the rotational speed of the spool 410. Also the braking force generated by the eddy current is reduced in proportion to the area of the conductive member 414 which traverses the magnetic flux generated by the plural magnets 416 and the rotational speed of the spool 410.

The braking force according to this embodiment is smaller than that which is generated by the conventional fishing reel comprising the spool rotational-speed control means using only the magnetic force. Moreover, rapid reduction in the braking force can be prevented which takes place with the conventional fishing reel comprising the spool rotational-speed control means using the frictional force generated by the centrifugal force. Therefore, the rotational speed of the spool in the final period of the casting operation is higher than the rotational speed which can be realized by the conventional fishing reel comprising the spool rotational-speed control means using only the magnetic force. Moreover, the rapid reduction in the reduction ratio of the rotational speed can be prevented which takes place with the conventional fishing reel comprising the spool rotational-speed control means using the frictional force generated by the centrifugal force.

That is, the distance for which the tackle (not shown) can be thrown in the final period of the casting operation in which the rotational speed of the spool 410 has gradually be reduced can be elongated as compared with that of the conventional fishing reel comprising the spool rotational-speed control means using only the magnetic force and that of the conventional fishing reel comprising the spool rotational-speed control means using only the frictional force generated by the centrifugal force.

Moreover, the excessively high rotational speed of the spool 410 which cause critical backlash with respect to the flying speed of the tackle at a later time is appropriately restrained in the intermediate period of the casting operation. The rapid reduction in the reduction ratio of the rotational speed of the spool 410 which takes in the final stage of the casting operation with the conventional fishing reel comprising the spool rotational-speed control means using only the frictional force generated by the centrifugal force can be prevented. If there is apprehension that the backlash phenomenon of the fishing line (not shown) takes place because of rapid reduction in the pulling speed of the fishing line which occurs because the tackle (not shown) reaches the water surface and inertia of the rotations of the spool 410 after the tackle (not shown) has reached the water surface, only a simple operation which can be performed by a person which is not skilled in the casting operation is required to prevent the backlash phenomenon. The operation is performed in such a manner that, for example, the spool or the surface of the fishing line wound around the spool is pressed by, for example, the finger. Therefore, the operation for unreeling the fishing line for performing casting can easily be performed.

In the eighth embodiment described with reference to FIGS. 30 to 34, the conductive member 414 and the plural magnets 416 provided for the side wall 412a of the reel body 412 constitute a braking means in which they are selectively operated in cooperation with each other to brake the rotation of the spool 410 so as to change the braking force by shifting the relative position along the center line of the rotations of the spool shaft 410a.

The movable member 428 which supports the conductive member 414 serving as the braking means provided for the spool 410, which is movable in a circumferential direction of the spool 410 in a predetermined range together with the conductive member 414 serving as the braking means provided for the spool 410 and which is movable in a direction along the center line of the rotations of the spool 410; the urging means 432 for urging the movable member 428 in a direction along the center line of the rotations of the spool 410; and the cam groove 430a and the cam projection 430b serving as the conversion means 430 for moving the movable member 428 in another direction along the center line of the rotations of the spool 410 against the urging force of the urging means 432 by dint of the difference between the rotation of the spool 410 and the rotation of the movable member 428 to change the relative positions between the conductive member 414 serving as the braking means provided for both spool 410 and the reel body 412 and the plural magnets 416 to change the braking force of the conductive member 414 and the plural magnets 416 serving as the braking means which acts on the rotation of the spool 410 so as to control the rotational speed of the spool 410 constitute the position changing means for changing the relative positions between the conductive member 414 provided for both the spool 410 and the reel body 412 and serving as the braking means and the plural magnets 416 in the direction along the center line of the rotations of the spool 410 in accordance with the rotational speed of the spool 410.

Ninth Embodiment

Referring to FIGS. 35(A), 35(B), 36(A) and 36(B), a sixth embodiment of the fishing reel according to the present invention will now be described.

The different between the structure of the fishing reel according to this embodiment and the fishing reel according to the eighth embodiment described with reference to FIGS. 30 to 34 will now be described. The difference lies in that the structure of the spool rotational-speed control means 460 for controlling the rotational speed of the spool 410 when the spool 410 is in a free rotation state. Specifically, the structure of a braking means 462 of the spool rotational-speed control means 460 has a different structure which is provided for both spool 410 and the reel body 412 to act selectively in cooperation to brake the rotation of the spool 410 to shift the relative positions to change the braking force which acts on the rotation of the spool 410.

Figure 35A:
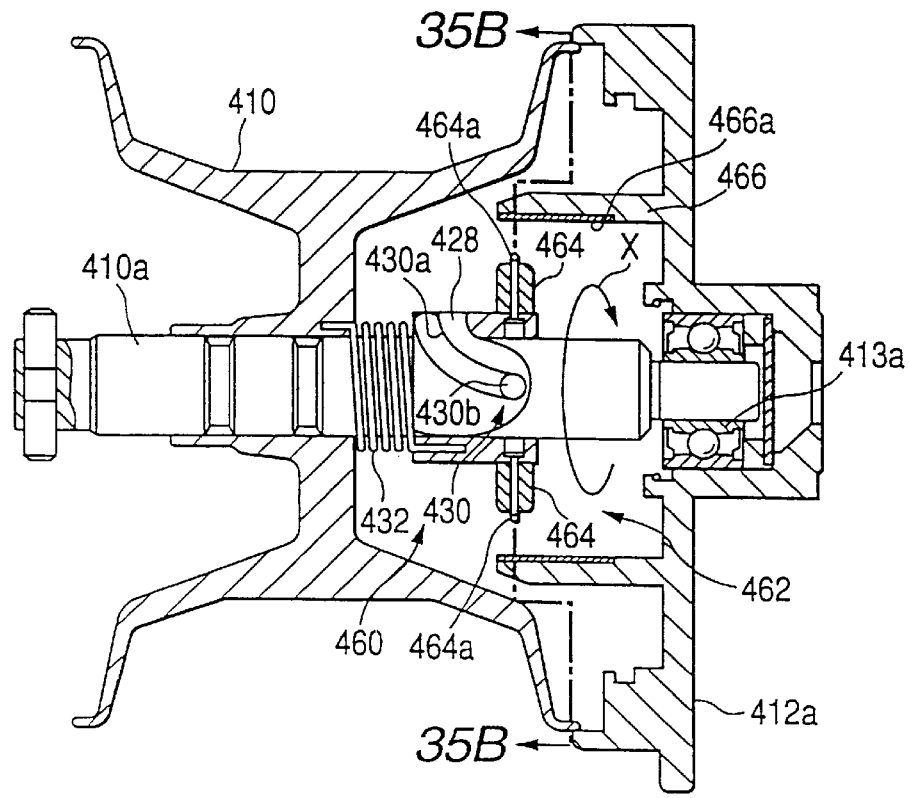
FIG. 35(A) is a schematic and vertical cross sectional view showing an essential portion of a fishing reel according to a ninth embodiment of the present invention in which a state is shown in which the spool is not rotated and a state in which the spool is being rotated at relatively low speed.
Figure 35B:
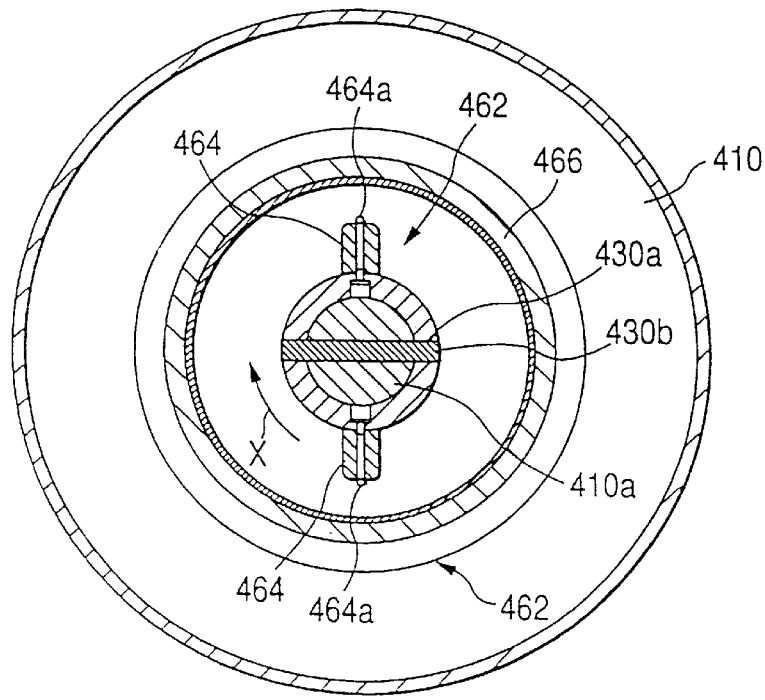
FIG. 35(B) is a horizontal cross sectional view taken along line 35B—35B shown in FIG. 35(A)

As shown in FIGS. 35(A) and 35(B), the fishing reel according to the ninth embodiment has a structure that the braking means 462 of the spool rotational-speed control means 460 has a plurality of radial-directional movement braking members 464 provided on the outer surface of the movable member 428 at the end of the spool shaft 410a and arranged to be movable in the radial direction of the spool shaft 410a. Moreover, the braking means 462 has an annular braking member 466 provided for the inner surface of the side wall 412a of the reel body 412 concentrically with the center line of the rotations of the spool shaft 410a, extending toward the end surface of the spool 410 along the center line of the rotations and arranged to surround the plural radial-directional movement braking members 464 provided on the end of the spool shaft 410a through the movable member 428 from outside in the radial direction.

Specifically, the plural radial-directional movement braking members 464 is movably supported in the radial direction because a guide rod 464a guide rod 464a extending from the outer surface of the movable member 428 toward the outside in the radial direction penetrates the radial-directional movement braking members 464. An inner surface 466a of the annular braking member 466 has the coefficient of friction which is reduced in a direction from the inner surface of the side wall 412a of the reel body 412 toward the end surface of the spool 410. In this embodiment, the annular frictional braking member having the coefficient of friction which is reduced as described above is secured to the inner surface 466a of the annular braking member 466.

The surface machining of the inner surface 466a may be made in such a manner that the coefficient of friction is reduced to as described above. A plurality of annular frictional braking members having the different degree of change in the coefficient of friction in a direction from the inner surface of the side wall 412a toward the end surface of the spool 410 may be prepared. A required annular frictional braking member is selected from the plurality of the annular frictional braking members to detachably secure the same to the inner surface 466a of the annular braking member 466.

When the size, weight, material or the number of the plural radial-directional movement braking members 464 is changed, the frictional braking force which is generated between the plural radial-directional movement braking members 464 and the annular braking member 466 can be changed when the spool shaft 410a is rotated at the same speed.

When a fishing rod having the fishing reel according to the ninth embodiment is swung to perform a casting operation, the rotational energy of the spool 410 is small in the initial stage of the casting operation until the rotational speed of the spool 410 reaches certain speed. Therefore, the effect of the cam groove 430a and the cam projection 430b is insufficient to move the movable member 428 from the initial position adjacent to the end surface of the spool 410 as shown-in FIG. 35(A) toward the side wall 412a of the reel body 412 along the center line of the rotations of the spool shaft 410a against the urging force of the urging means 432.

Therefore, the plural radial-directional movement braking members 464 on the movable member 428 are positioned opposite to the position of the extension end of the inner surface 466a of the annular braking member 466 of the side wall 412a of the reel body 412 having a small coefficient of friction in the radial direction of the spool shaft 410a as shown in FIG. 35(B). As an alternative to this, the radial-directional movement braking members 464 are slightly in contact with the foregoing position adjacent to the extension end. Therefore, no frictional braking force is generated between the plural radial-directional movement braking members 464 and the position adjacent to the extension end of the inner surface 466a of the annular braking member 466. If the frictional braking force is generated, the magnitude is very small.

Therefore, substantially no braking force acts in the initial stage immediately after the casting operation has been started until the rotational speed of the spool 410 reaches certain speed. Therefore, the initial rotational speed of the spool 410 can be raised. As a result, the distance for which the tackle can be thrown can be elongated in the overall period from a moment at which the casting operation has been started to the end of the casting operation. The rotational speed of the spool 410 which can be raised in the overall period is higher than the rotational speed which can be realized by a conventional fishing reel comprising the spool rotational-speed control means using only the frictional force generated by the centrifugal force.

Moreover, the distance for which the tackle can be thrown until the rotational speed of the spool 410 reaches certain speed in the initial stage after the casting operation has been started is longer than the distance which can be realized by the conventional fishing reel comprising the spool rotational-speed control means using only the frictional force generated by the centrifugal force.

In an intermediate period of the casting operation, the rotational speed of the spool 410 is reached certain speed. In this period, the rotational energy of the spool 410 is enlarged to move the movable member 428 against the urging force of the urging means 432 by dint of the cam groove 430a and the cam projection 430b from the initial position adjacent to the end surface of the spool 410 as shown in FIG. 35(A) toward the side wall 412a of the reel body 412 along the center line of the rotations of the spool shaft 410a. Therefore, the movable member 428 gradually approaches the side wall 412a of the reel body 412. As a result, the plural radial-directional movement braking members 464 provided for the movable member 428 are moved toward the position adjacent to the base having a large coefficient of friction on the inner surface 466a along the center line of the rotations of the spool shaft 410a while the radial-directional movement braking members 464 are in contact with the inner surface 466a of the annular braking member 466. Therefore, the frictional braking force which is generated between the inner surface 466a of the annular braking member 466 of the side wall 412a of the reel body 412 and the plural radial-directional movement braking members 464 on the spool shaft 410a is gradually enlarged.

Note that the movement of the movable member 428 toward the side wall 412a of the reel body 412 is, as shown in FIG. 35(A), restrained because the cam projection 430b is brought into contact with the end of the cam groove 430a adjacent to the end surface of the spool 410.

The frictional braking force in the foregoing case can be reduced as compared with the conventional fishing reel comprising the spool rotational-speed control means using only the frictional force generated by the centrifugal force. Therefore, the rotational speed of the spool in the initial stage of the casting operation can considerably be raised as compared with the conventional fishing reel comprising the spool rotational-speed control means using only the frictional force generated by the centrifugal force.

That is, the distance for which the tackle (not shown) can be thrown in a period from the initial stage of the casting operation to the intermediate stage in which the rotational speed of the spool 410 has reached certain speed can be elongated as compared with the conventional fishing reel comprising the spool rotational-speed control means using only the magnetic force.

Moreover, excessive rotational speed of the spool 410 which causes critical backlash at a late time can satisfactorily be prevented by dint of an appropriate braking effect obtainable from the combination of the radial-directional movement braking members 464 of the spool 410 and the inner surface 466a of the annular braking member 466 of the side wall 412a of the reel body 412.

Figure 36A:
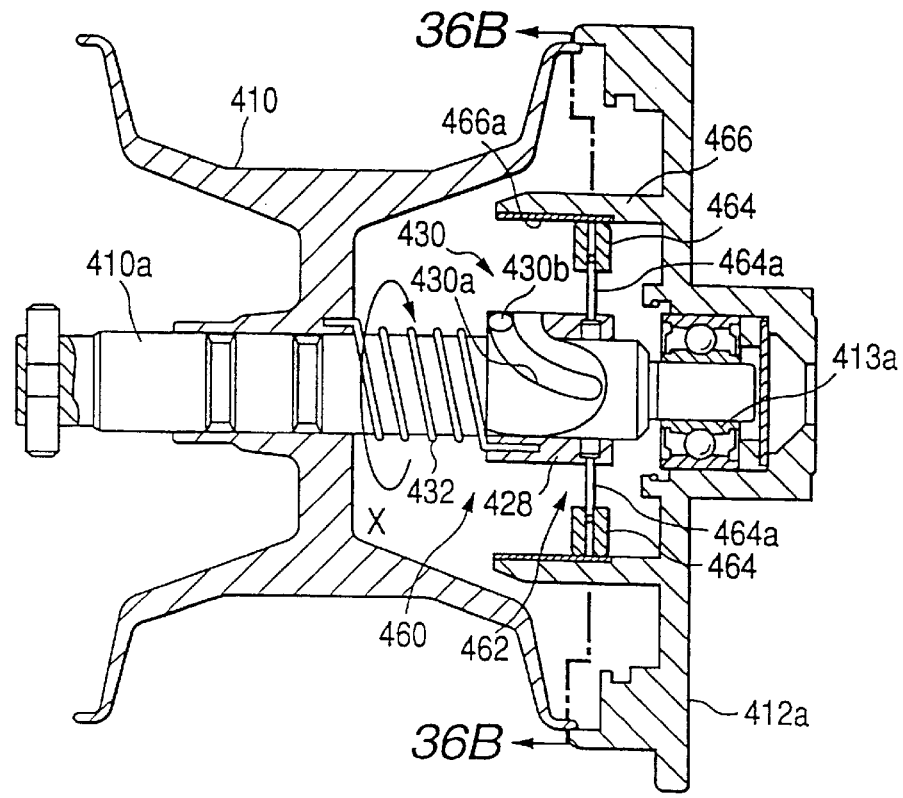
FIG. 36(A) is a schematic and vertical cross sectional view showing an essential portion of the fishing reel according to the ninth embodiment of the present invention in a state is shown in which the spool is being rotated at high speed not lower than certain speed.
Figure 36B:
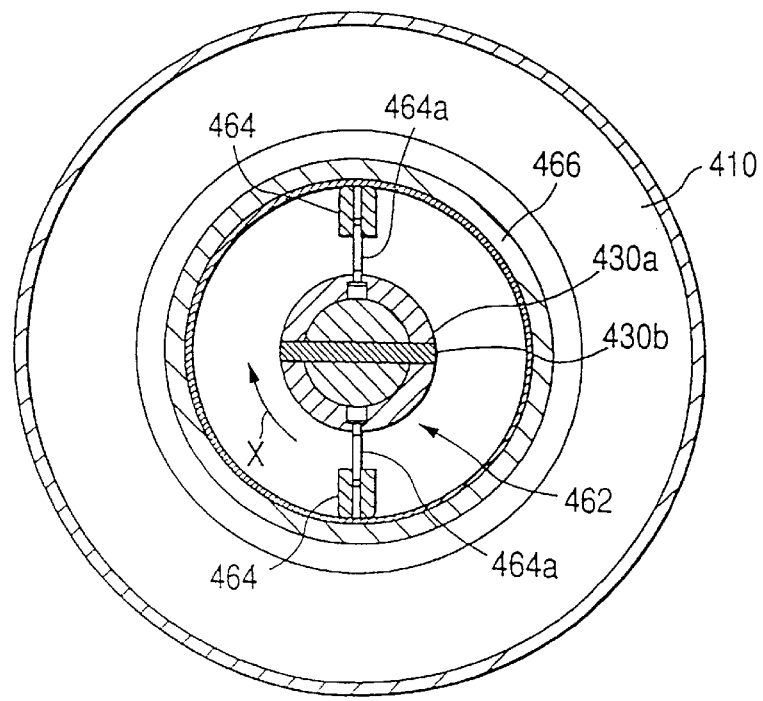
FIG. 36(B) is a horizontal cross sectional view taken along line 36B—36B shown in FIG. 36(A)

When the rotational speed of the spool 410 has been reduced and the rotational energy of the spool 410 has been reduced, the effect of the cam groove 430a and the cam projection 430b is insufficient for the movable member 428 to overcome the urging force of the urging means 432. The urging force of the urging means 432 gradually attracts the movable member 428 from the position adjacent to the plural magnets 416 of the side wall 412a of the reel body 412 as shown in FIG. 36(A) to the initial position adjacent to the end surface of the spool 410 as shown in FIG. 35(A) along the center line of the rotations of the spool shaft 410a.

Therefore, the plural radial-directional movement braking members 464 provided for the movable member 428 are moved toward the position adjacent to the extension end having the small coefficient of friction on the inner surface 466a wile the radial-directional movement braking members 464 are in contact with the inner surface 466a of the annular braking member 466. Thus, the frictional braking force which is generated between the inner surface 466a of the annular braking member 466 of the side wall 412a of the reel body 412 and the plural radial-directional movement braking members 464 on the spool shaft 410a is gradually reduced.

The rapid reduction in the braking force as is experienced with the conventional fishing reel comprising the spool rotational-speed control means using only the frictional force generated by the centrifugal force can be prevented. Therefore, the reduction rate of the rotational speed of the spool 410 in the final stage of the casting operation is not rapidly reduced as is experienced with the conventional fishing reel comprising the spool rotational-speed control means using only the frictional force generated by the centrifugal force.

That is, the distance for which the tackle (not shown) can be thrown in the final period of the casting operation in which the rotational speed of the spool 410 has gradually be reduced can be elongated as compared with that of the conventional fishing reel comprising the spool rotational-speed control means using only the frictional force generated by the centrifugal force.

Moreover, the excessively high rotational speed of the spool 410 which cause critical backlash with respect to the flying speed of the tackle at a later time is appropriately restrained in the intermediate period of the casting operation. The rapid reduction in the reduction ratio of the rotational speed of the spool 410 which takes in the final stage of the casting operation with the conventional fishing reel comprising the spool rotational-speed control means using only the frictional force generated by the centrifugal force can be prevented. If there is apprehension that the backlash phenomenon of the fishing line (not shown) takes place because of rapid reduction in the pulling speed of the fishing line which occurs because the tackle (not shown) reaches the water surface and inertia of the rotations of the spool 410 after the tackle (not shown) has reached the water surface, only a simple operation which can be performed by a person which is not skilled in the casting operation is required to prevent the backlash phenomenon. The operation is performed in such a manner that, for example, the spool or the surface of the fishing line wound around the spool is pressed by, for example, the finger. Therefore, the operation for unreeling the fishing line for performing casting can easily be performed.

Tenth Embodiment

Figure 37:
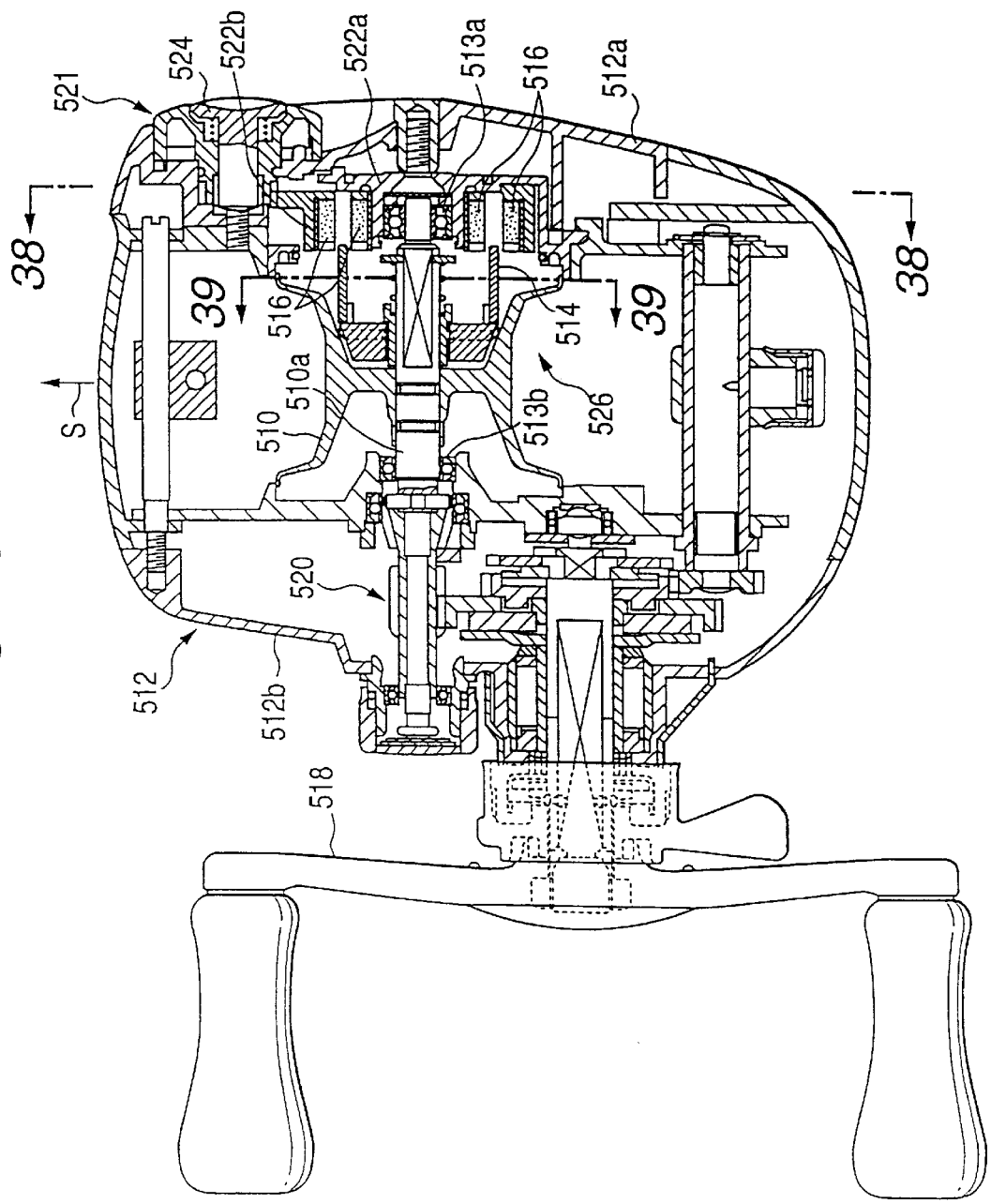
FIG. 37 is a schematic and horizontal cross sectional view showing a fishing reel according to a tenth embodiment of the present invention.

As shown in FIG. 37, a fishing reel according to a tenth embodiment of the present invention comprises a spool 510 around which a fishing line (not shown) is wound in such a manner that the fishing line can be unreeled; and a reel body 512 for rotatively supporting two ends of a spool shaft 510a of the spool 510 through bearings 513a and 513b and rotatively holding the spool 510.

A conductive member 514 made of, for example, aluminum or copper, is disposed at an end of the spool shaft 510a at a position between an end surface of the spool 510 and a bearing 513a which rotatively supports an end (the right-hand end in FIG. 37) of the spool shaft 510a projecting over an end surface of the spool 510. A side wall 512a of the reel body 512 provided with a bearing 513a which rotatively supports an end of the spool shaft 510a is provided with a plurality of magnets 516 corresponding to the conductive member 514 at the end of the spool shaft 510a.

Another side wall 512b provided with a bearing 513b, which rotatively supports another end (the left-hand end in FIG. 37) of the spool shaft 510a projecting over another end surface of the spool 510 is provided with a rotative handle 518. Moreover, a clutch-equipped rotational-force transmission means 520 for selectively transmitting rotational force supplied from the handle 518 to another end of the spool shaft 510a is provided. The clutch-equipped rotational-force transmission means 520 will now be described. When a clutch is operated by depressing an operation button (not shown), selection of a state from two states is permitted one of which is a spool free rotation state in which free rotation of the spool shaft 510a is permitted to permit unreeling (an arrow S shown in FIG. 37 indicates a direction in which the fishing line is unreeled) of a fishing line (not shown). Another state is a spool operation state in which rotational force supplied from the handle 518 is transmitted to the spool 510 through another end of the spool shaft 510a so as to wind the fishing line (not shown) around the spool 510 in a direction opposite to the unreeling direction indicated with the arrow S shown in FIG. 37. Since the structure of the clutch-equipped rotational-force transmission means 520 is a known fact, the description of the structure is omitted here.

Figure 38:
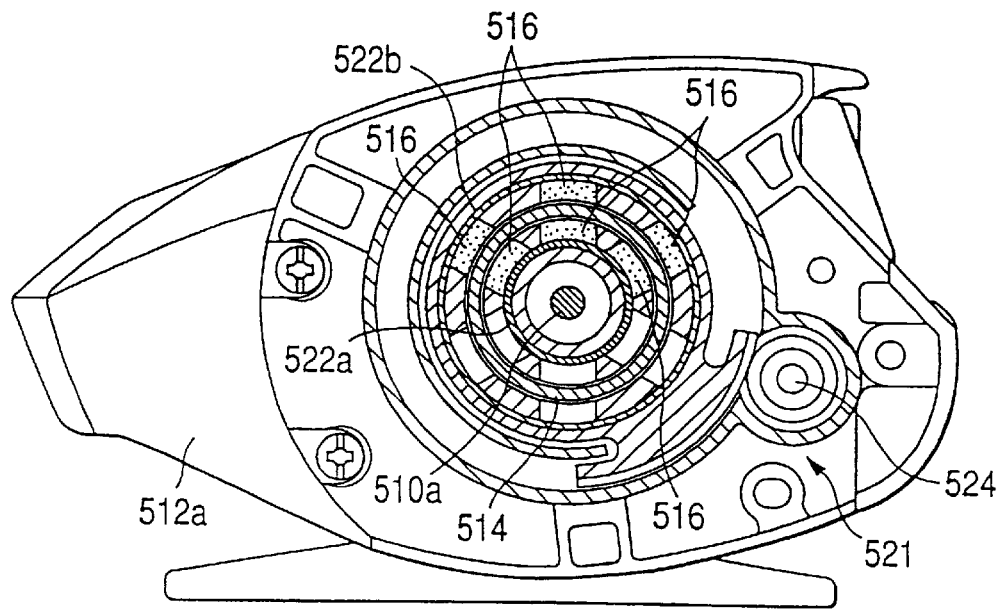
FIG. 38 is a schematic and horizontal cross sectional view taken along line 38—38 shown in FIG. 37.

As shown in FIGS. 37 and 38, the plural magnets 516 are provided for the side wall 512a of the reel body 512 through a magnetic-force adjustment means 521 for adjusting the magnetic force of the magnets 516 which acts on the stationary conductive member 514. In this embodiment, the magnetic-force adjustment means 521 includes double annular rings 522a and 522b disposed concentrically with respect to the spool shaft 510a. The plural magnets 516 are disposed on the double annular rings 522a and 522b in such a manner that the magnets 516 are disposed apart from one another at predetermined intervals in the circumferential direction. The plurality of the magnets 516 of the inner annular ring 522a are disposed in such a manner that the magnetic poles facing outside in the radial direction of the inner annular ring 522a are different from each other. Also the plurality of the magnets 516 of the outer annular ring 522b are disposed in such a manner that the magnetic poles facing insides in the radial direction of the outer annular ring 522b are different from each other.

The inner annular ring 522a is secured to the side wall 512a. The outer annular ring 522b will now be described. When a magnetic force adjustment button 524 provided for the side wall 512a is rotated in a direction, the magnetic pole of the outer annular ring 522b opposite to the magnetic pole of the inner annular ring 522a is changed. Thus, the magnitude of the magnetic force which acts on the conductive member 514 is adjusted. That is, radial directional internal ends of the magnetic poles of the plural magnets 516 of the outer annular ring 522b which are different from the magnetic poles at the radial directional outer ends of the plural magnets 516 of the inner annular ring 522a are caused to face the magnetic poles at the radial directional outer ends of the plural magnets 516 of the outer annular ring 522b. Thus, a maximum attractive magnetic force state can be realized in which the radial directional outer end magnetic poles of the plural magnets 516 of the inner annular ring 522a and the radial direction inner end magnetic poles of the outer annular ring 522b generate maximum attractive magnetic forces. On the other hand, radial directional outer end magnetic poles of the plural magnets 516 of the inner annular ring 522a of the plural magnets 516 of the outer annular ring 522b are caused to face the radial direction inner end magnetic poles which are the same magnetic poles so that the radial directional outer end magnetic poles of the plural magnets 516 of the inner annular ring 522a and the radial directional inner end magnetic poles of the outer annular ring 522b generate maximum repulsive magnetic force. Thus, a maximum repulsive magnetic force state can be realized. The relative positions of the plural magnets 516 of the outer annular ring 522b are shifted with respect to the plural magnets 516 of the inner annular ring 522a between the above-mentioned two states. Thus, the magnitude of the magnetic force which acts on the conductive member 514 is adjusted to adjust the braking force which is applied to the spool 510.

As shown in FIG. 37, the conductive member 514 is disposed at the end of the spool shaft 510a through a spool rotational-speed control means 526 which changes the magnetic force of the plural magnets 516 of the side wall 512a of the reel body 512 which acts on the conductive member 514 in accordance with the rotational speed of the spool 510 so as to control the rotational speed of the spool 510 provided with the conductive member 514.

Figure 39:
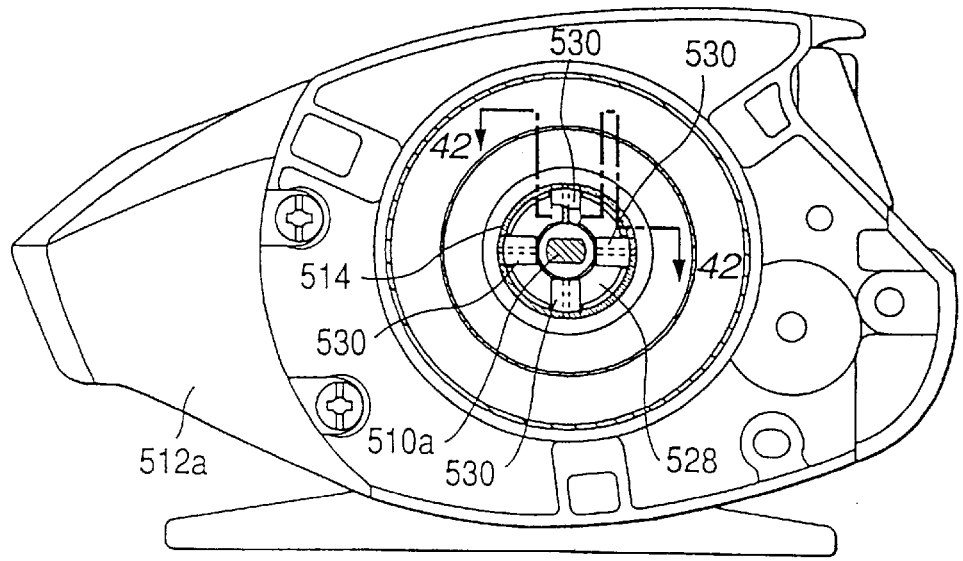
FIG. 39 is a schematic and horizontal cross sectional view taken along line 39—39 shown in FIG. 37.
Figure 40:
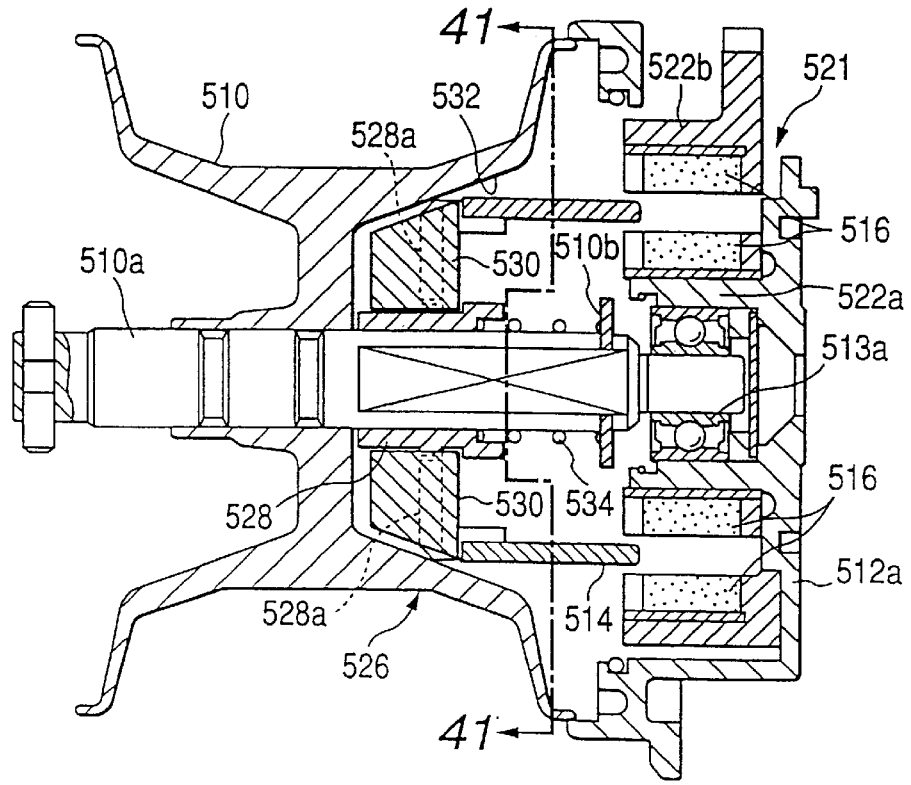
FIG. 40 is a schematic and vertical cross sectional view showing an essential portion of the fishing reel shown in FIG. 37 and in which a state is shown in which a radial-directional movement selection means which is one of control operation adjustment means for adjusting the spool rotational speed control operation which is performed by the radial-directional movable member shown in FIG. 39 has realized a radial-directional movement inhibited state.

As shown in FIGS. 39 and 40, the spool rotational-speed control means 526 is provided with a lengthwise-directional movable member 528 at an end of the spool shaft 510a. The lengthwise-directional movable member 528 is able to move in a direction (a lengthwise direction) along the center line of rotations of the spool shaft 510a. The lengthwise-directional movable member 528 is rotated together with the spool shaft 510a in the circumferential direction of the spool shaft 510a. The conductive member 514 is formed into a cylindrical shape. An end of the conductive member 514 opposite to the magnets 516 of the conductive member 514 is secured to the lengthwise-directional movable member 528 concentrically to the spool shaft 510a.

In this embodiment, the conductive member 514 and the lengthwise-directional movable member 528 are individually formed, and then secured. However, the conductive member 514 and the lengthwise-directional movable member 528 may integrally be made of the material of the conductive member 514.

Free ends of the conductive member 514 secured to the lengthwise-directional movable member 528 are disposed opposite to an annular gap between the concentric double annular rings 522a and 522b of the side wall 512a of the reel body 512.

Figure 41:
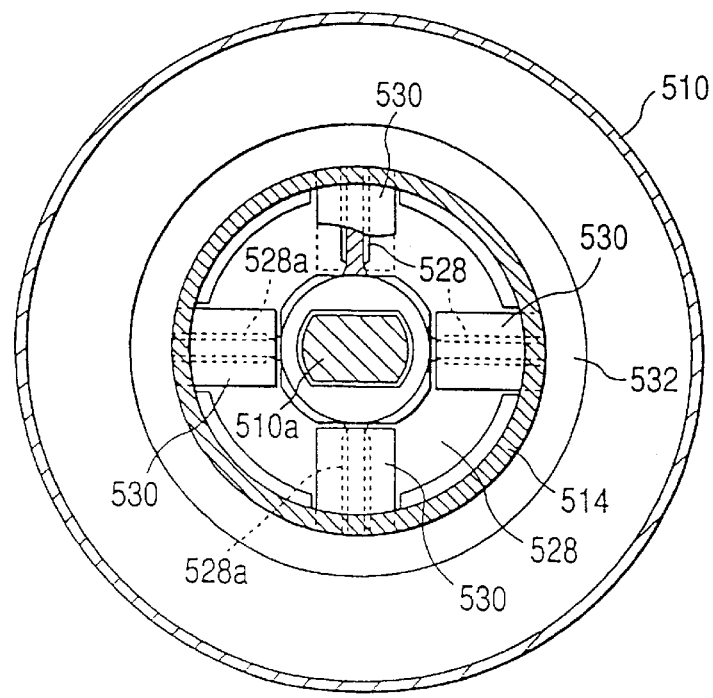
FIG. 41 is a schematic and horizontal cross sectional view taken along line 41—41 shown in FIG. 40.

The lengthwise-directional movable member 528 has radial-directional movable members 530 movable in the radial direction of the spool shaft 510a and disposed apart from each other at predetermined intervals at plural positions (four positions in the first embodiment) of the spool shaft 510a, as shown in FIGS. 39, 40 and 41.

Figure 42:
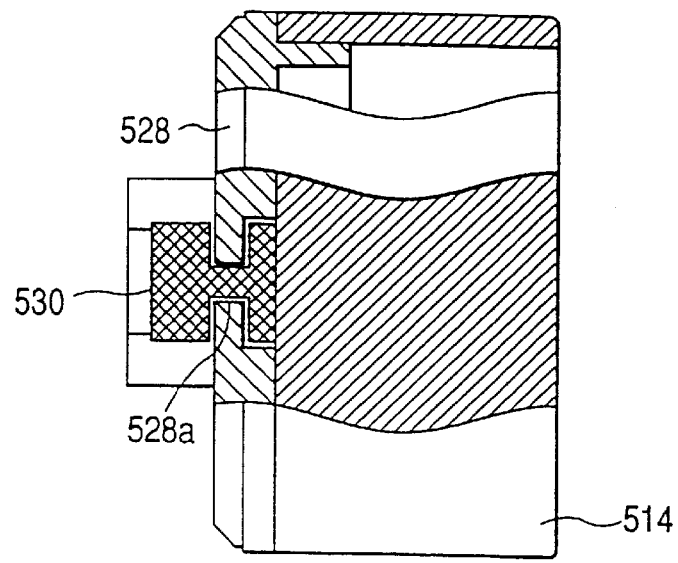
FIG. 42 is a plan view showing the lengthwise-directional movable member combined with the cylindrical conductive member and the radial-directional movable member in such a manner that a partially-cut and schematic horizontal cross section taken along line 42—42 shown in FIG. 3 is shown.
Figure 43:
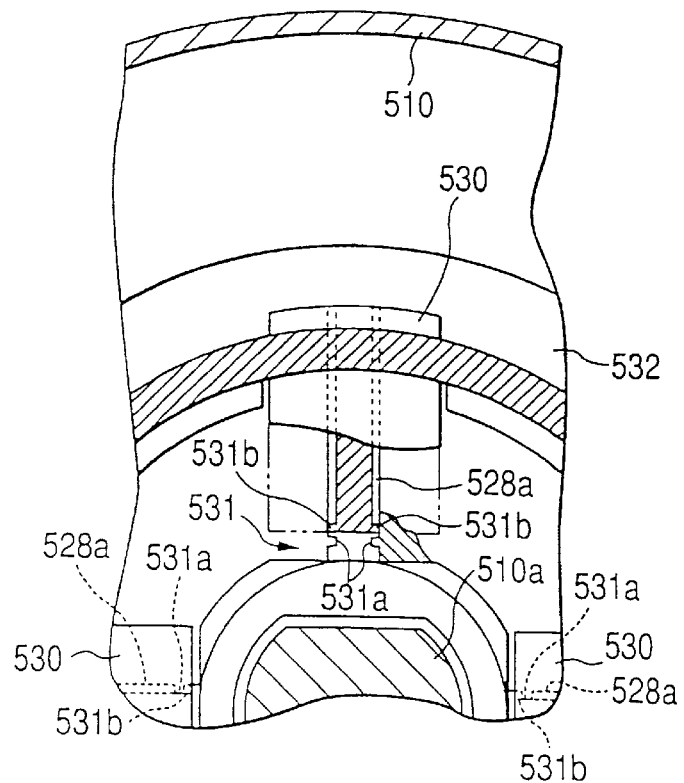
FIG. 43 is an enlarged, schematic and horizontal cross sectional view showing the radial-directional movable member and the radial-directional movement selection means which is one of control-operation adjustment means for adjusting the spool rotational speed control which is performed by the radial-directional movable member and which is provided for a guide portion for the radial-directional movable member shown in FIG. 39.

To support the radial-directional movable members 530 movably in the radial direction of the spool shaft 510a, the lengthwise-directional movable member 528 has guide holes 528a. The guide holes 528a are elongated in the radial direction of the spool shaft 510a and formed at plural positions (four positions in the tenth embodiment) apart from one another at predetermined intervals in the circumferential direction of the outer surface thereof, as shown in FIGS. 41, 42 and 43. As shown in FIG. 42, each of the radial-directional movable members 530 has an H-shape horizontal cross section. When a central bridge-like portion of the radial-directional movable member 530 is received in a guide holes 528a, movements of the radial-directional movable members 530 along the guide holes 528a are permitted. That is, the guide holes 528a serve as guide portions for movably guiding the radial-directional movable members 530 in the radial direction of the spool shaft 510a. The plural radial-directional movable members 530 are able to cross the outer surface of the conductive member 514 along the corresponding guide holes 528a and move to further outside portions.

As shown in FIG. 43, a radial-directional movement selection means 531 is disposed at the inner end of the guide holes 528a in the radial direction and the inner end of the radial-directional movable member 530 in the radial direction, the radial-directional movement selection means 531 being used to select a radial-direction movement permission state in which the free movement of the radial-directional movable member 530 in the radial direction is permitted or a radial-directional movement inhibition state in which the free movement of the radial-directional movable member 530 in the radial-directional movable member 530 in the radial direction is inhibited.

In this embodiment, the radial-directional movement selection means 531 is composed of a temporal engagement means constituted by combining, for example, an engagement projection 531a formed at the inner end of the guide holes 528a and an engagement projection 531b formed at the inner end of the radial-directional movable member 530.

In this embodiment, at least either of the lengthwise-directional movable member 528 or the radial-directional movable member 530 is made of synthetic resin having somewhat elasticity.

If the engagement of the engagement projection 531b to the engagement projection 531a formed at the inner end of the guide holes 528a is suspended as the state of the radial-directional movable member 530 positioned vertically in the center of FIG. 43, the radial-directional movement permission state is realized. If the engagement projection 531b is engaged to the engagement projection 531a formed at the inner end of the guide holes 528a as the state of the radial-directional movable member 530 shown horizontally on the two sides in FIG. 43, the radial-directional movement inhibition state is realized.

The radial-directional movement selection means 531 constitutes a control adjustment means for adjusting the degree of control of the spool rotational-speed control means 526 on the spool 510 by adjusting the rotational speed of the spool 510.

As shown in FIGS. 40 and 41, a tapered inner surface 532 is provided for the end surface at the end of the spool 510. The tapered inner surface 532 surrounds the plural radial-directional movable members 530 of the spool shaft 510a and has a large-diameter opening which faces the plural magnets 516 of the side wall 512a of the reel body 512 opposite to the plural radial-directional movable members 530 in the radial direction of the spool shaft 510a. The tapered inner surface 532 is formed conentrically with respect to the center line of rotations of the spool shaft 510a. The tapered inner surface 532 has a smooth surface having a small coefficient of friction. In this embodiment, the tapered inner surface 532 is formed by making the inner surface of the end surface at the end of the spool 510 into the smooth surface having the small coefficient of friction. The tapered inner surface 532 may be formed individually from the spool 510, and then the inner surface of the tapered member which is secured to the end surface at the end of the spool 510 is formed into the smooth surface having the small coefficient of friction.

As shown in FIG. 40, the lengthwise-directional movable member 528 is urged by the urging means 534 so as to be apart from the plural magnets 516 of the side wall 512a of the reel body 512 disposed opposite to the end surface of the spool 510 on the end of the spool shaft 510a. In this embodiment, the urging means 534 is a compression coil spring wound around the engagement member 510b, which is a stopper ring or a washer disposed adjacent to the bearing 513a which rotatively supports ends of the lengthwise-directional movable member 528 and the spool shaft 510a on the end of the spool shaft 510a.

The lengthwise-directional movable member 528 urged by the urging means 534 is, as shown in FIG. 40, disposed adjacent to the end surface of the spool 510 on the end of the spool shaft 510*a*. The radial-directional movable member 530 on the lengthwise-directional movable member 528 is disposed opposite to the tapered inner surface 532 on the end surface adjacent to the minimum opening.

The operation of the fishing reel according to the tenth embodiment and having the above-mentioned structure will now be described.

Prior to using the fishing rod having the fishing reel according to the tenth embodiment of the present invention, a user of the fishing reel is able to easily separate the spool shaft 510*a* of the fishing reel from the reel body 512 together with the spool 510. In accordance with the state of the fishing spot and a required operation of the reel, a required number of the radial-directional movable members 530 among the plural radial-directional movable member 530 is brought to the radial-directional movement permission state on the spool shaft 510*a* separated from the reel body 512. Moreover, the residual radial-directional movable members 530 can be brought to the radial-directional movement inhibition state.

Figure 44:
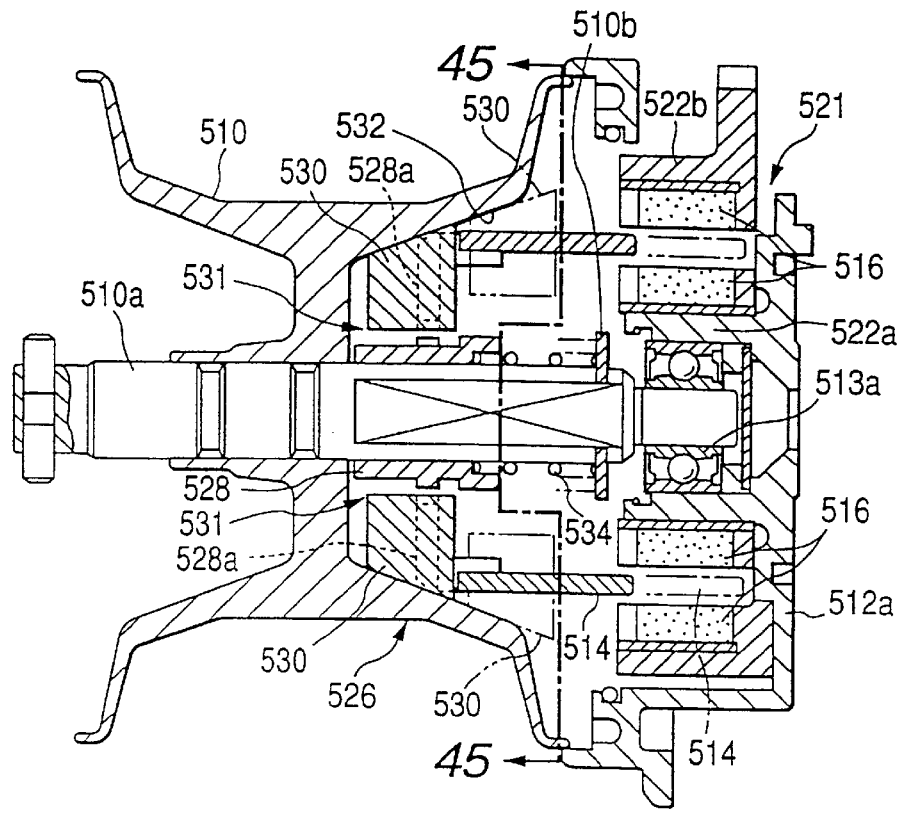
FIG. 44 is a schematic and vertical cross sectional view showing an essential portion of the fishing reel shown in FIG. 37 and in which a state from a moment at which the spool is not rotated and a moment at which the rotational speed of the spool reaches certain speed and a state in which the rotational speed of the spool has been reduced from certain speed are shown with a solid line and a state in which the spool is being rotated at high speed not lower than certain speed is shown with an alternate long and two dashes line in a period in which the radial-directional movement selection means which is one of the control-operation adjustment means for adjusting the spool rotational speed control which is performed by the radial-directional movable member shown in FIG. 39 has realized the radial-directional movement permitted state.
Figure 45:
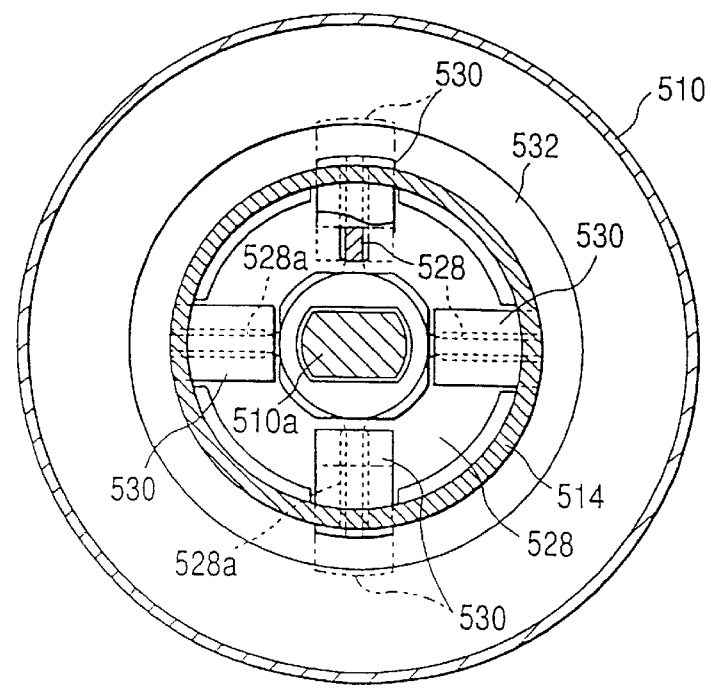
FIG. 45 is a schematic and horizontal cross sectional view taken along line 45—45 shown in FIG. 44.

In examples cases shown in FIGS. 44 and 45, two vertical radial-directional movable members 530 of the four radial-directional movable members 530 are in the radial-directional movement permission state. Moreover, the two horizontal radial-directional movable members 530 are in the radial-directional movement inhibition state.

The spool shaft 510*a* is returned to a predetermined position of the reel body 512, and then the fishing rod having the fishing reel according to the tenth embodiment is swung for performing a casting operation. As a result, the fishing line is pulled by a tackle which flown toward a target position on the water surface so that the spool 510 starts rotating in a predetermined direction.

The centrifugal force which is generated in the four radial-directional movable members 530 which are rotated together with the spool shaft 510*a* is weak in the initial stage immediately after the casting operation has been started until the rotational speed of the spool 510 reaches predetermined speed. The force which is generated by the two radial-directional movable member 530 which is brought to the radial-directional movement inhibition state by the radial-directional movement selection means 531 when the two radial-directional movable members 530 are pressed against the tapered inner surface 532 by the centrifugal force and which acts in a direction opposite to the urging force of the urging means 534 is smaller than the urging force of the urging means 534. Therefore, the lengthwise-directional movable member 528 cannot approach the plural magnets 516 of the side wall 512*a* of the reel body 512, as indicated with a solid line shown in FIG. 44. Thus, the free end of the cylindrical conductive member 514 secured to the lengthwise-directional movable member 528 is not introduced into the annular gap between the double annular rings 522*a* and 522*b* provided with the plural magnets 516 of the side wall 512*a* of the reel body 512. Therefore, no eddy current is generated in the conductive member 514 because of the magnetic force of the plural magnets 516. Thus, no braking force is generated in the spool 510 which is rotated together with the conductive member 514. Even if a small eddy current is generated in the conductive member 514 by dint of a leaked magnetic flux from the plural magnets 516, the braking force generated because of the small eddy current is extremely small.

Therefore, substantially no braking force acts in the initial stage immediately after the casting operation has been started until the rotational speed of the spool 510 reaches certain speed. Therefore, the initial rotational speed of the spool 510 can be raised. As a result, the distance for which the tackle can be thrown can be elongated in the overall period from a moment at which the casting operation has been started to the end of the casting operation. As a matter of course, the rotational speed of the spool 510 which can be raised in the overall period is higher than the rotational speed which can be realized by a conventional fishing reel comprising the spool rotational-speed control means using the braking force which is generated by the centrifugal force. Moreover, the rotational speed according to this embodiment is higher than a conventional fishing reel comprising a spool rotational-speed control means using only magnetic force. The reason for this lies in that the braking force which is generated by the magnetic force is enlarged in substantially proportion to the rise in the rotational speed of the spool 510 from the moment at which the rotation of the spool 510 has been started in the case of the conventional fishing reel comprising the spool rotational-speed control means using only the magnetic force. As a matter of course, the distance for which the tackle (not shown) can be thrown can be elongated in the initial stage immediately after the casting operation has been started until the rotational speed of the spool 510 reaches certain speed as compared with the conventional fishing reel comprising the spool rotational-speed control means using only the frictional force generated by the centrifugal force. The distance can be elongated as compared with the conventional fishing reel comprising the spool rotational-speed control means using only magnetic force.

In an intermediate period of the casting operation, the rotational speed of the spool 510 is reached certain speed. In this period, the force which is generated because the two radial-directional movable members 530 of the four radial-directional movable members 530 which are rotated together with the spool shaft 510*a* and brought to the radial-directional movement permission state by the radial-directional movement selection means 531 are pressed against the tapered inner surface 532 by centrifugal force and which acts opposite to the urging force of the urging means 534 in the axial direction along the spool shaft 510*a* is made to be larger than the urging force of the urging means 534. As the rotational speed of the spool 510 exceeding certain speed is enlarged, the two radial-directional movable member 530 brought to the radial-directional movement permission state by the radial-directional movement selection means 531 are moved to the outside in the radial direction as indicated by an alternate long and two short dashes line shown in FIGS. 44 and 45 along the tapered inner surface 532. Moreover, the lengthwise-directional movable member 528 is caused to overcome the urging force of the urging means 534 gradually approach the plural magnets 516 of the side wall 512*a* of the reel body 512. As a result, the free end of the cylindrical conductive member 514 secured to the lengthwise-directional movable member 528 is gradually introduced into the annular gap between the double annular rings 522*a* and 522*b* provided with the plural magnets 516 of the side wall 512*a* of the reel body 512. Thus, the amount of superimposition between the double annular rings 522*a* and 522*b* and the magnets 516 is enlarged. It leads to a fact that the area of the conductive member 514 which traverses the magnetic flux generated by the plural magnets 516 is gradually enlarged.

As a result, the level of the eddy current generated in the conductive member 514 by dint of the magnetic force of the plural magnets 516 is enlarged in proportion to the area of the conductive member 514 which traverses the magnetic flux generated by the plural magnets 516 and the rotational speed of the spool 510. Also the braking force generated by the eddy current is enlarged in proportion to the area of the conductive member 514 which traverses the magnetic flux generated by the plural magnets 516 and the rotational speed of the spool 510.

Similarly to the conventional fishing reel comprising the spool rotational-speed control means using only the magnetic force, the braking force which can be generated by the structure according to this embodiment is smaller than that generated by the conventional fishing reel comprising the spool rotational-speed control means using the frictional force generated by the centrifugal force. Therefore, the rotational speed of the spool in the initial stage of the casting operation is higher than that of the conventional fishing reel comprising the spool rotational-speed control means using only the magnetic force. Therefore, also the rotational speed in a period from the initial stage to the intermediate stage of the casting operation is higher than that of the conventional fishing reel comprising the spool rotational-speed control means using only the magnetic force. As a matter of course, the rotational speed is significantly higher than that of the conventional fishing reel comprising the spool rotational-speed control means using the frictional force generated by the centrifugal force.

That is, the distance for which the tackle (not shown) can be thrown in a period from the initial stage of the casting operation to the intermediate stage in which the rotational speed of the spool 510 has reached certain speed can be elongated as compared with the conventional fishing reel comprising the spool rotational-speed control means using only the magnetic force and the conventional fishing reel comprising the spool rotational-speed control means using only the frictional force generated by the centrifugal force.

Moreover, excessive rotational speed of the spool 510 which causes critical backlash at a late time can satisfactorily be prevented by dint of an appropriate braking 10o effect obtainable from the combination of the conductive member 514 of the spool 510 and the plural magnets 516 of the side wall 512a of the reel body 512.

When the rotational speed of the spool 510 has been reduced and the centrifugal force generated in the radial-directional movable members 530 which is rotated together with the spool shaft 510a has been weakened in the final stage of the casting operation, the force which is generated because the two radial-directional movable members 530 brought to the spool shaft by the radial-directional movement selection means 531 are pressed against the tapered inner surface 532 by the centrifugal force and which acts in a direction opposite to the direction of the urging force of the urging means 534 is made to be smaller than the urging force of the urging means 534. Thus, the lengthwise-directional movable member 528 is, by the urging force of the urging means 534, pushed in a direction apart from the plural magnets 516 of the side wall 512a of the reel body 512. The free end of the cylindrical conductive member 514 secured to the lengthwise-directional movable member 528 is gradually removed from the annular gap between the double annular rings 522a and 522b provided with the plural magnets 516 of the side wall 512a of the reel body 512. Thus, the area of the conductive member 514 which traverses the magnetic flux generated by the plural magnets 516 is gradually reduced.

As a result, the level of the eddy current generated in the conductive member 514 by dint of the magnetic force of the plural magnets 516 is reduced in proportion to the area of the conductive member 514 which traverses the magnetic flux generated by the plural magnets 516 and the rotational speed of the spool 510. Also the braking force generated by the eddy current is reduced in proportion to the area of the conductive member 514 which traverses the magnetic flux generated by the plural magnets 516 and the rotational speed of the spool 510.

The braking force according to this embodiment is smaller than that which is generated by the conventional fishing reel comprising the spool rotational-speed control means using only the magnetic force. Moreover, rapid reduction in the braking force can be prevented which takes place with the conventional fishing reel comprising the spool rotational-speed control means using the frictional force generated by the centrifugal force. Therefore, the rotational speed of the spool in the final period of the casting operation is higher than the rotational speed which can be realized by the conventional fishing reel comprising the spool rotational-speed control means using only the magnetic force. Moreover, the rapid reduction in the reduction ratio of the-rotational speed can be prevented which takes place with the conventional fishing reel comprising the spool rotational-speed control means using the frictional force generated by the centrifugal force.

That is, the distance for which the tackle (not shown) can be thrown in the final period of the casting operation in which the rotational speed of the spool 510 has gradually be reduced can be elongated as compared with that of the conventional fishing reel comprising the spool rotational-speed control means using only the magnetic force and that of the conventional fishing reel comprising the spool rotational-speed control means using only the frictional force generated by the centrifugal force.

Moreover, the excessively high rotational speed of the spool 510 which cause critical backlash with respect to the flying speed of the tackle at a later time is appropriately restrained in the intermediate period of the casting operation. The rapid reduction in the reduction ratio of the rotational speed of the spool 510 which takes in the final stage of the casting operation with the conventional fishing reel comprising the spool rotational-speed control means using only the frictional force generated by the centrifugal force can be prevented. If there is apprehension that the backlash phenomenon of the fishing line (not shown) takes place because of rapid reduction in the pulling speed of the fishing line which occurs because the tackle (not shown) reaches the water surface and inertia of the rotations of the spool 510 after the tackle (not shown) has reached the water surface, only a simple operation which can be performed by a person which is not skilled in the casting operation is required to prevent the backlash phenomenon. The operation is performed in such a manner that, for example, the spool or the surface of the fishing line wound around the spool is pressed by, for example, the finger. Therefore, the operation for unreeling the fishing line for performing casting can easily be performed.

This embodiment is particularly characterized in that a user of the fishing reel according to the first embodiment is able to separate the spool shaft 510a from the reel body 512 together with the spool 510 prior to the user use the fishing rod having the fishing reel. Then, a required number of the radial-directional movable members 530 among the plural radial-directional movable members 530 is, through the radial-directional movement selection means 531, brought to the radial-directional movement permission state in accordance with the situation of the fishing spot and/or the required reel operation on the spool shaft 510a separated from the reel body 512. Moreover, the residual radial-directional movable members 530 can be brought to the radial-directional movement inhibition state.

That is, in inverse proportion to the number of the radial-directional movable members 530 which are brought to the radial-directional-movement permission state, the number of revolutions of the spool 510 required for the force acting in a direction opposite to the urging force of the urging means 534 to overcome the urging force of the urging means 534 can be reduced, the force being generated because the radial-directional movable member 530 is pressed against the tapered inner surface 532 of the spool 510 by the centrifugal force generated in the radial-directional movable member 530 when the spool 510 is rotated. That is, an intense braking state is realized in which the magnitude of the braking force acting on the rotation of the spool 510 is enlarged.

Therefore, if the number of the radial-directional movable members 530 which are brought to the radial-directional movement permission state is enlarged, the number of revolutions of the spool 510 can be reduced when the conductive member 514, together with the lengthwise-directional movable member 528, overcomes the urging force of the urging means 534 so as to be introduced between the gap between the plural magnets 516 of the reel body 512. The rotational speed of the spool 510 which is controlled by the spool rotational-speed control means 526 in such a manner that the rotation of the spool 510 is limited is widened to the small range. That is, even if the spool 510 is rotated at low speed, braking force acts on the rotation of the spool 510. Therefore, even a casting operation is performed in such a manner that a compact swing is performed (in a short-range operation), the rotation of the spool 510 can appropriately be controlled to prevent the backlash phenomenon of the fishing line. Moreover, the elongation of the distance for which the tackle can be thrown can be felt by a user in the initial and final stages of the casting operation.

If the number of the radial-directional movable members 530 which are brought to the radial-directional movement permission state is reduced, the number of revolutions of the spool 510 is enlarged when the conductive member 514 is, together with the lengthwise-directional movable member 528, introduced into the gap between the plural magnets 516 of the reel body 512 to cause the braking force to act because the conductive member 514 overcomes the urging force of the urging means 534. Therefore, a weak braking state is realized in which the magnitude of the braking force which acts on the rotation of the spool 510 is reduced. Therefore, the rotational speed of the spool 510 which is controlled by the spool rotational-speed control means 526 in such a manner that the rotation of the spool 510 is limited is moved to a higher speed range. Therefore, even if a casting operation is performed in which a great casting operation is performed (that is, a long-range casting operation is performed), the rotation of the spool 510 can appropriately be controlled to reliably prevent the backlash phenomenon. Moreover, the user is able to feel elongation of the distance for which-the tackle can be thrown in the initial and final stages of the casting operation.

Eleventh Embodiment

Figure 46:
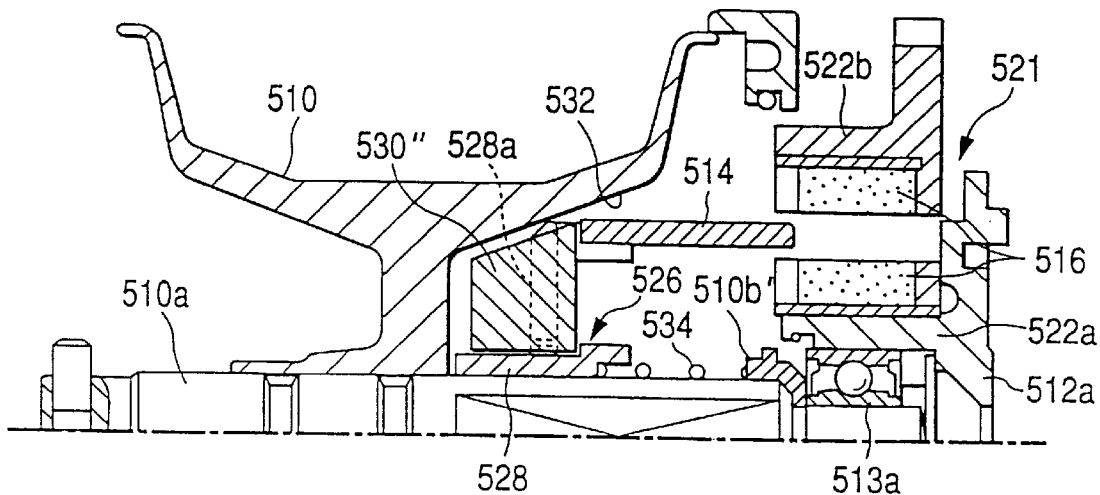
FIG. 46 a schematic and a semi-vertical cross sectional view showing an essential portion of a fishing reel according to an eleventh embodiment of the present invention in which a state is shown in which the spool is not rotated and a state is shown in which the spool is rotated at relatively low speed.
Figure 47:
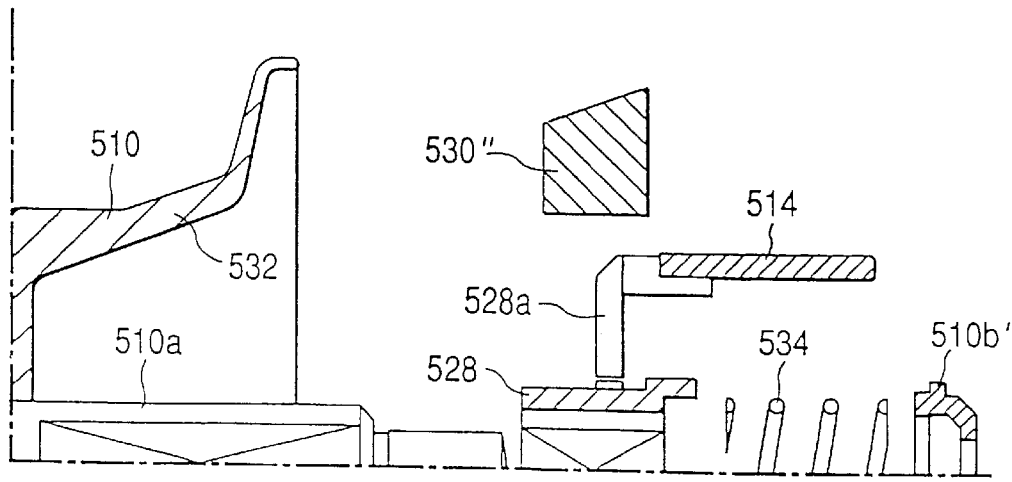
FIG. 47 is a schematic and semi-vertical cross sectional view showing an essential portion of the fishing reel shown in FIG. 46 in which a state is shown in which an essential portion of the fishing reel shown in FIG. 46 has been decomposed to change the radial-directional movable member forming a portion of the control-operation adjustment means for adjusting the spool rotational speed control which is performed by the radial-directional movable member.

Referring to FIGS. 46 and 47, an eleventh embodiment of the fishing reel according to the present invention will now be described.

The eleventh embodiment is different from the tenth embodiment in that a plurality of radial-directional movable members 530" having different weight, material or coefficients of friction with respect to the tapered inner surface 532. Thus, a control adjustment means is realized which selectively employs a required radial-directional movable members 530" in synchronization with an expected fishing spot or a required reel operation so as to adjust the control of the spool rotational-speed control means 526.

Moreover, an annular cap is employed which is detachably set to cover the outer surface of the spool shaft 510*a* as the engagement member 510*b*' on the spool shaft 510*a*.

The fishing reel according to the eleventh embodiment attains the same effect obtainable from that according to the tenth embodiment.

A variety of urging means 534 (the compression coil springs) having different urging forces may be prepared so as to be selected to adjust the control operation (that is, the braking operation).

Specifically, this embodiment is particularly characterized in that a user of the fishing reel according to the first embodiment is able to separate the spool shaft 510*a* from the reel body 512 together with the spool 510 prior to the user use the fishing rod having the fishing reel. Then, required radial-directional movable members 530" among the plural radial-directional movable members 530" having different weights or coefficients of friction with respect to the tapered inner surface 532 forming the control adjustment means are, on the spool shaft 510*a* separated from the reel body 512 are selected as shown in FIG. 47, selected in accordance with an expected fishing spot or a required reel operation. As an alternative to this, the number is changed.

Since urging means 534 having different urging forces are prepared, flexible adaptation to the expected fishing spots and required reel operations are permitted.

That is, in accordance with the braking condition in which the weight of the radial-directional movable members 530" is enlarged, if the movement of the radial-directional movable members 530" is facilitated because the coefficient of friction of the radial-directional movable members 530" with respect to the tapered inner surface 532 is reduced or if the number of the employed radial-directional movable members 530" is enlarged, the number of revolutions of the spool 510 required for the force which is generated because the radial-directional movable members 530" is pressed against the tapered inner surface 532 by the centrifugal force generated in the radial-directional movable members 530" when the spool 510 is rotated and which is required for the force to overcome the urging force of the urging means 534 is reduced. That is, a strong braking state is realized in which the braking force acting on the rotation of the spool 510 is enlarged.

Therefore, if a heavier radial-directional movable members 530" is selected, if a radial-directional movable members 530" having a smaller coefficient of friction with respect to the tapered inner surface 532 is selected or if the number of the radial-directional movable members 530" is enlarged, the number of revolutions of the spool 510 when the conductive member 514, together with the lengthwise-directional movable member 528, overcomes the foregoing of the urging means 534 and caused to be introduced into the gap between the plural magnets 516 of the reel body 512 to perform the braking operation is expanded into a small range. Therefore, braking force acts on the spool 510 in a low rotational speed range for the spool 510 which is controlled by the spool rotational-speed control means 526. Therefore, even if a casting operation is performed in such a manner that a compact swing is performed (when a short-range casting operation is performed), the rotation of the spool 510 can appropriately be controlled to reliable prevent generation of the backlash phenomenon. Moreover, the elongation of the distance for which the-tackle can be thrown in the initial and final stages of the casting operation can be felt by the user.

When a heavier radial-directional movable members 530" is selected, a radial-directional movable members 530" having a larger coefficient of friction with respect to the tapered inner surface 532 is selected to inhibit smooth movement of the radial-directional movable members 530" along the tapered inner surface 532 or the number of the radial-directional movable members 530" is reduced, the number of revolutions of the spool 510 when the conductive member 514 together with the lengthwise-directional movable member 528 overcomes the urging force of the urging means 534 so as to be introduced into the gap between the plural magnets 516 of the reel body 512 to start the braking operation is enlarged. Thus, a weak braking state is realized in which the braking force acting on the rotation of the spool 510 is reduced. The rotational speed of the spool 510 which is controlled by the spool rotational-speed control means 526 is moved to a high speed range. Therefore, even if a casting operation is performed in which a great swing is performed (when a so-called long-range casting operation is performed), the rotation of the spool 510 can appropriately be controlled to reliably prevent generation of the backlash phenomenon. Moreover, elongation of the distance for which the tackle can be thrown in the initial and final stages of the casting operation can be felt by the user.

Twelfth Embodiment

Referring to FIGS. 48 to 52C, a twelfth embodiment of the fishing reel according to the present invention will now be described.

Figure 48:
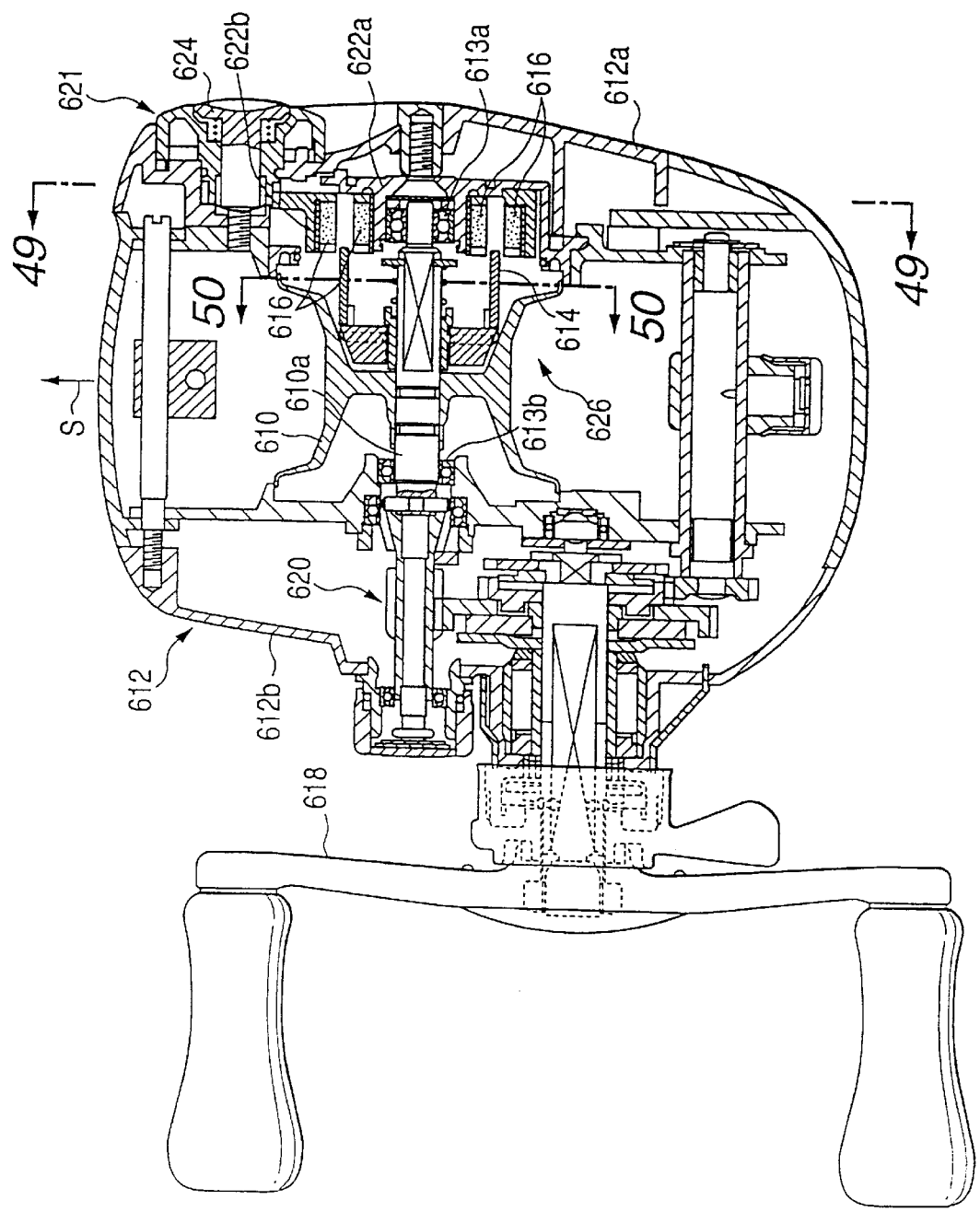
FIG. 48 is a schematic and horizontal cross sectional view showing a twelfth embodiment of the fishing reel according to the present invention.

As shown in FIG. 48, the fishing reel according to the first embodiment of the present invention comprises a spool 610 around which a fishing line (not shown) is wound in such a manner that the fishing line can be unreeled; and a reel body 612 for rotatively supporting two ends of a spool shaft 610*a* of the spool 610 through bearings 613*a* and 613*b* and rotatively holding the spool 610.

A conductive member 614 made of, for example, aluminum or copper, is disposed at an end of the spool shaft 610*a* at a position between an end surface of the spool 610 and a bearing 613*a* which rotatively supports an end (the right-hand end in FIG. 48) of the spool shaft 610*a* projecting over an end surface of the spool 610. A side wall 612*a* of the reel body 612 provided with a bearing 613*a* which rotatively supports an end of the spool shaft 610*a* is provided with a plurality of magnets 616 corresponding to the conductive member 614 at the end of the spool shaft 610*a*.

Another side wall 612*b* provided with a bearing 613*b*, which rotatively supports another end (the left-hand end in FIG. 48) of the spool shaft 610*a* projecting over another end surface of the spool 610 is provided with a rotative handle 618. Moreover, a clutch-equipped rotational-force transmission means 620 for selectively transmitting rotational force supplied from the handle 618 to another end of the spool shaft 610*a* is provided. The clutch-equipped rotational-force transmission means 620 will now be described. When a clutch is operated by depressing an operation button (not shown), selection of a state from two states is permitted one of which is a spool free rotation state in which free rotation of the spool shaft 610*a* is permitted to permit unreeling (an arrow S shown in FIG. 48 indicates a direction in which the fishing line is unreeled) of a fishing line (not shown). Another state is a spool operation state in which rotational force supplied from the handle 618 is transmitted to the spool 610 through another end of the spool shaft 610*a* so as to wind the fishing line (not shown) around the spool 610 in a direction opposite to the unreeling direction indicated with the arrow S shown in FIG. 1. Since the structure of the clutch-equipped rotational-force transmission means 620 is a known fact, the description of the structure is omitted here.

Figure 49:
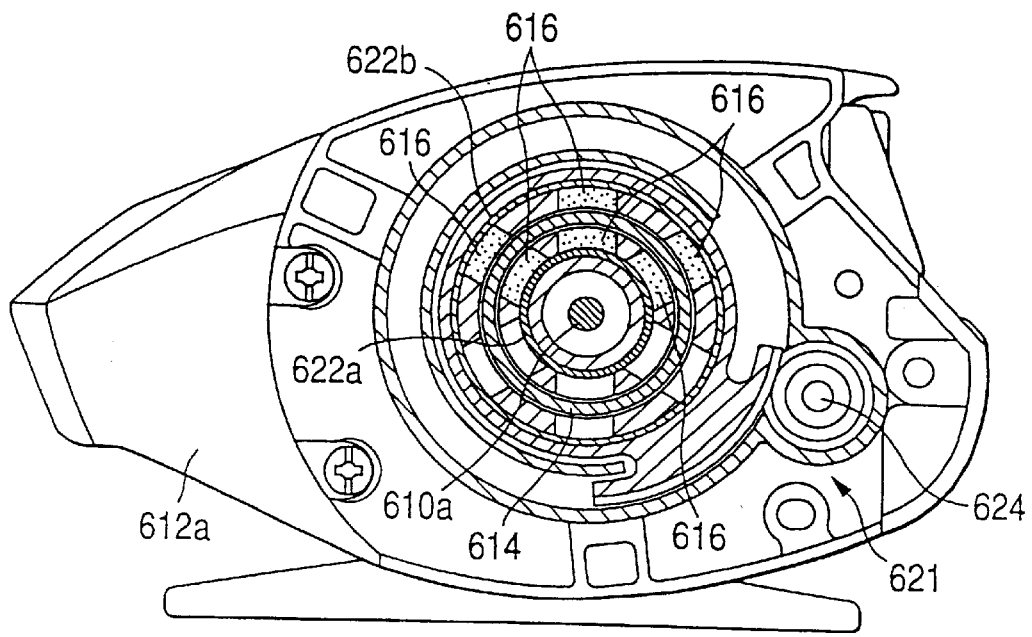
FIG. 49 is a schematic and horizontal cross sectional view taken along line 49—49 shown in FIG. 48.

As shown in FIGS. 48 and 49, the plural magnets 616 are provided for the side wall 612*a* of the reel body 612 through a magnetic-force adjustment means 621 for adjusting the magnetic force of the magnets 616 which acts on the stationary conductive member 614. In this embodiment, the magnetic-force adjustment means 621 includes double annular rings 622*a* and 622*b* disposed concentrically with respect to the spool shaft 610*a*. The plural magnets 616 are disposed on the double annular rings 622*a* and 622*b* in such a manner that the magnets 616 are disposed apart from one another at predetermined intervals in the circumferential direction. The plurality of the magnets 616 of the inner annular ring 622*a* are disposed in such a manner that the magnetic poles facing outside in the radial direction of the inner annular ring 622*a* are different from each other. Also the plurality of the magnets 616 of the outer annular ring 622*b* are disposed in such a manner that the magnetic poles facing insides in the radial direction of the outer annular ring 622*b* are different from each other.

The inner annular ring 622*a* is secured to the side wall 612*a*. The outer annular ring 622*b* will now be described. When a magnetic force adjustment button 624 provided for the side wall 612*a* is rotated in a direction, the magnetic pole of the outer annular ring 622*b* opposite to the magnetic pole of the inner annular ring 622*a* is changed. Thus, the magnitude of the magnetic force which acts on the conductive member 614 is adjusted. That is, radial directional internal ends of the magnetic poles of the plural magnets 616 of the outer annular ring 622*b* which are different from the magnetic poles at the radial directional outer ends of the plural magnets 616 of the inner annular ring 622*a* are caused to face the magnetic poles at the radial directional outer ends-of the plural magnets 616 of the outer annular ring 622*b*. Thus, a maximum attractive magnetic force state can be realized in which the radial directional outer end magnetic poles of the plural magnets 616 of the inner annular ring 622*a* and the radial direction inner end magnetic poles of the outer annular ring 622*b* generate maximum attractive magnetic forces. On the other hand, radial directional outer end magnetic poles of the plural magnets 616 of the inner annular ring 622*a* of the plural magnets 616 of the outer annular ring 622*b* are caused to face the radial direction inner end magnetic poles which are the same magnetic poles so that the radial directional outer end magnetic poles of the plural magnets 616 of the inner annular ring 622*a* and the radial directional inner end magnetic poles of the outer annular ring 622*b* generate maximum repulsive magnetic force. Thus, a maximum repulsive magnetic force state can be realized. The relative positions of the plural magnets 616 of ;the outer annular ring 622*b* are shifted with respect to the plural magnets 616 of the inner annular ring 622*a* between the above-mentioned two states. Thus, the magnitude of the magnetic force which acts on the conductive member 614 is adjusted to adjust the braking force which is applied to the spool 610.

As shown in FIG. 48, the conductive member 614 is disposed at the end of the spool shaft 610*a* through a spool rotational-speed control means 626 which changes the magnetic force of the plural magnets 616 of the side wall 612*a* of the reel body 612 which acts on the conductive member 614 in accordance with the rotational speed of the spool 610 so as to control the rotational speed of the spool 610 provided with the conductive member 614.

Figure 50:
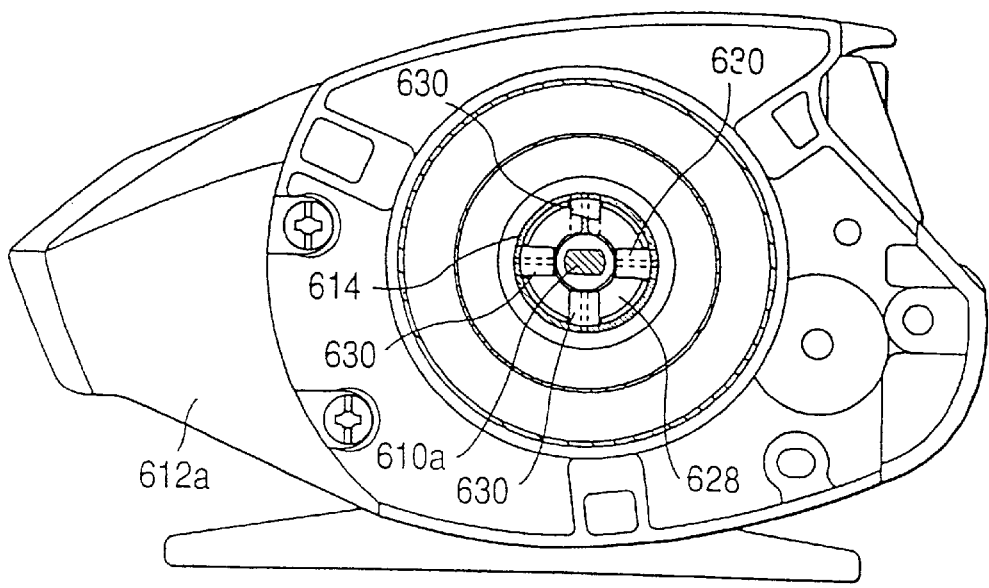
FIG. 50 is a schematic and horizontal cross sectional view taken along line 50—50 shown in FIG. 48.
Figure 51A:
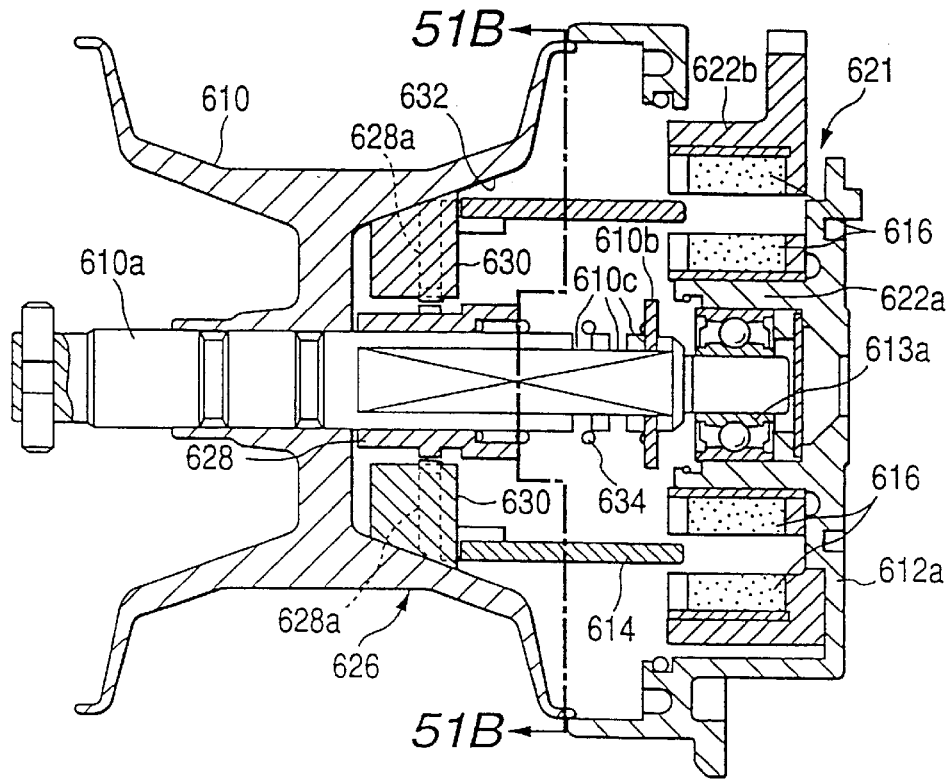
FIG. 51(A) is a schematic and vertical cross sectional view showing an essential portion of the fishing reel shown in FIG. 48 in which a state is shown in which a state from a moment at which the spool is not rotated and a moment at which the rotational speed of the spool reaches certain speed is shown and a state in which the rotational speed of the spool has been reduced from certain speed is shown.

As shown in FIGS. 50 and 51(A), the spool rotational-speed control means 626 is provided with a lengthwise-directional movable member 628 at an end of the spool shaft 610a. The spool rotational-speed control means 626 is able to move in a direction (a lengthwise direction) along the center line of rotations of the spool shaft 610a. The lengthwise-directional movable member 628 is rotated together with the spool shaft 610a in the circumferential direction of the spool shaft 610a. The conductive member 614 is formed into a cylindrical shape. An end of the conductive member 614 opposite to the magnets 616 of the conductive member 614 is secured to the lengthwise-directional movable member 628 concentrically to the spool shaft 610a.

In this embodiment, the conductive member 614 and the lengthwise-directional movable member 628 are individually formed, and then secured. However, the conductive member 614 and the lengthwise-directional movable member 628 may integrally be made of the material of the conductive member 614.

Free ends of the conductive member 614 secured to the lengthwise-directional movable member 628 are disposed opposite to an annular gap between the concentric double annular rings 622a and 622b of the side wall 612a of the reel body 612.

Figure 51B:
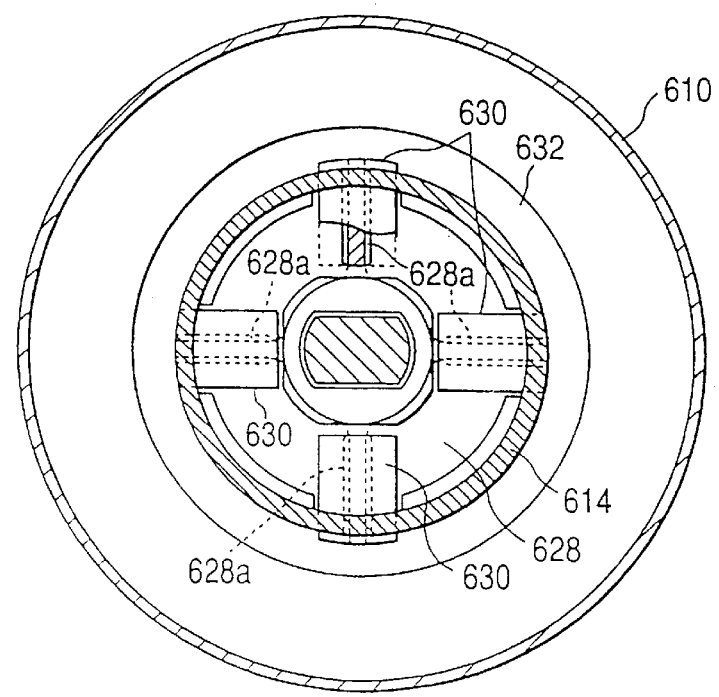
FIG. 51(B) is a schematic and horizontal cross sectional view taken along line 51B—51B shown in FIG. 51(A)

The lengthwise-directional movable member 628 has radial-directional movable members 630 movable in the radial direction of the spool shaft 610a and disposed apart from each other at predetermined intervals at plural positions (four positions in the twelfth embodiment) of the spool shaft 610a, as shown in FIGS. 50, 51(A) and 51(B).

To support the radial-directional movable members 630 movably in the radial direction of the spool shaft 610a, the lengthwise-directional movable member 628 has guide holes 628a. The guide holes 628a are elongated in the radial direction of the spool shaft 610a and formed at plural positions (four positions in the twelfth embodiment) apart from one another at predetermined intervals in the circumferential direction of the outer surface thereof, as shown in FIGS. 51(A) and 51(B). Each of the radial-directional movable members 630 has an H-shape horizontal cross section. When a central bridge-like portion of the radial-directional movable member 630 is received in a guide holes 628a, movements of the radial-directional movable members 630 along the guide holes 628a are permitted. That is, the guide holes 628a serve as guide portions for movably guiding the radial-directional movable members 630 in the radial direction of the spool shaft 610a. The plural radial-directional movable members 630 are able to cross the outer surface of the conductive member 614 along the corresponding guide holes 628a and move to further outside portions.

As shown in FIGS. 51(A) and 51(B), a tapered inner surface 632 is provided for the end surface at the end of the spool 610. The tapered inner surface 632 surrounds the plural radial-directional movable members 630 of the spool shaft 610a and has a large-diameter opening which faces the plural magnets 616 of the side wall 612a of the reel body 612 opposite to the plural radial-directional movable members 630 in the radial direction of the spool shaft 610a. The tapered inner surface 632 is formed conentrically with respect to the center line of rotations of the spool shaft 610a. The tapered inner surface 632 has a smooth surface having a small coefficient of friction. In this embodiment, the tapered inner surface 632 is formed by making the inner surface of the end surface at the end of the spool 610 into the smooth surface having the small coefficient of friction. However, the tapered inner surface 632 may be formed by forming the inner surface of the end surface at the end of the spool 610 into a smooth surface having a small coefficient of friction.

As shown in FIG. 51(A), the lengthwise-directional movable member 628 provided with the conductive member 614 is urged by an urging means 634 so as to be moved apart from the plural magnets 616 of the side wall 612a of the reel body 612 facing the end surface of the spool 610 at the end of the spool shaft 610a. In this embodiment, the urging means 634 is a compression coil spring wound around a portion at the end of the spool shaft 610a between the lengthwise-directional movable member 628 and an engagement member 610b, which is a stopper ring or a washer, disposed adjacent to the bearing 613a which rotatively supports the end of the spool shaft 610a.

As shown in FIGS. 51A and 51B, the lengthwise-directional movable member 628 urged by the urging means 634 is disposed adjacent to the end surface of the spool 610 at the end of the spool shaft 610a. The radial-directional movable members 630 on the lengthwise-directional movable member 628 are disposed adjacent to the tapered inner surface 632 of the end surface of the spool 610 and the smallest opening.

In this embodiment, a plurality of (three in this embodiment) engagement grooves 610c formed apart from each other by predetermined intervals in the direction along the center line of the rotations of the spool 610 which is the lengthwise direction of the spool shaft 610a on the end of the spool shaft 610a. The engagement member 610b is detachably engaged by any one of the plural engagement grooves 610c. The combinations of the three engagement grooves 610c and the engagement member 610b constitute a control adjustment means for controlling the degree of control which is performed the spool rotational-speed control means 626 by raising/reducing the rotational speed of the spool 610.

The operation of the fishing reel according to the twelfth embodiment having the above-mentioned structure will now be described.

A user of the fishing reel according to this embodiment is able to easily separate the spool shaft 610a of the fishing reel together with the spool 610 from the reel body 612 prior to using the fishing rod having the fishing reel according to the twelfth embodiment. Then, the engagement member 610b is detachably engaged to any one of the required plural engagement grooves 610c constituting the control adjustment means in accordance with the expected fishing spot or a required reel operation on the spool shaft 610a separated from the reel body 612. Thus, a movement restraining means is constituted which is capable of adjusting the urging force of the urging means 634 which acts on the lengthwise-directional movable member 628 can be adjusted and adjusting the distance for which the lengthwise-directional movable member 628 and the conductive member 614 are moved toward the annular gap between the plural magnets 616 of the side wall 612a of the reel body 612 against the urging force of the urging means 634.

Figure 52A:
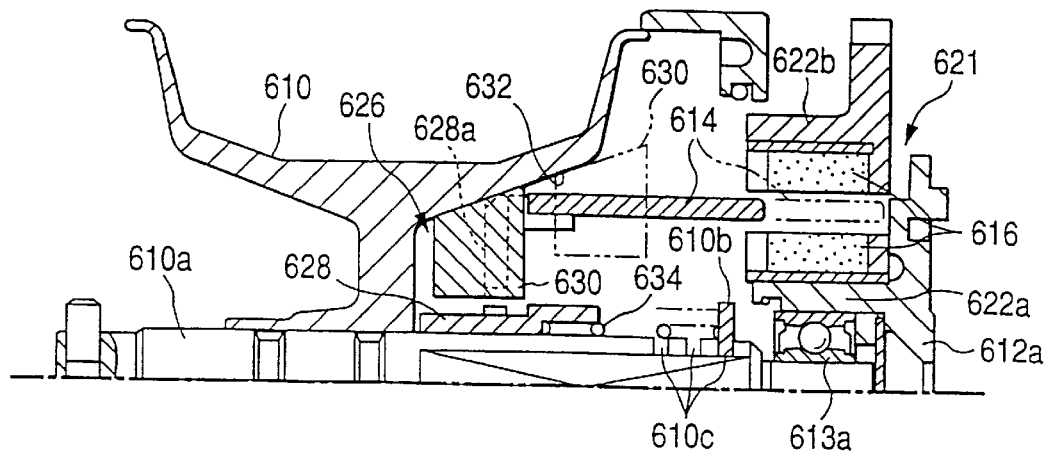
FIG. 52(A) is a semi-vertical cross sectional view showing an essential portion of the fishing reel according to the twelfth embodiment of the present invention in which a state is shown in which control of the spool rotational speed which is performed by the spool rotational-speed control means is adjusted to a maximum level by the spool rotational-speed control means.

For example, in the case as shown in FIGS. 51(A) and 52(A), the engagement member 610b is engaged to the engagement groove 610c among the three engagement grooves 610c on the end of the-spool shaft 610a which is nearest the plural conductive member 614 of the side wall 612a of the reel body 612.

After the spool shaft 610a is returned to a predetermined position of the reel body 612, the fishing rod having the fishing reel according to the first embodiment is swung to perform the casting operation in a fishing spot. Thus, a tackle (not shown) which flies toward a target position on the water surface pulls a fishing line (not shown). Therefore, the spool 610 starts rotating in a predetermined direction.

The centrifugal force which is generated in the four radial-directional movable member 630 which are rotated together with the spool shaft 610*a* is weak in the initial stage immediately after the casting operation has been started until the rotational speed of the spool 610 reaches predetermined speed. The force which is generated when the two radial-directional movable member 630 brought into the radial-directional movement inhibition state by the radial-directional movement selection means 631 are pressed against the tapered inner surface 632 by the centrifugal force as indicated with solid lines shown in FIGS. 51(A) and 52(A) and which acts in a direction opposite to the urging force of the urging means 634 is smaller than the urging force of the urging means 634. Therefore, the lengthwise-directional movable member 628 cannot approach the plural magnets 616 of the side wall 612*a* of the reel body 612, as indicated by the solid lines shown in FIGS. 51(A) and 52(A). Thus, the free end of the cylindrical conductive member 614 secured to the lengthwise-directional movable member 628 is not introduced into the annular gap between the double annular rings 622*a* and 622*b* provided with the plural magnets 616 of the side wall 612*a* of the reel body 612. Therefore, no eddy current is generated in the conductive member 614 because of the magnetic force of the plural magnets 616. Thus, no braking force is generated in the spool 610 which is rotated together with the conductive member 614. Even if a small eddy current is generated in the conductive member 614 by dint of a leaked magnetic flux from the plural magnets 616, the braking force generated because of the small eddy current is extremely small.

Therefore, substantially no braking force acts in the initial stage immediately after the casting operation has been started until the rotational speed of the spool 610 reaches certain speed. Therefore, the initial rotational speed of the spool 610 can be raised rapidly. As a result, the distance for which the tackle can be thrown can be elongated in the overall period from a moment at which the casting operation has been started to the end of the casting operation. As a matter of course, the rotational speed of the spool 610 which can be raised in the overall period is higher than the rotational speed which can be realized by a conventional fishing reel comprising the spool rotational-speed control means using the braking force which is generated by the centrifugal force. Moreover, the rotational speed according to this embodiment is higher than a conventional fishing reel comprising a spool rotational-speed control means using only magnetic force. The reason for this lies in that the braking force which is generated by the magnetic force is enlarged in substantially proportion to the rise in the rotational speed of the spool 610 from the moment at which the rotation of the spool 610 has been started in the case of the conventional fishing reel comprising the spool rotational-speed control means using only the magnetic force. As a matter of course, the distance for which the tackle (not shown) can be thrown can be elongated in the initial stage immediately after the casting operation has been started until the rotational speed of the spool 610 reaches certain speed as compared with the conventional fishing reel comprising the spool rotational-speed control means using only the frictional force generated by the centrifugal force. The distance can be elongated as compared with the conventional fishing reel comprising the spool rotational-speed control means using only magnetic force.

In an intermediate period of the casting operation, the rotational speed of the spool 610 is reached certain speed. In this period, the force which is generated because the four radial-directional movable members 30, which are rotated together with the spool shaft 610, is pressed against the tapered inner surface 632 by dint of the centrifugal force and which acts in a direction opposite to the urging force of the urging means 634 in the axial direction along the spool shaft 610*a* is made to be larger than the urging force of the urging means 634. As the rotational speed of the spool 610 exceeding certain speed is enlarged, the four radial-directional movable members 630 are moved along the tapered inner surface 632 to the outside in the radial direction as indicated with an alternate lone and two dashes line shown in FIG. 52(A). Moreover, the lengthwise-directional movable member 628 is allowed to overcome the urging force of the urging means 634 to be allowed to gradually approach the plural magnets 616 of the side wall 612*a* of the reel body 612. As a result, the free end of the cylindrical conductive member 614 secured to the lengthwise-directional movable member 628 is gradually introduced into the annular gap between the double annular rings 622*a* and 622*b* provided with the plural magnets 616 of the side wall 612*a* of the reel body 612. Thus, the amount of superimposition between the double annular rings 622*a* and 622*b* and the magnets 616 is enlarged. It leads to a fact that the area of the conductive member 614 which traverses the magnetic flux generated by the plural magnets 616 is gradually enlarged.

As a result, the level of the eddy current generated in the conductive member 614 by dint of the magnetic force of the plural magnets 616 is enlarged in proportion to the area of the conductive member 614 which traverses the magnetic flux generated by the plural magnets 616 and the rotational speed of the spool 610. Also the braking force generated by the eddy current is enlarged in proportion to the area of the conductive member 614 which traverses the magnetic flux generated by the plural magnets 616 and the rotational speed of the spool 610.

Similarly to the conventional fishing reel comprising the spool rotational-speed control means using only the magnetic force, the braking force which can be generated by the structure according to this embodiment is smaller than that generated by the conventional fishing reel comprising the spool rotational-speed control means using the frictional force generated by the centrifugal force. Therefore, the rotational speed of the spool in the initial stage of the casting operation is higher than that of the conventional fishing reel comprising the spool rotational-speed control means using only the magnetic force. Therefore, also the rotational speed in a period from the initial stage to the intermediate stage of the casting operation is higher than that of the conventional fishing reel comprising the spool rotational-speed control means using only the magnetic force. As a matter of course, the rotational speed is significantly higher than that of the conventional fishing reel comprising the spool rotational-speed control means using the frictional force generated by the centrifugal force.

That is, the distance for which the tackle (not shown) can be thrown in a period from the initial stage of the casting operation to the intermediate stage in which the rotational speed of the spool 610 has reached certain speed can be elongated as compared with the conventional fishing reel comprising the spool rotational-speed control means using only the magnetic force and the conventional fishing reel comprising the spool rotational-speed control means using only the frictional force generated by the centrifugal force.

Moreover, excessive rotational speed of the spool 610 which causes critical backlash at a late time can satisfactorily be prevented by dint of an appropriate braking effect obtainable from the combination of the conductive member 614 of the spool 610 and the plural magnets 616 of the side wall 612*a* of the reel body 612.

When the rotational speed of the spool 610 has been reduced and the centrifugal force generated in the four radial-directional movable members 630 which are rotated together with the spool shaft 610*a* has been weakened in the final stage of the casting operation, the force which is generated because the two radial-directional movable members 630 brought to the radial-directional movement permission state by the radial-directional movement selection means 631 are pressed against the tapered inner surface 632 by dint of the centrifugal force and which acts on the direction opposite to the urging force of the urging means 634 is made to be smaller than the urging force of the urging means 634. Thus, the lengthwise-directional movable member 628 is, by the urging force of the urging means 634, pushed in a direction apart from the plural magnets 616 of the side wall 612*a* of the reel body 612. The free end of the cylindrical conductive member 614 secured to the lengthwise-directional movable member 628 is gradually removed from the annular gap between the double annular rings 622*a* and 622*b* provided with the plural magnets 616 of the side wall 612*a* of the reel body 612. Thus, the area of the conductive member 614 which traverses the magnetic flux generated by the plural magnets 616 is gradually reduced.

As a result, the level of the eddy current generated in the conductive member 614 by dint of the magnetic force of the plural magnets 616 is reduced in proportion to the area of the conductive member 614 which traverses the magnetic flux generated by the plural magnets 616 and the rotational speed of the spool 610. Also the braking force generated by the eddy current is reduced in proportion to the area of the conductive member 614 which traverses the magnetic flux generated by the plural magnets 616 and the rotational speed of the spool 610.

The braking force according to this embodiment is smaller than that which is generated by the conventional fishing reel comprising the spool rotational-speed control means using only the magnetic force. Moreover, rapid reduction in the braking force can be prevented which takes place with the conventional fishing reel comprising the spool rotational-speed control means using the frictional force generated by the centrifugal force. Therefore, the rotational speed of the spool in the final period of the casting operation is higher than the rotational speed which can be realized by the conventional fishing reel comprising the spool rotational-speed control means using only the magnetic force. Moreover, the rapid reduction in the reduction ratio of the rotational speed can be prevented which takes place with the conventional fishing reel comprising the spool rotational-speed control means using the frictional force generated by the centrifugal force.

That is, the distance for which the tackle (not shown) can be thrown in the final period of the casting operation in which the rotational speed of the spool 610 has gradually been reduced can be elongated as compared with that of the conventional fishing reel comprising the spool rotational-speed control means using only the magnetic force and that of the conventional fishing reel comprising the spool rotational-speed control means using only the frictional force generated by the centrifugal force.

Moreover, the excessively high rotational speed of the spool 610 which causes critical backlash with respect to the flying speed of the tackle at a later time is appropriately restrained in the intermediate period of the casting operation. The rapid reduction in the reduction ratio of the rotational speed of the spool 610 which takes in the final stage of the casting operation with the conventional fishing reel comprising the spool rotational-speed control means using only the frictional force generated by the centrifugal force can be prevented. If there is apprehension that the backlash phenomenon of the fishing line (not shown) takes place because of rapid reduction in the pulling speed of the fishing line which occurs because the tackle (not shown) reaches the water surface and inertia of the rotations of the spool 610 after the tackle (not shown) has reached the water surface, only a simple operation which can be performed by a person which is not skilled in the casting operation is required to prevent the backlash phenomenon. The operation is performed in such a manner that, for example, the spool or the surface of the fishing line wound around the spool is pressed by, for example, the finger. Therefore, the operation for unreeling the fishing line for performing casting can easily be performed.

This embodiment is characterized in the user of the fishing reel separates the spool shaft 610*a* of the fishing reel from the reel body 612 together with the spool 610. Then, a required engagement groove 610*c* is selected from the plural engagement grooves 610*c* constituting the control adjustment means to which the engagement member 610*b* is engaged in accordance with the expected state of the fishing spot a required reel operation on the spool shaft 610*a* separated from the reel body 612. Thus, the user is able to adjust the urging force of the urging means 634 which acts on the lengthwise-directional movable member 628. Moreover, the distance for which the lengthwise-directional movable member 628 and the conductive member 614 are moved toward the annular gap between the plural magnets 616 of the side wall 612*a* of the reel body 612 against the urging force of the urging means 634.

Figure 52B:
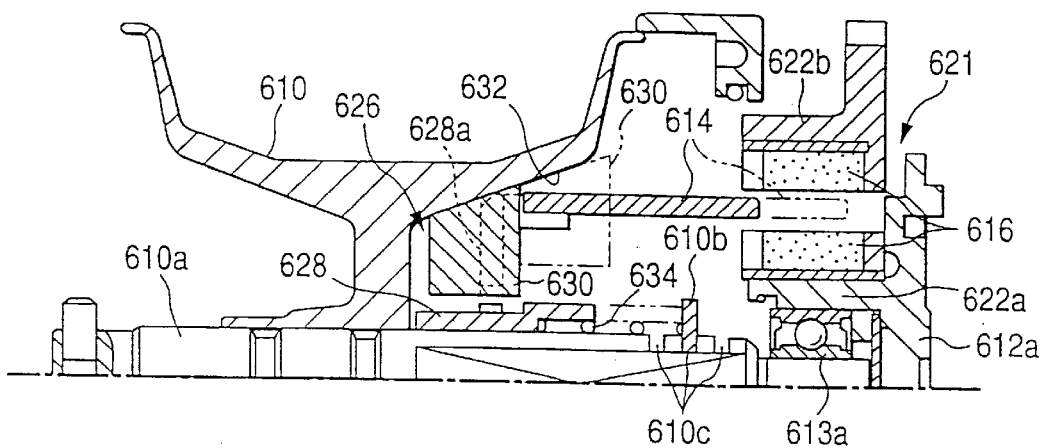
FIG. 52(B) is a semi-vertical cross sectional view showing an essential portion of the fishing reel according to the twelfth embodiment of the present inventions in which a state is shown in which control of the spool rotational speed which is performed by the spool rotational-speed control means is adjusted to an intermediate level by the spool rotational-speed control means.
Figure 52C:
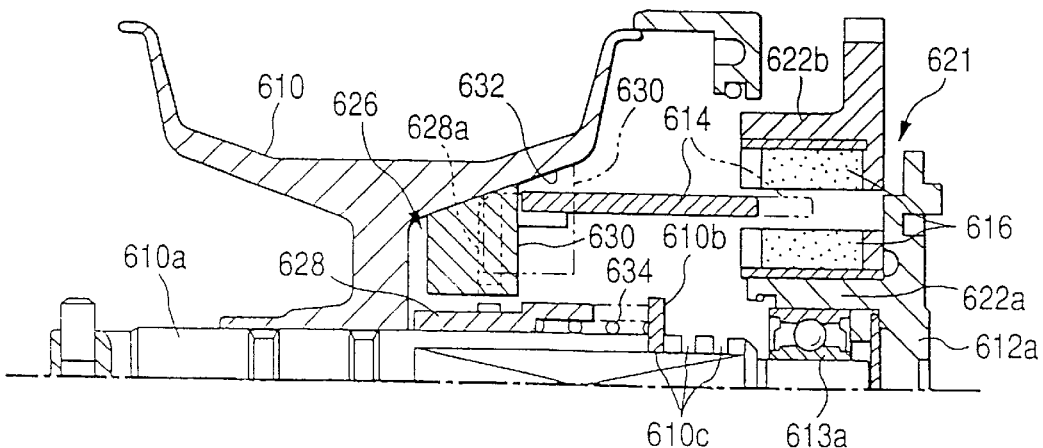
FIG. 52(C) is a semi-vertical cross sectional view showing an essential portion of the fishing reel according to the twelfth embodiment of the present invention in which a state is shown in which control of the spool rotational speed which is performed by the spool rotational-speed control means is adjusted to a minimum level by the spool rotational-speed control means.

As shown in FIGS. 52(A), 52(B) and 52(C), the urging force of the urging means 634 which acts on the lengthwise-directional movable member 628 is enlarged in proportion to the distance from the engagement groove 610*c* among the plural engagement grooves 610*c* on the spool shaft 610*a* to which the engagement member 610*b* is engaged to the plural magnets 616 of the side wall 612*a* of the reel body 612. The number of revolutions required for the spool 610 to cause the force which is generated when the radial-directional movable member 630 is pressed against the tapered inner surface 632 by the centrifugal force generated in the radial-directional movable member 630 when the spool 610 is rotated and which acts in the direction opposite to the urging force of the urging means 634 is enlarged. Moreover, when the conductive member 614 is, together with the lengthwise-directional movable member 628, moved from the initial position indicated with the solid lines shown in FIGS. 52(A), 52(B) and 52(C) toward the plural magnets 616, the distance for which the lengthwise-directional movable member 628 is brought into contact with the engagement member 610*b* and the movement is interrupted is shortened.

Therefore, the rotational speed of the spool 610 which is controlled by the spool rotational-speed control means 626 is enlarged. When the rotational speed of the spool 610 has been raised to relatively high speed, the operation of the spool rotational-speed control means 626 for limiting the rotation of the spool 610 is weakened.

In proportion to the distance from the engagement groove 610*c* among the plural engagement grooves 610*c* on the spool shaft 610*a* to which the engagement member 610*b* is engaged to the plural magnets 616 of the side wall 612*a* of the reel body 612, the urging force of the urging means 634 which acts on the lengthwise-directional movable member 628 is reduced. Thus, the number of revolutions required for the spool 610 to cause the force which is generated when the radial-directional movable member 630 is pressed against the tapered inner surface 632 of the spool 610 by the centrifugal force generated by the radial-directional movable member 630 when the spool 610 is rotated and which acts in the direction opposite to the urging-force of the urging means 634 is reduced. Moreover, when the conductive member 614 and the lengthwise-directional movable member 628 are moved from the initial position indicated with the solid lines shown in FIGS. 52(C), 52(B) and 52(A) toward the plural magnets 616, the distance for which the lengthwise-directional movable member 628 is brought into contact with the engagement member 610b and the movement is interrupted is elongated.

Therefore, the rotational speed of the spool 610 which is controlled by the spool rotational-speed control means 626 so as to be braked is widened in the lower speed range. When the rotational speed of the spool 610 has been made to be relatively high, the operation of the spool rotational-speed control means 626 for braking the rotation of the spool 610 is enhanced.

That is, one engagement groove 610c to which the engagement member 610b is engaged is selected from the plural engagement grooves 610c at the end of the spool shaft 610a so that the urging force of the urging means 634 or the movable distance for the lengthwise-directional movable member 628 together with the conductive member 614 along the lengthwise direction (that is, the axial direction) of the spool shaft 610a is adjusted. Thus, the amount of introduction of the conductive member 614 into the annular gap between the plural magnets 616 can be adjusted. As a result, a delicate operation corresponding to braking of the rotation of the spool 610 required to be adaptable to the state of the fishing spot or the required reel operation can be performed.

What is claimed is:

1. A fishing reel comprising:

a reel body;

a spool rotatably arranged with respect to said reel body, said spool being designed to wind a fishing line thereon;

rotational-force transmission means, provided in said reel body, for selectively switching said spool into one of a spool free rotation state wherein said spool is freely rotatable with respect to said reel body to unreel said fishing line therefrom and a spool operation state wherein rotational driving force can be transmitted to said spool to wind said fishing line onto said spool;

a first brake member provided on said reel body;

a second brake member provided on said spool for generating braking force in cooperation with said first brake member; and spool rotational-speed control means for changing relative position of said second brake member with respect to said first brake member depending on rotational speed of said spool, thereby controlling rotational speed of said spool in said spool free rotation state.

2. A fishing reel according to claim 1, wherein said spool rotational-speed control means moves said second brake member toward said first brake member if rotational speed of said spool substantially exceeds a predetermined value.

3. A fishing reel according to claim 1, wherein said spool rotational-speed control means moves said second brake member to an initial position if rotational speed of said spool becomes substantially below a predetermined value.

4. A fishing reel according to claim 1, wherein said spool rotational-speed control means moves said second brake member by using centrifugal force created by rotation of said spool.

5. A fishing reel according to claim 4, wherein said first and second brake members generates said braking force by using magnetic force.

6. A fishing reel according to claim 5, wherein said spool rotational-speed control means moves said second brake member in a direction parallel to a spool axis about which said spool is rotatable.

7. A fishing reel according to claim 6, further comprising:

adjusting means for adjusting a timing at which said spool rotational-speed control means begins to move said second member.

8. A fishing reel according to claim 6, further comprising:

adjusting means for adjusting a stroke of said second member being moved by said spool rotational-speed control means.

9. A fishing reel according to claim 5, wherein said spool rotational-speed control means moves said second brake member in a direction orthogonal to a spool axis about which said spool is rotatable.

10. A fishing reel according to claim 5, wherein said spool rotational-speed control means pivotably moves said second brake member about an axis orthogonal to a spool axis about which said spool is rotatable.

11. A fishing reel according to claim 4, wherein said first and second brake members generates said braking force by using friction.

12. A fishing reel according to claim 1, wherein said spool rotational-speed control means moves said second brake member by using a rotational speed difference between said second brake member and said spool.

13. A fishing reel according to claim 1, wherein said spool rotational-speed control means includes:

a lengthwise-direction movable member non-rotatively and axially movably supported on a spool shaft of said spool, said lengthwise-direction movable member supporting said second brake member;

a radial-direction movable member radially movably supported on said lengthwise-direction movable member;

a conical inner surface defined by said spool and facing said radial-direction movable member, said conical inner surface increasing in diameter toward said first brake member; and a spring biasing said lengthwise-direction movable member in a direction away from said first brake member.

14. A fishing reel according to claim 13, wherein said first brake member includes one of a magnet and a conductive member, and said second brake member includes the other of said magnet and said conductive member.

15. A fishing reel according to claim 13, wherein said first brake member includes a cylindrical ring defining a plurality of inner surface regions arranged in a direction parallel to an axis of said spool, said inner surface regions having respective different coefficients of friction, and wherein said second brake member is radially movably supported on said lengthwise-direction movable member and faces said cylindrical ring.

16. A fishing reel according to claim 1, wherein said spool rotational-speed control means includes:

a swing shaft diametrically protruding from a spool shaft of said spool and pivotably supporting said second brake member; and a spring pivotably biasing said second brake member so that a distal end of said second brake member is moved away from said first brake member.

17. A fishing reel according to claim 1, wherein said spool rotational-speed control means includes:

a support fixedly supported on a spool shaft of said spool, said support radially movably supporting said second brake member; and a spring biasing said second brake member radially inwardly.

18. A fishing reel according to claim 1, wherein said spool rotational-speed control means includes:

a movable member non-rotatively and axially movably supported on a spool shaft of said spool;

said second brake member radially movably supported on said movable member;

a conical inner surface defined by said first brake member, said conical inner surface facing said second brake member and decreasing in diameter in a first direction; and a spring biasing said movable member in said first direction.

19. A fishing reel according to claim 1, wherein said spool rotational-speed control means includes:

a movable member axially movably and rotatably supported on a spool shaft of said spool, said movable member supporting said second brake member;

a cam projection and a cam groove cooperatively restrict both axial movement and rotational movement of said movable member with respect to said spool shaft to predetermined ranges; and a spring axially biasing said movable member so that said second brake member is moved away from said first brake member.

* * * * *